(12) United States Patent
Dai et al.

(10) Patent No.: US 10,412,650 B2
(45) Date of Patent: Sep. 10, 2019

(54) DATA TRANSMISSION METHOD, APPARATUS AND SYSTEM

(71) Applicant: HUAWEI TECHNOLOGIES CO., LTD., Shenzhen (CN)

(72) Inventors: Mingzeng Dai, Shanghai (CN); Qufang Huang, Shanghai (CN); Tao Zhong, Shenzhen (CN); Qinghai Zeng, Shanghai (CN); Jian Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 15/059,865

(22) Filed: Mar. 3, 2016

(65) Prior Publication Data

US 2016/0192266 A1 Jun. 30, 2016

Related U.S. Application Data

(63) Continuation of application No. PCT/CN2013/082943, filed on Sep. 4, 2013.

(51) Int. Cl.
*H04W 36/22* (2009.01)
*H04W 76/12* (2018.01)
(Continued)

(52) U.S. Cl.
CPC .......... *H04W 36/22* (2013.01); *H04W 28/08* (2013.01); *H04W 36/14* (2013.01);
(Continued)

(58) Field of Classification Search
None
See application file for complete search history.

(56) References Cited

U.S. PATENT DOCUMENTS 8,385,332 B2 * 2/2013 Aggarwal .............. H04L 45/02
370/312
2010/0322151 A1 * 12/2010 Racz ..................... H04W 28/06
370/328
(Continued)

FOREIGN PATENT DOCUMENTS

CN 102215530 A 10/2011
CN 102480528 A 5/2012
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.6.0, 3GPP Organizational Partners (ARIB, ATIS, CCSA, ETSI, TTA, TTC), Jun. 2013, Valbonne, France, 209 pages.
(Continued)

*Primary Examiner* — Marcus Smith
*Assistant Examiner* — Gautam Sharma
(74) *Attorney, Agent, or Firm* — Staas & Halsey LLP

(57) ABSTRACT

The present invention provides a data transmission method, where the method is executed by a base station in a communications system, the communications system further includes a wireless local area network access point WLAN AP and user equipment, a bearer used to transmit data of the user equipment is disposed between the base station and a gateway device, a General Packet Radio Service Tunneling Protocol GTP tunnel is disposed between the base station and the WLAN AP, and the method includes: sending, by the base station, first offloading indication information to the WLAN AP, where the first offloading indication information is used for instructing the WLAN AP to transmit the target data between the base station and the user equipment, and
(Continued)

the first offloading indication information includes identity information of the user equipment.

16 Claims, 13 Drawing Sheets

(51) Int. Cl.
*H04W 28/08* (2009.01)
*H04W 36/14* (2009.01)
*H04W 72/12* (2009.01)
*H04W 84/12* (2009.01)
*H04W 88/16* (2009.01)

(52) U.S. Cl.
CPC ....... *H04W 72/1278* (2013.01); *H04W 76/12* (2018.02); *H04W 84/12* (2013.01); *H04W 88/16* (2013.01)

(56) References Cited

U.S. PATENT DOCUMENTS

| | | | |
|---|---|---|---|
| 2011/0019695 A1* | 1/2011 | Wu | H04W 28/06 370/477 |
| 2011/0090840 A1* | 4/2011 | Lee | H04B 7/155 370/315 |
| 2012/0020278 A1* | 1/2012 | Moberg | H04B 7/155 370/315 |
| 2013/0003698 A1 | 1/2013 | Olvera-Hernandez et al. | |
| 2013/0083724 A1* | 4/2013 | Sindhu | H04L 12/4633 370/328 |
| 2014/0079007 A1 | 3/2014 | Li et al. | |
| 2015/0003415 A1* | 1/2015 | Muley | H04W 36/0022 370/331 |
| 2015/0023341 A1 | 1/2015 | Zhao et al. | |
| 2015/0334633 A1* | 11/2015 | Zhou | H04W 28/24 370/328 |
| 2015/0358857 A1 | 12/2015 | Duan et al. | |
| 2017/0034866 A1* | 2/2017 | Wager | H04W 76/025 |
| 2017/0041824 A1* | 2/2017 | Costa-Requena | H04L 12/4633 |

FOREIGN PATENT DOCUMENTS

| | | |
|---|---|---|
| CN | 102647771 A | 8/2012 |
| CN | 103209440 A | 7/2013 |
| CN | 103220786 | 7/2013 |
| EP | 2 744 260 A1 | 6/2014 |
| WO | 2013/034052 A1 | 3/2013 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.3.0, 3GPP Organizational Partners (ARIB, ATIS, CCSA, ETSI, TTA, TTC), Jun. 2013, Valbonne, France, 57 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.4.0, 3GPP Organizational Partners (ARIB, ATIS, CCSA, ETSI, TTA, TTC), Jun. 2013, Valbonne, France, 346 pages.

"3rd Generation Partnership Project; Technical Specification Group Radio Access Network; Evolved Universal Terrestrial Radio Access Network (E-UTRAN); X2 application protocol (X2AP)(Release 11)", 3GPP TS 36.423 V11.5.0, 3GPP Organizational Partners (ARIB, ATIS, CCSA, ETSI, TTA, TIC), Jun. 2013, Valbonne, France, 144 pages.

International Search Report dated Jun. 9, 2014 in corresponding International Patent Application No. PCT/CN2013/082943.

Extended European Search Report dated Jul. 1, 2016 in corresponding European Patent Application No. 13892984.9.

Search Report, dated Sep. 1, 2017, in Chinese Application No. 2013800030053 (2 pp.).

Office Action, dated Sep. 21, 2017, in Chinese Application No. 201380003005.3 (9 pp.).

International Search Report dated Jun. 9, 2014 in corresponding International Application No. PCT/CN2013/082943.

* cited by examiner

100

A base station sends first offloading indication information to a WLAN AP, where the first offloading indication information is used for instructing the WLAN AP to transmit target data between the base station and user equipment, and the first offloading indication information includes identity information of the user equipment, where a piece of identity information is used for uniquely indicating a piece of user equipment in a communications system — S110

The base station performs transmission of the target data with the user equipment through a GTP tunnel by using the WLAN AP, where the target data is all or some data on a bearer — S120

FIG. 4

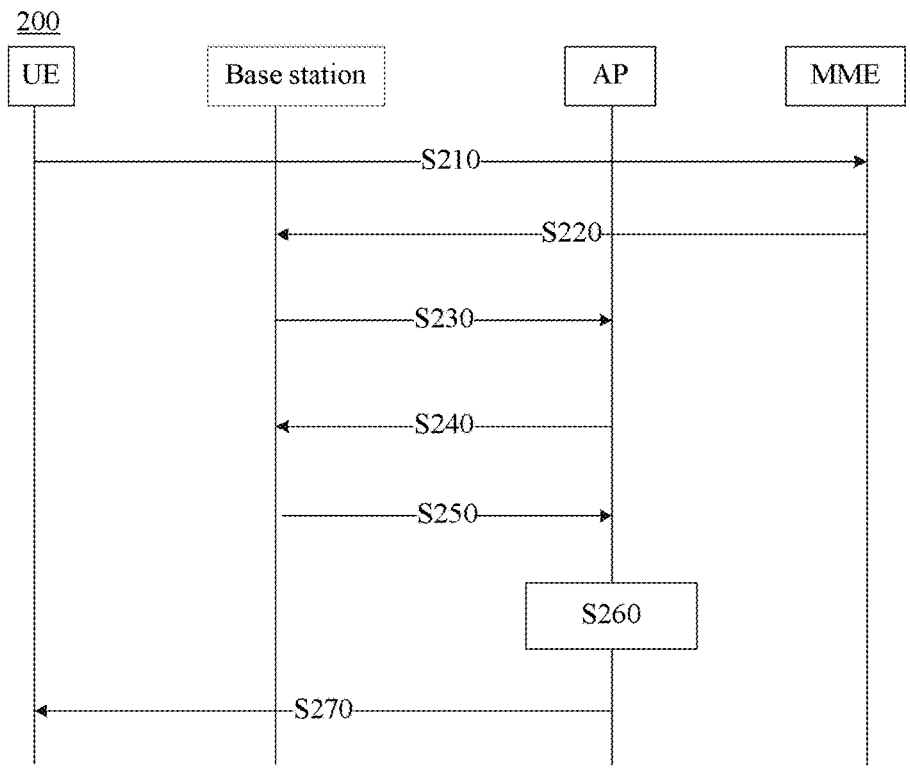

FIG. 5

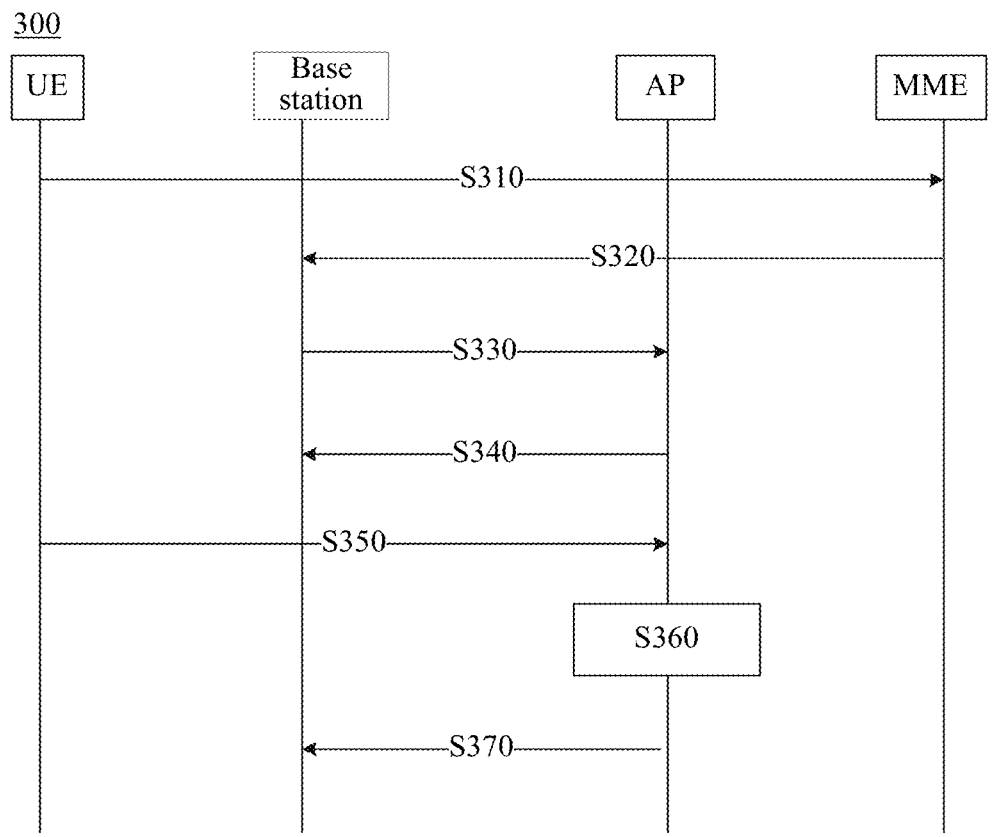

A WLAN AP receives first offloading indication information sent by a base station, where the first offloading indication information is used for instructing the WLAN AP to transmit target data between the base station and user equipment, and the first offloading indication information includes identity information of the user equipment, where a piece of identity information is used for uniquely indicating a piece of user equipment in a communications system — S410

The WLAN AP transmits target data of the user equipment with the base station according to the first offloading indication information and through a GTP tunnel — S420

FIG. 7

DATA TRANSMISSION METHOD, APPARATUS AND SYSTEM

CROSS-REFERENCE TO RELATED APPLICATIONS

This application is a continuation of International Application No. PCT/CN2013/082943, filed on Sep. 4, 2013, which is hereby incorporated by reference in its entirety.

TECHNICAL FIELD

The present invention relates to the communications field, and in particular, to a data transmission method, apparatus and system.

BACKGROUND

With the rapid development of smartphones, an increasing quantity of mobile communications terminals are each integrated with a wireless local area network (WLAN, Wireless Local Area Network) communications module. On the other hand, as people continuously increase a requirement for mobile broadband, an existing (such as, wireless cellular) communications system is under a pressure of an increasing quantity of data traffic. A feasible method is: a wireless cellular technology and a WLAN technology are fused to each other, and data traffic of a mobile cellular communications system is offloaded by using a WLAN, thereby greatly improving experience of a user of a cellular system.

Currently, a known communications technology is: after user equipment (UE, User Equipment) already accesses an evolved packet core (EPC, Evolved Packet Core) by using a base station, and establishes a packet data network (PDN, Public Data Network) connection by using a packet data network-gateway (PDN-GW, Public Data Network-Gateway), the UE may access the EPC by using, such as, a trusted wireless local area network access network (TWAN, Trusted Wireless Local Area Networks Access Network), and the TWAN may select a PDN-GW to create a PDN connection, thereby implementing mutual fusion of the wireless cellular technology and the WLAN technology.

However, in the technology, because offloading fusion is performed by the EPC, and the base station cannot autonomously determine an offloading policy (for example, whether to perform offloading to a WLAN and specific offloading traffic) according to current data traffic in real time and cannot ensure that a PDN-GW used when a PDN connection is established by using the WLAN is the same as a PDN-GW used when a PDN connection is established by using the base station, service continuity cannot be ensured, which severely affects user experience.

Therefore, it is intended to provide a technology that can make a base station autonomously determine an offloading policy, and improve user experience.

SUMMARY

Embodiments of the present invention provide a data transmission method, apparatus and system, which can make a base station autonomously determine an offloading policy, and improve user experience.

A first aspect provides a data transmission method, where the method is executed by a base station in a communications system, the communications system further includes a wireless local area network access point WLAN AP and user equipment, a bearer used to transmit data of the user equipment is disposed between the base station and a gateway device, a General Packet Radio Service Tunneling Protocol GTP tunnel is disposed between the base station and the WLAN AP, and the method includes: sending, by the base station, first offloading indication information to the WLAN AP, where the first offloading indication information is used for instructing the WLAN AP to transmit the target data between the base station and the user equipment, and the first offloading indication information includes identity information of the user equipment, where a piece of identity information is used for uniquely indicating a piece of user equipment in the communications system; and performing, by the base station, transmission of target data with the user equipment through the GTP tunnel by using the WLAN AP, where the target data is all or some data on the bearer.

With reference to the first aspect, in a first implementation manner of the first aspect, the performing, by the base station, transmission of target data with the user equipment through the GTP tunnel by using the WLAN AP includes: determining, by the base station, a first GTP tunnel corresponding to the user equipment; and performing, by the base station, transmission of the target data with the user equipment through the first GTP tunnel by using the WLAN AP.

With reference to the first aspect and the foregoing implementation manner thereof, in a second implementation manner of the first aspect, when the user equipment corresponds to at least two bearers, the performing, by the base station, transmission of target data with the user equipment through the GTP tunnel by using the WLAN AP includes: determining, by the base station, a second GTP tunnel corresponding to a bearer to which the target data belongs; and performing, by the base station, transmission of the target data with the user equipment through the second GTP tunnel by using the WLAN AP.

With reference to the first aspect and the foregoing implementation manners thereof, in a third implementation manner of the first aspect, the base station has a first base station-side protocol stack and a second base station-side protocol stack, the first base station-side protocol stack is configured to implement, on a base station side, data processing on communication with the user equipment, and the second base station-side protocol stack is configured to implement, on the base station side, data processing on communication with the WLAN AP, where the second base station-side protocol stack is connected to at least one protocol layer of the first base station-side protocol stack; and the performing, by the base station, transmission of target data with the user equipment through the GTP tunnel by using the WLAN AP includes: performing, by the base station, transmission of the target data with the user equipment by using at least one layer of the first base station-side protocol stack and the second base station-side protocol stack, through the GTP tunnel, and by using the WLAN AP.

With reference to the first aspect and the foregoing implementation manners thereof, in a fourth implementation manner of the first aspect, when the target data is some data on the bearer, the method further includes: performing, by the base station, transmission of non-target data with the user equipment by using the first base station-side protocol stack, where the non-target data is data in all the data on the bearer except the target data.

With reference to the first aspect and the foregoing implementation manners thereof, in a fifth implementation manner of the first aspect, the second base station-side protocol stack includes an adaptation layer, the adaptation layer is configured to perform conversion processing on data between the at least one protocol layer of the first base station-side protocol stack and the second base station-side protocol stack, and the second base station-side protocol stack is connected to the at least one protocol layer of the first base station-side protocol stack by using the adaptation layer; and the performing, by the base station, transmission of the target data with the user equipment by using at least one layer of the first base station-side protocol stack and the second base station-side protocol stack, through the GTP tunnel, and by using the WLAN AP includes: inputting, by the base station, the downlink target data to the at least one protocol layer of the first base station-side protocol stack, converting, by using the adaptation layer, a data format of data output from the at least one protocol layer of the first base station-side protocol stack into a data format that the second base station-side protocol stack can identify, transmitting the data to the second base station-side protocol stack, and sending the data output from the second base station-side protocol stack to the WLAN AP through the GTP tunnel, so as to send the data to the user equipment by using the WLAN AP; or inputting, by the base station, data obtained from the WLAN AP through the GTP tunnel to the second base station-side protocol stack, converting, by using the adaptation layer, a data format of data output from the second base station-side protocol stack into a data format that the at least one protocol layer of the first base station-side protocol stack can identify, and transmitting the data to the at least one protocol layer of the first base station-side protocol stack, so as to obtain the uplink target data of the user equipment.

With reference to the first aspect and the foregoing implementation manners thereof, in a sixth implementation manner of the first aspect, the method further includes: sending, by the base station, second offloading indication information to the user equipment, where the second offloading indication information is used for instructing to transmit the target data between the user equipment and the WLAN AP.

A second aspect provides a data transmission method, where the method is executed by a wireless local area network access point WLAN AP in a communications system, the communications system further includes a base station and user equipment, a bearer used to transmit data of the user equipment is disposed between the base station and a gateway device, a General Packet Radio Service Tunneling Protocol GTP tunnel is disposed between the base station and the WLAN AP, and the method includes: receiving, by the WLAN AP, first offloading indication information sent by the base station, where the first offloading indication information is used for instructing the WLAN AP to transmit the target data between the base station and the user equipment, and the first offloading indication information includes identity information of the user equipment, where a piece of identity information is used for uniquely indicating a piece of user equipment in the communications system; and transmitting, by the WLAN AP, target data of the user equipment with the base station according to the first offloading indication information and through the GTP tunnel.

With reference to the second aspect, in a first implementation manner of the second aspect, the transmitting, by the WLAN AP, target data of the user equipment with the base station according to the first offloading indication information and through the GTP tunnel includes: determining, by the WLAN AP, a first GTP tunnel corresponding to the user equipment according to user information of the user equipment; and transmitting, by the WLAN AP, the target data of the user equipment with the base station through the first GTP tunnel.

With reference to the second aspect and the foregoing implementation manner thereof, in a second implementation manner of the second aspect, when the user equipment corresponds to at least two bearers, the transmitting, by the WLAN AP, target data of the user equipment with the base station according to the first offloading indication information and through the GTP tunnel includes: receiving, by the WLAN AP, first bearer indication information sent by the base station, and forwarding the first bearer indication information to the user equipment, where the first bearer indication information is used for indicating a bearer to which the downlink target data belongs; or receiving, by the WLAN AP, second bearer indication information sent by the user equipment, and forwarding the second bearer indication information to the base station, where the second bearer indication information is used for indicating a bearer to which the uplink target data belongs.

With reference to the second aspect and the foregoing implementation manners thereof, in a third implementation manner of the second aspect, the WLAN AP has a first WLAN AP-side protocol stack and a second WLAN AP-side protocol stack, the first WLAN AP-side protocol stack is configured to implement, on a WLAN AP side, data processing on communication with the base station, and the second WLAN AP-side protocol stack is configured to implement, on the WLAN AP side, data processing on communication with the user equipment; and the transmitting, by the WLAN AP, target data of the user equipment with the base station according to the first offloading indication information and through the GTP tunnel includes: transmitting, by the WLAN AP, target data of the user equipment with the base station according to the first offloading indication information and by using the first WLAN AP-side protocol stack; and transmitting, by the WLAN AP, the target data with the user equipment according to the first offloading indication information and by using the second WLAN AP-side protocol stack.

With reference to the second aspect and the foregoing implementation manners thereof, in a fourth implementation manner of the second aspect, an adaptation layer is disposed between the first WLAN AP-side protocol stack and the second WLAN AP-side protocol stack, and the adaptation layer is configured to perform conversion processing on data between the first WLAN AP-side protocol stack and the second WLAN AP-side protocol stack; and the transmitting, by the WLAN AP, target data of the user equipment with the base station according to the first offloading indication information and by using the first WLAN AP-side protocol stack includes: inputting, by the WLAN AP according to the first offloading indication information, data obtained from the base station to the first WLAN AP-side protocol stack, converting, by using the adaptation layer, a data format of data output from the first WLAN AP-side protocol stack into a data format that the second WLAN AP-side protocol stack can identify, transmitting the data to the second WLAN AP-side protocol stack, and sending data output from the second WLAN AP-side protocol stack to the user equipment; or inputting, by the WLAN AP according to the first offloading indication information, data obtained from the user equipment to the second WLAN AP-side protocol stack, converting, by using the adaptation layer, a data format of data output from the second WLAN AP-side protocol stack into a data format that the first WLAN AP-side protocol stack can identify, transmitting the data to the first WLAN AP-side protocol stack, and sending data output from the first WLAN AP-side protocol stack to the base station.

With reference to the second aspect and the foregoing implementation manners thereof, in a fifth implementation manner of the second aspect, when the user equipment corresponds to at least two bearers, the transmitting, by the WLAN AP, target data of the user equipment with the base station according to the first offloading indication information and through the GTP tunnel includes: determining, by the WLAN AP according to the identity information of the user equipment, a second GTP tunnel corresponding to a bearer to which the target data belongs; and transmitting, by the WLAN AP, the target data of the user equipment with the base station through the second GTP tunnel.

A third aspect provides a data transmission method, where the method is executed by user equipment in a communications system, the communications system further includes a base station and a wireless local area network access point WLAN AP, a bearer used to transmit data of the user equipment is disposed between the base station and a gateway device, a General Packet Radio Service Tunneling Protocol GTP tunnel is disposed between the base station and the WLAN AP, and the method includes: determining, by the user equipment, that the user equipment needs to perform transmission of target data with the base station through the WLAN AP; and performing, by the user equipment, transmission of the target data with the base station through the WLAN AP, where the target data is transmitted between the WLAN AP and the base station through the GTP tunnel.

With reference to the third aspect, in a first implementation manner of the third aspect, the determining, by the user equipment, that the user equipment needs to perform transmission of target data with the base station through the WLAN AP includes: receiving, by the user equipment, second offloading indication information sent by the base station, where the second offloading indication information is used for instructing to transmit the target data between the user equipment and the WLAN AP; and determining, by the user equipment, according to the second offloading indication information that the user equipment needs to perform transmission of the target data with the base station through the WLAN AP.

With reference to the third aspect and the foregoing implementation manner thereof, in a second implementation manner of the third aspect, the user equipment has a first user equipment-side protocol stack and a second user equipment-side protocol stack, the first user equipment-side protocol stack is configured to implement, on a user equipment side, data processing on communication with the base station, and the second user equipment-side protocol stack is configured to implement, on the user equipment side, data processing on communication with the WLAN AP, where the second user equipment-side protocol stack is connected to at least one protocol layer of the first user equipment-side protocol stack; and the performing, by the user equipment, transmission of target data with the base station through the WLAN AP includes: performing, by the user equipment, transmission of the target data with the base station by using the at least one layer of the first user equipment-side protocol stack and the second user equipment-side protocol stack and through the WLAN AP.

With reference to the third aspect and the foregoing implementation manners thereof, in a third implementation manner of the third aspect, when the target data is some data on the bearer, the method further includes: performing, by the user equipment, transmission of non-target data with the base station by using the first user equipment-side protocol stack, where the non-target data is data in all the data on the bearer except the target data.

With reference to the third aspect and the foregoing implementation manners thereof, in a fourth implementation manner of the third aspect, the second user equipment-side protocol stack includes an adaptation layer, the adaptation layer is configured to perform conversion processing on data between the at least one protocol layer of the first user equipment-side protocol stack and the second user equipment-side protocol stack, and the second user equipment-side protocol stack is connected to the at least one protocol layer of the first user equipment-side protocol stack by using the adaptation layer; and the performing, by the user equipment, transmission of target data with the base station through the WLAN AP includes: inputting, by the user equipment, uplink target data to the at least one protocol layer of the first user equipment-side protocol stack, converting, by using the adaptation layer, a data format of data output from the at least one protocol layer of the first user equipment-side protocol stack into a data format that the second user equipment-side protocol stack can identify, transmitting the data to the second user equipment-side protocol stack, and sending the data output from the second user equipment-side protocol stack to the WLAN AP, so as to send the data to the base station by using the WLAN AP; or inputting, by the user equipment, data obtained from the WLAN AP to the second user equipment-side protocol stack, converting, by using the adaptation layer, a data format of data output from the second user equipment-side protocol stack into a data format that the at least one protocol layer of the first user equipment-side protocol stack can identify, and transmitting the data to the at least one protocol layer of the first user equipment-side protocol stack, so as to obtain downlink target data.

A fourth aspect provides a data transmission apparatus, where a bearer used to transmit data of user equipment is disposed between the apparatus and a gateway device, a General Packet Radio Service Tunneling Protocol GTP tunnel is disposed between the apparatus and the WLAN AP, and the apparatus includes: a first base station-side protocol stack, configured to implement data processing on communication with the user equipment; a second base station-side protocol stack, configured to implement data processing on communication with the WLAN AP, where the second base station-side protocol stack is connected to at least one protocol layer of the first base station-side protocol stack; and a transceiver unit, connected to the second base station-side protocol stack, and configured to perform transmission of target data with the user equipment through the GTP tunnel by using the WLAN AP.

With reference to the fourth aspect, in a first implementation manner of the fourth aspect, the transceiver unit is further configured to send first offloading indication information to the WLAN AP, where the first offloading indication information is used for instructing the WLAN AP to transmit the target data between the base station and the user equipment, and the first offloading indication information includes identity information of the user equipment, where a piece of identity information is used for uniquely indicating a piece of user equipment in the communications system.

With reference to the fourth aspect and the foregoing implementation manner thereof, in a second implementation manner of the fourth aspect, the apparatus further includes: a determining unit, configured to determine a first GTP tunnel corresponding to the user equipment; and the transceiver unit is specifically configured to perform transmission of the target data with the user equipment through the first GTP tunnel by using the WLAN AP.

With reference to the fourth aspect and the foregoing implementation manners thereof, in a third implementation manner of the fourth aspect, when the user equipment corresponds to at least two bearers, the apparatus further includes: a determining unit, configured to determine a second GTP tunnel corresponding to a bearer to which the target data belongs; and the transceiver unit is further configured to perform transmission of the target data with the user equipment by using the WLAN AP and through the second GTP tunnel determined by the determining unit.

With reference to the fourth aspect and the foregoing implementation manners thereof, in a fourth implementation manner of the fourth aspect, the transceiver unit is further connected to the first base station-side protocol stack, and when the target data is some data on the bearer, the transceiver unit is further configured to perform transmission of non-target data with the user equipment by using the first base station-side protocol stack, where the non-target data is data in all the data on the bearer except the target data.

With reference to the fourth aspect and the foregoing implementation manners thereof, in a fifth implementation manner of the fourth aspect, the second base station-side protocol stack includes an adaptation layer, the adaptation layer is configured to perform conversion processing on data between the at least one protocol layer of the first base station-side protocol stack and the second base station-side protocol stack, and the second base station-side protocol stack is connected to the at least one protocol layer of the first base station-side protocol stack by using the adaptation layer.

A fifth aspect provides a data transmission apparatus, where a General Packet Radio Service Tunneling Protocol GTP tunnel is disposed between the apparatus and a base station, a bearer used to transmit data of user equipment is disposed between the base station and a gateway device, and the apparatus includes: a first WLAN AP-side protocol stack, configured to implement data processing on communication with the base station; a second WLAN AP-side protocol stack, connected to the first WLAN AP-side protocol stack, and configured to implement data processing on communication with the user equipment; and a transceiver unit, connected to the first WLAN AP-side protocol stack and the second WLAN AP-side protocol stack, and configured to transmit target data of the user equipment with the base station through the GTP tunnel.

With reference to the fifth aspect, in a first implementation manner of the fifth aspect, the transceiver unit is specifically configured to receive first offloading indication information sent by the base station, where the first offloading indication information is used for instructing the WLAN AP to transmit the target data between the base station and the user equipment, and the first offloading indication information includes identity information of the user equipment, where a piece of identity information is used for uniquely indicating a piece of user equipment in the communications system; and configured to transmit target data of the user equipment with the base station according to the first offloading indication information and through the GTP tunnel.

With reference to the fifth aspect and the foregoing implementation manner thereof, in a second implementation manner of the fifth aspect, the apparatus further includes: a determining unit, configured to determine a first GTP tunnel corresponding to the user equipment according to the identity information of the user equipment; and the transceiver unit is specifically configured to transmit the target data of the user equipment with the base station through the first GTP tunnel determined by the determining unit.

With reference to the fifth aspect and the foregoing implementation manners thereof, in a third implementation manner of the fifth aspect, when the user equipment corresponds to at least two bearers, the transceiver unit is further configured to receive first bearer indication information sent by the base station, and forward the first bearer indication information to the user equipment, where the first bearer indication information is used for indicating a bearer to which the downlink target data belongs; or the transceiver unit is further configured to receive second bearer indication information sent by the user equipment, and forward the second bearer indication information to the base station, where the second bearer indication information is used for indicating a bearer to which the uplink target data belongs.

With reference to the fifth aspect and the foregoing implementation manners thereof, in a fourth implementation manner of the fifth aspect, an adaptation layer is disposed between the first WLAN AP-side protocol stack and the second WLAN AP-side protocol stack, and the adaptation layer is configured to perform conversion processing on data between the first WLAN AP-side protocol stack and the second WLAN AP-side protocol stack.

With reference to the fifth aspect and the foregoing implementation manners thereof, in a fifth implementation manner of the fifth aspect, when the user equipment corresponds to at least two bearers, the apparatus further includes: a determining unit, configured to determine, according to the identity information of the user equipment, a second GTP tunnel corresponding to a bearer to which the target data belongs; and the transceiver unit is further configured to transmit the target data of the user equipment with the base station through the second GTP tunnel determined by the determining unit.

A sixth aspect provides a data transmission apparatus, where the apparatus includes: a first user equipment-side protocol stack, configured to implement data processing on communication with a base station, where a bearer used to transmit data of the user equipment is disposed between the base station and a gateway device, a General Packet Radio Service Tunneling Protocol GTP tunnel is disposed between the base station and a WLAN AP; a second user equipment-side protocol stack, configured to implement data processing on communication with the WLAN AP, where the second user equipment-side protocol stack is connected to at least one protocol layer of the first user equipment-side protocol stack; and a transceiver unit, connected to the second user equipment-side protocol stack, and configured to perform transmission of the target data with the base station through the WLAN AP, where the target data is transmitted between the WLAN AP and the base station through the GTP tunnel.

With reference to the sixth aspect, in a first implementation manner of the sixth aspect, the transceiver unit is further configured to receive second offloading indication information sent by the base station, where the second offloading indication information is used for instructing to transmit the target data between the user equipment and the WLAN AP; and configured to determine according to the second offloading indication information that the user equipment needs to perform transmission of the target data with the base station through the WLAN AP.

With reference to the sixth aspect and the foregoing implementation manner thereof, in a second implementation manner of the sixth aspect, the transceiver unit is further connected to the first user equipment-side protocol stack, and when the target data is some data on the bearer, the transceiver unit is further configured to perform transmission of non-target data with the base station by using the first user equipment-side protocol stack, where the non-target data is data in all the data on the bearer except the target data.

With reference to the sixth aspect and the foregoing implementation manners thereof, in a third implementation manner of the sixth aspect, the second user equipment-side protocol stack includes an adaptation layer, the adaptation layer is configured to perform conversion processing on data between the at least one protocol layer of the first user equipment-side protocol stack and the second user equipment-side protocol stack, and the second user equipment-side protocol stack is connected to the at least one protocol layer of the first user equipment-side protocol stack by using the adaptation layer.

In the data transmission method, apparatus and system according to the embodiments of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 4 is a schematic flowchart of a data transmission method according to an embodiment of the present invention;

FIG. 5 is a schematic interaction diagram of a downlink data transmission method according to an embodiment of the present invention;

FIG. 6 is a schematic interaction diagram of an uplink data transmission method according to an embodiment of the present invention;

FIG. 7 is a schematic flowchart of a data transmission method according to another embodiment of the present invention;

DESCRIPTION OF EMBODIMENTS

Figure 1:
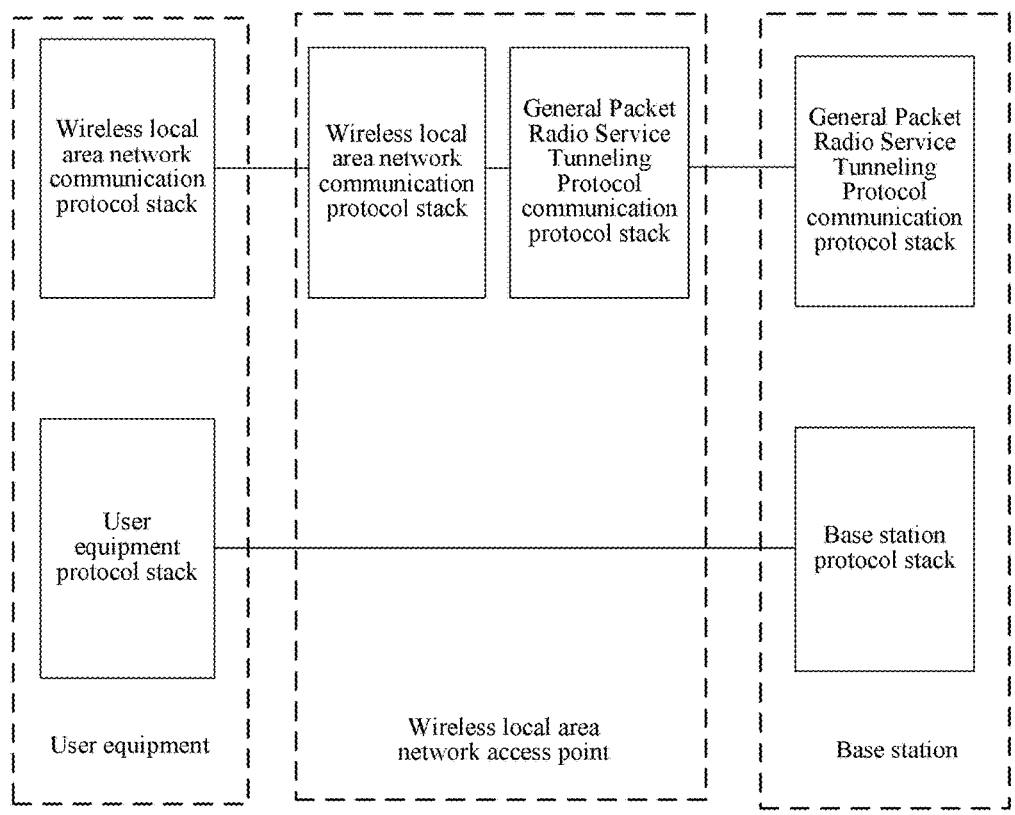
FIG. 1 is a schematic diagram of configuration structures of protocol stacks in devices according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM, Global System of Mobile communication), a Code Division Multiple Access (CDMA, Code Division Multiple Access) system, Wideband Code Division Multiple Access (WCDMA, Wideband Code Division Multiple Access Wireless), a general packet radio service (GPRS, General Packet Radio Service), and Long Term Evolution (LTE, Long Term Evolution), which is not limited in the present invention.

In the embodiments of the present invention, user equipment (UE, User Equipment), also referred to as a mobile terminal (Mobile Terminal), mobile user equipment, and the like, may communicate with one or more core networks by using a radio access network (for example, RAN, Radio Access Network). The user equipment may be a mobile terminal, such as a mobile telephone (also referred to as a "cellular" telephone) and a computer with a mobile terminal. For example, the user equipment may be a portable, pocket-sized, handheld, computer built-in, or in-vehicle mobile apparatus, which exchanges language and/or data with the radio access network, and the present invention is not limited thereto.

A base station may be a base station (BTS, Base Transceiver Station) in the GSM or CDMA, may also be a base station (Node B) in the WCDMA, and may further be an evolved NodeB (eNB or e-Node B, evolutional Node B) in the LTE, which is not limited in the present invention.

In the embodiments of the present invention, to offload data of the base station, in a communications system of the present invention, a wireless local area network access point (WLAN AP, Wireless Local Area Network Access Point) needs to be disposed, and the wireless local area network access point may be, for example, an access point in wireless fidelity (WiFi, Wireless Fidelity), which is not limited in the present invention. For convenience of understanding and description, the WLAN AP is briefly referred to as an AP below.

In the embodiments of the present invention, on a downlink, the base station may transmit, to the AP, data that needs to be offloaded, and send the data to the UE by using the AP. On an uplink, the UE may send, to the AP, data that needs to be offloaded, and send the data to the base station by using the AP. Therefore, in the embodiments of the present invention, a protocol stack configured to implement communication between each other needs to be configured in the base station and the AP, and likewise a protocol stack configured to implement communication between each other needs to be configured in the UE and the AP.

FIG. 1 is a schematic diagram of configuration structures of protocol stacks in devices according to an embodiment of the present invention.

As shown in FIG. 1, in this embodiment of the present invention, a base station and an AP may communicate with each other (specifically, transmit offloaded data) in a General Packet Radio Service Tunneling Protocol (GTP, General Packet Radio Service Tunneling Protocol) communication manner, and therefore a protocol stack configured to implement the GTP communication may be disposed in the base station and the AP.

As shown in FIG. 1, in this embodiment of the present invention, UE and the AP may communicate with each other (specifically, transmit offloaded data) in a wireless local area network communication manner, and therefore a protocol stack configured to implement the wireless local area network communication, such as a WiFi protocol stack, may be disposed in the UE. Because the UE and the AP use the wireless local area network communication manner, and a time frequency resource used by the wireless local area network communication manner is different from a time frequency resource used for communication between the UE and the base station, offloading for the base station can be implemented.

Configuration structures of protocol stacks in the base station are described below.

Optionally, the base station has a first base station-side protocol stack and a second base station-side protocol stack, the first base station-side protocol stack is configured to implement, on a base station side, data processing on communication with the user equipment, and the second base station-side protocol stack is configured to implement, on the base station side, data processing on communication with the WLAN AP, where the second base station-side protocol stack is connected to at least one protocol layer of the first base station-side protocol stack; and the performing, by the base station, transmission of target data with the user equipment through the GTP tunnel by using the WLAN AP includes:

performing, by the base station, transmission of the target data with the user equipment by using at least one layer of the first base station-side protocol stack and the second base station-side protocol stack, through the GTP tunnel, and by using the WLAN AP.

Specifically, the base station includes the first base station-side protocol stack and the second base station-side protocol stack.

As the first base station-side protocol stack, a base station protocol stack may be listed. It should be understood that, the base station protocol stack is only exemplarily described, the present invention is not limited thereto, and other protocol stacks that can implement, on a base station (or core network access node) side, communication between the base station and the user equipment all fall within the protection scope of the present invention. Moreover, the foregoing communication between the base station and the user equipment includes communication between the user equipment and a core network access node that can function as the base station, such as communication between the user equipment and a relay node (RN, Relay Node) that can communicate with the user equipment.

As the second base station-side protocol stack, all or some protocol layers of a GTP protocol stack may be used, where the second base station-side protocol stack may be directly aggregated on at least one protocol layer of the first base station-side protocol stack by using an internal interface, or the second base station-side protocol stack may be aggregated on at least one protocol layer of the first base station-side protocol stack by using an adaptation layer. Subsequently, a function of the adaptation layer is described in detail.

Therefore, on an uplink, before being transmitted to a core network (or a gateway device), data transmitted through the second base station-side protocol stack needs to pass through at least one layer of the first base station-side protocol stack. Therefore, a format of the data can be converted into a data format conforming to communication between an existing base station and the gateway device, that is, a data format in which the data is sent to the gateway device after being subject to processing (such as, format conversion processing) by at least one layer of the first base station-side protocol stack.

Moreover, on an uplink, if data of a same UE is transmitted by using both the first base station-side protocol stack and the second base station-side protocol stack, data transmitted through the first base station-side protocol stack and data transmitted through the second base station-side protocol stack may be aggregated by using at least one protocol layer of the first base station-side protocol stack. Subsequently, the process is described in detail.

Moreover, on a downlink, if data of a same UE is transmitted by using both the first base station-side protocol stack and the second base station-side protocol stack, bearer distinguishing and data packet sequence number setting may be performed, by using at least one protocol layer of the first base station-side protocol stack, on data transmitted through the first base station-side protocol stack and data transmitted through the second base station-side protocol stack. Subsequently, the process is described in detail.

Optionally, in this embodiment of the present invention, the at least one protocol layer of the first base station-side protocol stack includes at least one of the following protocol layers:

a Packet Data Convergence Protocol PDCP layer, a Radio Link Control RLC layer and a Media Access Control MAC layer.

Specifically, in this embodiment of the present invention, some or all the protocol layers of the GTP protocol stack may be used as the second base station-side protocol stack, and in this embodiment of the present invention, the second base station-side protocol stack may include a user plane protocol stack, or may include a user plane protocol stack and a control plane protocol stack, which is not particularly limited in the present invention. Description is made by using an example in which the second base station-side protocol stack is a user plane protocol stack (GTP-U protocol stack) below; therefore, for example, in a case in which a base station protocol stack is used as the first base station-side protocol stack, the GTP-U protocol stack needs to be aggregated on a user plane protocol stack of the base station.

In this embodiment of the present invention, a General Packet Radio Service Tunneling Protocol for the user plane (GTP-U, General Packet Radio Service Tunneling Protocol for the user plane) is used for transmitting a transport protocol data unit (T-PDU, Transport PDU) between two nodes. A tunnel endpoint identifier (TEID, Tunnel Endpoint Identifier) in a GTP header is used for indicating a tunnel to which the T-PDU belongs, so as to multiplex and demultiplex a packet at two ends of a tunnel by using the GTP-U. A TEID value used by a TEID field is obtained by means of negotiation, and a GTP tunnel allows different users, different packet protocols and different quality of service (QoS, Quality of Service) levels to be multiplexed. A T-PDU packet is encapsulated in a G-PDU and transmitted. A G-PDU packet includes a GTP-U header and a T-PDU. A path protocol defines a path, and the GTP-U header defines a tunnel. Multiple tunnels may be multiplexed onto a path. Herein, the structure of the GTP-U protocol stack may be the same as or similar to that in the prior art, and description of the structure is omitted to avoid repeated description herein. Description of a same or similar case is omitted below. The user plane protocol stack of the base station mainly includes a Packet Data Convergence Protocol (PDCP, Packet Data Convergence Protocol) layer, a Radio Link Control (RLC, Radio Link Control) layer, a Media Access Control (MAC, Media Access Control) layer and a physical (PHY, Physical) layer. The PDCP layer is mainly used for compressing and decompressing/encrypting and decrypting information; the RLC layer is mainly used for implementing a related function of an automatic repeat request (ARQ, Automatic Repeat Request), and segmenting and cascading information or reassembling segmented and cascaded information; the MAC layer is mainly used for selecting a transmission format combination, and implementing scheduling and a related function of a hybrid automatic repeat request (HARQ, Hybrid Automatic Repeat Request); the PHY layer is mainly used for providing information transmission service for the MAC layer and a higher layer, and performing encoding modulation processing or demodulation decoding processing according to the selected transmission format combination. It should be noted that, a transmission format of the second base station-side protocol stack is different from a transmission format of the base station protocol stack, and therefore the encoding modulation processing or demodulation decoding processing is also different, and the second base station-side protocol stack does not need to be aggregated on the PHY layer of the base station protocol stack.

Therefore, in this embodiment of the present invention, the second base station-side protocol stack may be aggregated on any protocol layer of the PDCP layer, the RLC layer and the MAC layer.

Optionally, in this embodiment of the present invention, the second base station-side protocol stack may be directly connected to at least one protocol layer of the first base station-side protocol stack by using an internal interface. Specifically, if data transmitted between the base station and the AP does not need to be subject to (such as, format) conversion when passing through the second base station-side protocol stack and at least one protocol layer of the first base station-side protocol stack, the second base station-side protocol stack may be directly connected to at least one protocol layer in the first base station-side protocol stack.

Figure 2A:
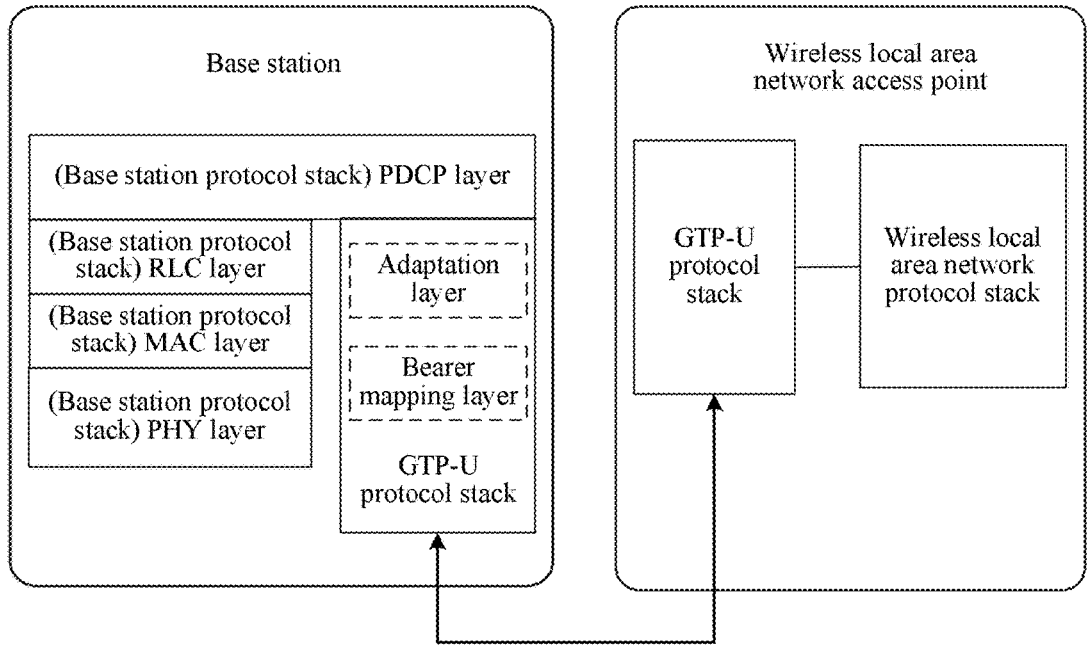
FIG. 2a is a schematic diagram of an example of an aggregation manner of protocol stacks in a base station according to an embodiment of the present invention.
Figure 2B:
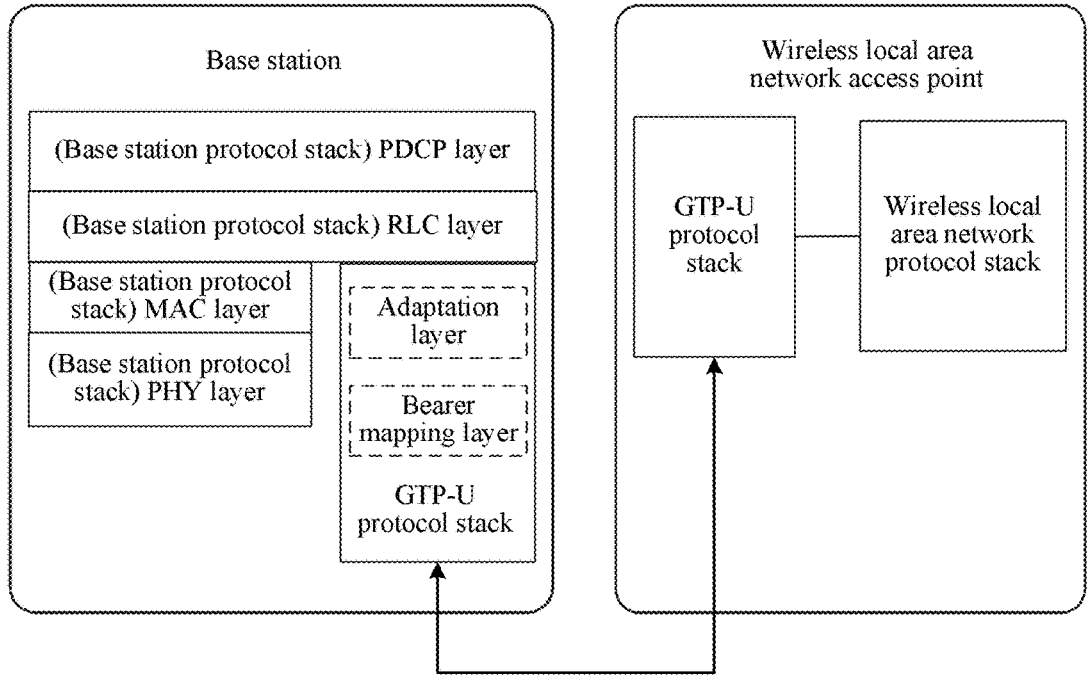
FIG. 2b is a schematic diagram of another example of an aggregation manner of protocol stacks in a base station according to an embodiment of the present invention.
Figure 2C:
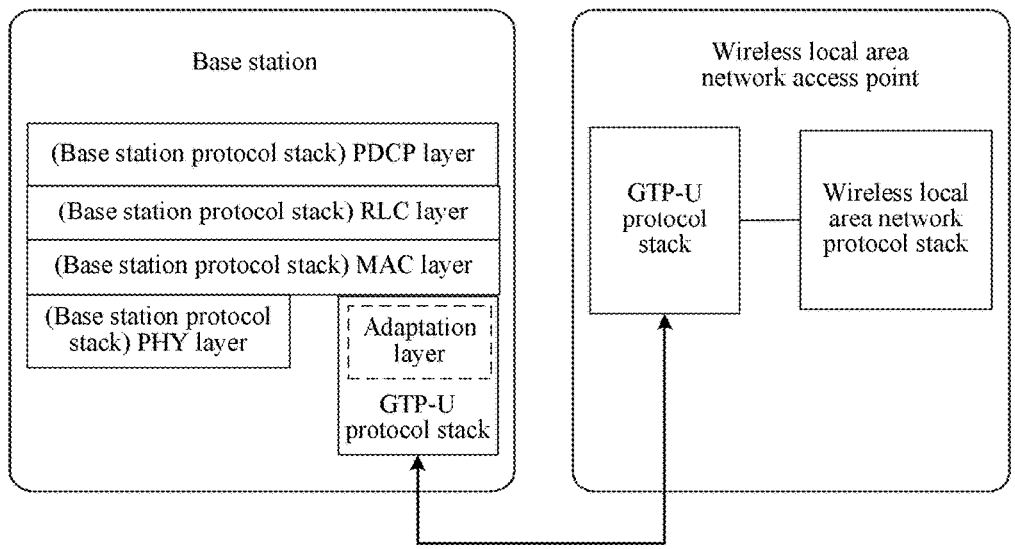
FIG. 2c is a schematic diagram of still another example of an aggregation manner of protocol stacks in a base station according to an embodiment of the present invention.

In a case in which the user plane protocol stack (GTP-U protocol stack) of the GTP protocol stack is used as the second base station-side protocol stack, and the user plane protocol stack of the base station protocol stack is used as the first base station-side protocol stack, as an example but not a limitation, for example, as shown in FIG. 2a, the GTP-U protocol stack may be aggregated on the PDCP layer of the base station protocol stack. For another example, as shown in FIG. 2b, the GTP-U protocol stack may be aggregated on the RLC layer of the base station protocol stack. For another example, as shown in FIG. 2c, the GTP-U protocol stack may be aggregated on the MAC layer of the base station protocol stack.

Optionally, the first base station-side protocol stack includes a resequencing layer, the resequencing layer is configured to determine a location of the target data in all data on a bearer, and the at least one protocol layer of the first base station-side protocol stack is the resequencing layer; and the performing, by the base station, transmission of target data with the user equipment through the GTP tunnel by using the WLAN AP includes:

determining, by the base station, a location of downlink target data of the target data in all downlink data on the bearer by using the resequencing layer, and generating first location indication information by using the resequencing layer, where the first location indication information is used for indicating the location of the downlink target data in all the downlink data on the bearer; and sending, by the base station, the first location indication information to the WLAN AP, so that the user equipment determines the location of the downlink target data in all the downlink data on the bearer according to the first location indication information forwarded by the WLAN AP.

Moreover, the sending, by the base station, the first location indication information to the WLAN AP includes:

encapsulating, by the base station, the first location indication information and the downlink target data in a same data packet by using the resequencing layer and sending the data packet to the WLAN AP.

Optionally, the first base station-side protocol stack includes a resequencing layer, the resequencing layer is configured to determine a location of the target data in all the data on the bearer, and the at least one protocol layer of the first base station-side protocol stack is the resequencing layer; and the performing, by the base station, transmission of target data with the user equipment through the GTP tunnel by using the WLAN AP includes:

obtaining, by the base station by using the resequencing layer, second location indication information forwarded by the WLAN AP, where the second location indication information is used for indicating a location of uplink target data of the target data in all uplink data on the bearer; and determining, by the base station, the location of the uplink target data in all the uplink data on the bearer according to the second location indication information, where the second location indication information is determined by the user equipment and sent to the WLAN AP.

Moreover, the obtaining, by the base station by using the resequencing layer, second location indication information forwarded by the WLAN AP includes:

obtaining, by the base station by using the resequencing layer, the second location indication information from a data packet in which the uplink target data is encapsulated.

Specifically, in this embodiment of the present invention, besides all protocol stacks (including the PDCP layer, the RLC layer, MAC layer and the PHY layer) of the base station protocol stack, the first base station-side protocol stack may be further additionally provided with a protocol layer (resequencing layer), so as to convert data transmitted through the second base station-side protocol stack into a data format conforming to communication between the existing base station and the gateway device.

Figure 2D:
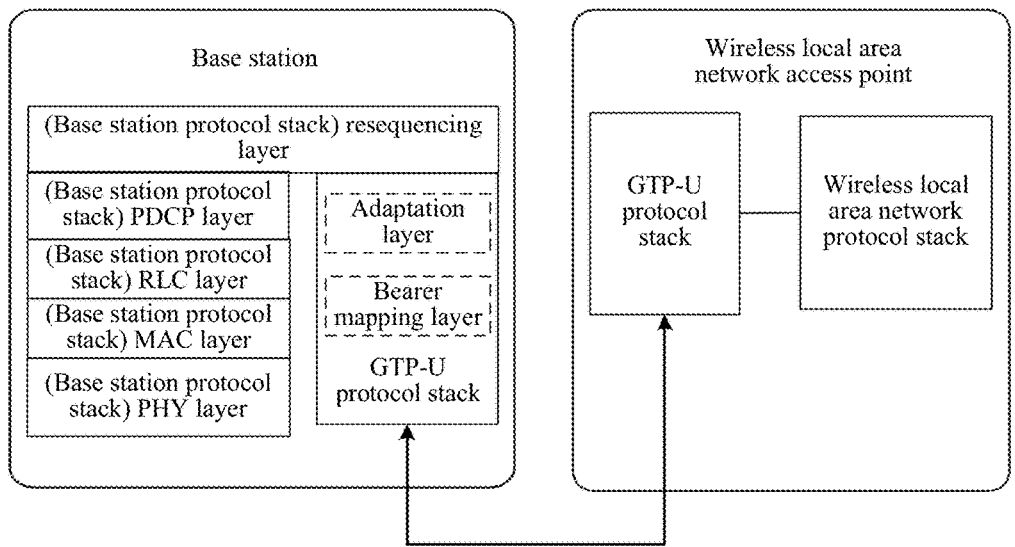
FIG. 2d is a schematic diagram of still another example of an aggregation manner of protocol stacks in a base station according to an embodiment of the present invention.

On an uplink, data of a same UE is transmitted by using both the first base station-side protocol stack and the second base station-side protocol stack, and data transmitted through the first base station-side protocol stack and data transmitted through the second base station-side protocol stack may be aggregated by using the resequencing layer (or bearers of pieces of data are confirmed, so as to perform sequencing according to the bearers). Subsequently, the process is described in detail. On a downlink, data of a same UE is transmitted by using both the first base station-side protocol stack and the second base station-side protocol stack, and bearer distinguishing and data packet sequence number setting may be performed, by using the resequencing layer, on data transmitted through the first base station-side protocol stack and data transmitted through the second base station-side protocol stack. Subsequently, the process is described in detail. In a case in which the user plane protocol stack (GTP-U protocol stack) of the GTP protocol stack is used as the second base station-side protocol stack, and the user plane protocol stack of the base station protocol stack is used as the first base station-side protocol stack, as an example but not a limitation, for example, as shown in FIG. 2d, the GTP-U protocol stack may be aggregated on the resequencing layer of the base station protocol stack.

An example in which the base station obtains data from the core network and sends the data to the user equipment is used, and the base station may be connected to the core network by using an S1 interface, and may obtain data from the core network by using the S1 interface, then process the data by using at least one protocol layer of the base station protocol stack and the GTP-U protocol stack, and send processed data to an AP provided with the GTP protocol stack in a GTP communication manner, and therefore the AP may send the data to the UE in a wireless local area network communication manner. Subsequently, the process is described in detail. An example in which the base station receives data sent by the user equipment and sends the data to the core network is used, the base station may be connected to the core network by using an S1 interface, an AP provided with the GTP protocol stack may receives, in a wireless local area network communication manner, the data sent by the UE, and may send the data to the base station in a GTP communication manner, and the base station may process the data by using the GTP-U protocol stack and at least one protocol layer of the base station protocol stack, and send processed data to the core network by using the S1 interface. Subsequently, the process is described in detail.

Optionally, the second base station-side protocol stack includes an adaptation layer, the adaptation layer is configured to perform conversion processing on data between the at least one protocol layer of the first base station-side protocol stack and the second base station-side protocol stack, and the second base station-side protocol stack is connected to the at least one protocol layer of the first base station-side protocol stack by using the adaptation layer; and the performing, by the base station, transmission of the target data with the user equipment by using at least one layer of the first base station-side protocol stack and the second base station-side protocol stack, through the GTP tunnel, and by using the WLAN AP includes:

inputting, by the base station, the downlink target data to the at least one protocol layer of the first base station-side protocol stack, converting, by using the adaptation layer, a data format of data output from the at least one protocol layer of the first base station-side protocol stack into a data format that the second base station-side protocol stack can identify, transmitting the data to the second base station-side protocol stack, and sending the data output from the second base station-side protocol stack to the WLAN AP through the GTP tunnel, so as to send the data to the user equipment by using the WLAN AP; or inputting, by the base station, data obtained from the WLAN AP through the GTP tunnel to the second base station-side protocol stack, converting, by using the adaptation layer, a data format of data output from the second base station-side protocol stack into a data format that the at least one protocol layer of the first base station-side protocol stack can identify, and transmitting the data to the at least one protocol layer of the first base station-side protocol stack, so as to obtain the uplink target data of the user equipment.

Specifically, as shown in FIG. 2a to FIG. 2d, if data transmitted between the base station and the AP needs to be subject to (such as, format) conversion when passing through the second base station-side protocol stack and at least one protocol layer of the first base station-side protocol stack, an adaptation layer (adaptation layer) used for format conversion may be added between the at least one protocol layer of the first base station-side protocol stack and the second base station-side protocol stack according to a format of data output by the at least one protocol layer of the first base station-side protocol stack and a format of data output by the second base station-side protocol stack. For example, as an example but not a limitation, if the GTP-U protocol stack is aggregated on the PDCP layer of the base station protocol stack, the adaptation layer may be used for performing format conversion processing between the PDCP layer and the GTP-U protocol stack on data. It should be understood that, the foregoing listed connection manner is only exemplarily described, and the present invention is not limited thereto. If the GTP-U protocol stack is aggregated on the RLC layer of the base station protocol stack, the adaptation layer may be used for performing format conversion processing between the RLC layer and the GTP-U protocol stack on data.

An example in which the base station obtains data from the core network and sends the data to the user equipment is used, and the base station may be connected to the core network by using an S1 interface, and may obtain data from the core network by using the S1 interface, then process the data by using at least one protocol layer of the base station protocol stack, the adaptation layer and the GTP-U protocol stack, and send processed data to an AP provided with the GTP protocol stack in a GTP communication manner, and therefore the AP may send the data to the UE in a wireless local area network communication manner. Subsequently, the process is described in detail.

An example in which the base station receives data sent by the user equipment and sends the data to the core network is used, the base station may be connected to the core network by using an S1 interface, an AP provided with the GTP protocol stack may receives, in a wireless local area network communication manner, the data sent by the UE, and may send the data to the base station in a GTP communication manner, and the base station may process the data by using the GTP-U protocol stack, the adaptation layer and at least one protocol layer of the base station protocol stack, and send processed data to the core network by using the S1 interface. Subsequently, the process is described in detail.

In this way, by disposing the adaptation layer, conversion of data between the GTP-U protocol stack and the base station protocol stack can be ensured, and configuration of the GTP-U protocol stack in the base station can be made more flexible.

In this embodiment of the present invention, the GTP-U protocol stack may be disposed in the existing base station (such as, Node B) thereby forming a new access node: Node C (a specific connection manner is described above).

On the other hand, in this embodiment of the present invention, the GTP-U protocol stack may be also disposed in an access network entity located outside the Node B, and connected, by using optic fiber or the like, to the base station protocol stack (at least one protocol layer) disposed in the Node B. For example, as an example but not a limitation, in a heterogeneous network (HetNet), the base station protocol stack may be disposed in a macro base station (Macro), the GTP-U protocol stack may be disposed in another access node connected to the Node B, and the Node B and the another access node that is provided with the GTP-U protocol stack jointly form a Node C. In this embodiment of the present invention, the another access node connected to the Node B may include a micro base station Micro and a pico base station Pico.

Moreover, in this case, multiple Nodes B may share a GTP-U protocol stack disposed in a micro base station Micro or pico base station Pico. Additionally, when a Node B is connected to a Node C (by using optic fiber or the like), the Node B may also use a GTP-U protocol stack disposed in the Node C.

In this way, the existing Node B does not need to be reconstructed, so as to reduce a reconstruction operation of disposing the GTP-U protocol stack in the existing access node, thereby improving practicability of the present invention.

Moreover, in a HetNet system, some nodes may use the Node B, and some nodes may use the Node C according to statistical characteristics of network service distribution. The Node C may be also connected to an access node by using optic fiber or the like to expand coverage.

Configuration structures of protocol stacks in the AP are described below.

Optionally, the WLAN AP has a first WLAN AP-side protocol stack and a second WLAN AP-side protocol stack, the first WLAN AP-side protocol stack is configured to implement, on a WLAN AP side, data processing on communication with the base station, and the second WLAN AP-side protocol stack is configured to implement, on the WLAN AP side, data processing on communication with the user equipment; and the transmitting, by the WLAN AP, target data of the user equipment with the base station according to the first offloading indication information and through the GTP tunnel includes:

transmitting, by the WLAN AP, target data of the user equipment with the base station according to the first offloading indication information and by using the first WLAN AP-side protocol stack; and transmitting, by the WLAN AP, the target data with the user equipment according to the first offloading indication information and by using the second WLAN AP-side protocol stack.

Specifically, the AP includes the first WLAN AP-side protocol stack and the second WLAN AP-side protocol stack.

As the second WLAN AP-side protocol stack, a protocol stack configured to implement the wireless local area network communication may be listed, such as, a WiFi protocol stack. It should be understood that, the WiFi protocol stack is only exemplarily described, the present invention is not limited thereto, and other protocol stacks that can implement, on an AP (or wireless local area network access node) side, communication between the AP and the user equipment all fall within the protection scope of the present invention.

In this embodiment of the present invention, as an example but not a limitation, the WiFi protocol stack may include: a Logical Link Control (LLC, Logical Link Control) layer, a Media Access Control (MAC, Media Access Control) layer, and a Physical Layer (PHY, Physical Layer), where main functions of the LLC layer are to perform transmission reliability guarantee and control, data packet segmentation and reassembly, and data packet sequence transmission. Main functions of the MAC layer are to provide reliable data transmission for a user on an unreliable medium, and provide a distributed coordination function, a centralized control access mechanism, an encrypted service, listening and avoiding, power control and the like. Main functions of the Physical Layer are to perform a Physical Layer convergence process, so as to map a data block to an appropriate physical frame format, and perform encoding modulation processing or demodulation decoding processing and the like.

As the first WLAN AP-side protocol stack, some or all protocol layers of a GTP protocol stack may be used, and in this embodiment of the present invention, the first WLAN AP-side protocol stack may include a user plane protocol stack, or may include a user plane protocol stack and a control plane protocol stack, which is not particularly limited in the present invention. Description is made below by using an example in which the first WLAN AP-side protocol stack is the user plane protocol stack of the GTP protocol stack (the GTP-U protocol stack).

In this embodiment of the present invention, the General Packet Radio Service Tunneling Protocol for the user plane is used for transmitting a transport protocol data unit between two nodes. A tunnel endpoint identifier in a GTP header is used for indicating a tunnel to which the T-PDU belongs, so as to multiplex and demultiplex a packet at two ends of a tunnel by using the GTP-U. A TEID value used by a TEID field is obtained by means of negotiation, and a GTP tunnel allows different users, different packet protocols and different quality of service levels to be multiplexed. A T-PDU packet is encapsulated in a G-PDU and transmitted. A G-PDU packet includes a GTP-U header and a T-PDU. A path protocol defines a path, and the GTP-U header defines a tunnel. Multiple tunnels may be multiplexed onto a path. Herein, the structure of the GTP-U protocol stack may be the same as or similar to that in the prior art, and description of the structure is omitted to avoid repeated description herein.

An example in which the AP obtains data from the base station and sends the data to the user equipment is used, the AP may obtain a data packet from the base station by using the GTP tunnel, and parse the data packet by using the GTP-U protocol stack, so as to obtain data that the base station needs to send to the UE, and then the AP may perform encapsulation processing on the data by using the WiFi protocol stack, and send the data to the UE in the wireless local area network communication manner. Subsequently, the process is described in detail.

An example in which the AP obtains data from the user equipment and sends the data to the base station is used, the AP may receive, in the wireless local area network communication manner, a data packet sent by the UE, and parse the data packet by using the WiFi protocol stack, so as to obtain data that the UE needs to send to the base station, and then the AP may perform encapsulation processing on the data by using the GTP-U protocol stack, and send the data to the base station in the GTP communication manner. Subsequently, the process is described in detail.

It should be noted that, in this embodiment of the present invention, an adaptation layer is disposed between the first WLAN AP-side protocol stack and the second WLAN AP-side protocol stack, and the adaptation layer is configured to perform conversion processing on data between the first WLAN AP-side protocol stack and the second WLAN AP-side protocol stack; and the transmitting, by the WLAN AP, target data of the user equipment with the base station according to the first offloading indication information and by using the first WLAN AP-side protocol stack includes:

inputting, by the WLAN AP according to the first offloading indication information, data obtained from the base station to the first WLAN AP-side protocol stack, converting, by using the adaptation layer, a data format of data output from the first WLAN AP-side protocol stack into a data format that the second WLAN AP-side protocol stack can identify, transmitting the data to the second WLAN AP-side protocol stack, and sending data output from the second WLAN AP-side protocol stack to the user equipment; or inputting, by the WLAN AP according to the first offloading indication information, data obtained from the user equipment to the second WLAN AP-side protocol stack, converting, by using the adaptation layer, a data format of data output from the second WLAN AP-side protocol stack into a data format that the first WLAN AP-side protocol stack can identify, transmitting the data to the first WLAN AP-side protocol stack, and sending data output from the first WLAN AP-side protocol stack to the base station.

Specifically, if data needs to be subject to (such as, format) conversion when passing through the first WLAN AP-side protocol stack and the second WLAN AP-side protocol stack, an adaptation layer used for format conversion may be added between the first WLAN AP-side protocol stack and the second WLAN AP-side protocol stack according to a format of data output by the first WLAN AP-side protocol stack and a format of data output by the second WLAN AP-side protocol stack. For example, on a downlink, the adaptation layer may convert a format of data output from the GTP-U protocol stack into a data format that the WiFi protocol stack can process, and on an uplink, the adaptation layer may convert a format of data output from the WiFi protocol stack into a data format that the GTP-U protocol stack can process.

In this way, by disposing the adaptation layer, format conversion of data between the GTP-U protocol stack and the WiFi protocol stack can be ensured, and configuration of the GTP-U protocol stack in the AP can be made more flexible.

In this embodiment of the present invention, the GTP-U protocol stack may be disposed in the existing AP thereby forming a new access node (a specific connection manner is described above).

On the other hand, in this embodiment of the present invention, the GTP-U protocol stack may be also disposed in a network entity located outside the AP, and connected, by using optic fiber or the like, to the WiFi protocol stack disposed in the AP.

Moreover, in this case, multiple APs may share a GTP-U protocol stack disposed in a network entity.

In this way, the existing AP does not need to be reconstructed, so as to reduce a reconstruction operation of disposing the GTP-U protocol stack in the existing AP, thereby improving practicability of the present invention.

Configuration structures of protocol stacks in the user equipment UE are described below.

Optionally, the user equipment has a first user equipment-side protocol stack and a second user equipment-side protocol stack, the first user equipment-side protocol stack is configured to implement, on a user equipment side, data processing on communication with the base station, and the second user equipment-side protocol stack is configured to implement, on the user equipment side, data processing on communication with the WLAN AP, where the second user equipment-side protocol stack is connected to at least one protocol layer of the first user equipment-side protocol stack; and the performing, by the user equipment, transmission of target data with the base station through the WLAN AP includes:

performing, by the user equipment, transmission of the target data with the base station by using the at least one layer of the first user equipment-side protocol stack and the second user equipment-side protocol stack and through the WLAN AP.

Specifically, the UE includes a first user equipment-side protocol stack and a second user equipment-side protocol stack.

As the first user equipment-side protocol stack, a user equipment protocol stack (specifically, a user plane protocol stack of a user equipment protocol stack) may be listed. It should be understood that, the user equipment protocol stack is only exemplarily described, the present invention is not limited thereto, and other protocol stacks that can implement, on a user equipment side, communication between the base station and the user equipment all fall within the protection scope of the present invention. Moreover, the foregoing communication between the base station and the user equipment includes communication between the user equipment and a core network access node that can function as the base station, such as communication between the user equipment and a relay node (RN, Relay Node) that can communicate with the user equipment.

The user plane protocol stack of the user equipment protocol stack mainly includes a Packet Data Convergence Protocol (PDCP, Packet Data Convergence Protocol) layer, a Radio Link Control (RLC, Radio Link Control) layer, a Media Access Control (MAC, Media Access Control) layer and a physical (PHY, Physical) layer. The PDCP layer is mainly used for compressing and decompressing/encrypting and decrypting information; the RLC layer is mainly used for implementing a related function of an automatic repeat request (ARQ, Automatic Repeat Request), and segmenting and cascading information or reassembling segmented and cascaded information; the MAC layer is mainly used for selecting a transmission format combination, and implementing scheduling and a related function of a hybrid automatic repeat request (HARQ, Hybrid Automatic Repeat Request); the PHY layer is mainly used for providing information transmission service for the MAC layer and a higher layer, and performing encoding modulation processing or demodulation decoding processing according to the selected transmission format combination. It should be noted that, a transmission format of the second user equipment-side protocol stack is different from a transmission format of the user equipment protocol stack, and therefore the encoding modulation processing or demodulation decoding processing is also different, and the second user equipment-side protocol stack does not need to be aggregated on the PHY layer of the user equipment protocol stack.

As the second user equipment-side protocol stack, all or some protocol layers of a WiFi protocol stack may be used, where the second user equipment-side protocol stack may be directly aggregated on or directly connected to at least one protocol layer of the first user equipment-side protocol stack by using an internal interface, or the second user equipment-side protocol stack may be aggregated on at least one protocol layer of the first user equipment-side protocol stack by using an adaptation layer. Subsequently, a function of the adaptation layer is described in detail.

In this embodiment of the present invention, as an example but not a limitation, the WiFi protocol stack may include: a Logical Link Control LLC layer, a Media Access Control MAC layer, and a Physical Layer PHY, where main functions of the LLC layer are to perform transmission reliability guarantee and control, data packet segmentation and reassembly, and data packet sequence transmission. Main functions of the MAC layer are to provide reliable data transmission for a user on an unreliable medium, and provide a distributed coordination function, a centralized control access mechanism, an encrypted service, listening and avoiding, power control and the like. Main functions of the Physical Layer are to perform a Physical Layer convergence process, so as to map a data block to an appropriate physical frame format, and perform encoding modulation processing or demodulation decoding processing and the like.

Therefore, on a downlink, because data transmitted through the second user equipment-side protocol stack needs to pass through at least one layer of the first user equipment-side protocol stack, a format of the data can be converted into a data format that the UE can read, that is, a data format obtained after decapsulation processing (or format conversion processing) is performed by using at least one side of the first user equipment-side protocol stack.

Moreover, on a downlink, if data is transmitted by using both the second user equipment-side protocol stack and the first user equipment-side protocol stack, data transmitted through the first user equipment-side protocol stack and data transmitted through the second user equipment-side protocol stack may be aggregated by using at least one protocol layer of the first user equipment-side protocol stack. Subsequently, the process is described in detail.

Moreover, on an uplink, if data is transmitted by using both the first user equipment-side protocol stack and the second user equipment-side protocol stack, bearer distinguishing and data packet sequence number setting may be performed, by using at least one protocol layer of the first user equipment-side protocol stack, on data transmitted through the first user equipment-side protocol stack and data transmitted through the second user equipment-side protocol stack. Subsequently, the process is described in detail.

Optionally, in this embodiment of the present invention, the at least one protocol layer of the first user equipment-side protocol stack includes at least one of the following protocol layers:

a Packet Data Convergence Protocol PDCP layer, a Radio Link Control RLC layer and a Media Access Control MAC layer.

Specifically, in this embodiment of the present invention, some or all protocol layers of a WIFI protocol stack may be used as the second user equipment-side protocol stack, and in this embodiment of the present invention, the second user equipment-side protocol stack may include a user plane protocol stack, or may include a user plane protocol stack and a control plane protocol stack, which is not particularly limited in the present invention. Description is made by using an example in which the second user equipment-side protocol stack is a user plane protocol stack (WIFI protocol stack) below; therefore, for example, in a case in which a user equipment protocol stack is used as the first user equipment-side protocol stack, the WIFI protocol stack needs to be aggregated on the user equipment protocol stack.

Therefore, in this embodiment of the present invention, the second user equipment-side protocol stack may be aggregated on any protocol layer of the PDCP layer, the RLC layer and the MAC layer.

Optionally, in this embodiment of the present invention, the second user equipment-side protocol stack may be directly connected to at least one protocol layer of the first user equipment-side protocol stack by using an internal interface. Specifically, if data transmitted between the base station and the AP does not need to be subject to (such as, format) conversion when passing through the second user equipment-side protocol stack and at least one protocol layer of the first user equipment-side protocol stack, the second user equipment-side protocol stack may be directly connected to at least one protocol layer in the first user equipment-side protocol stack.

Figure 3A:
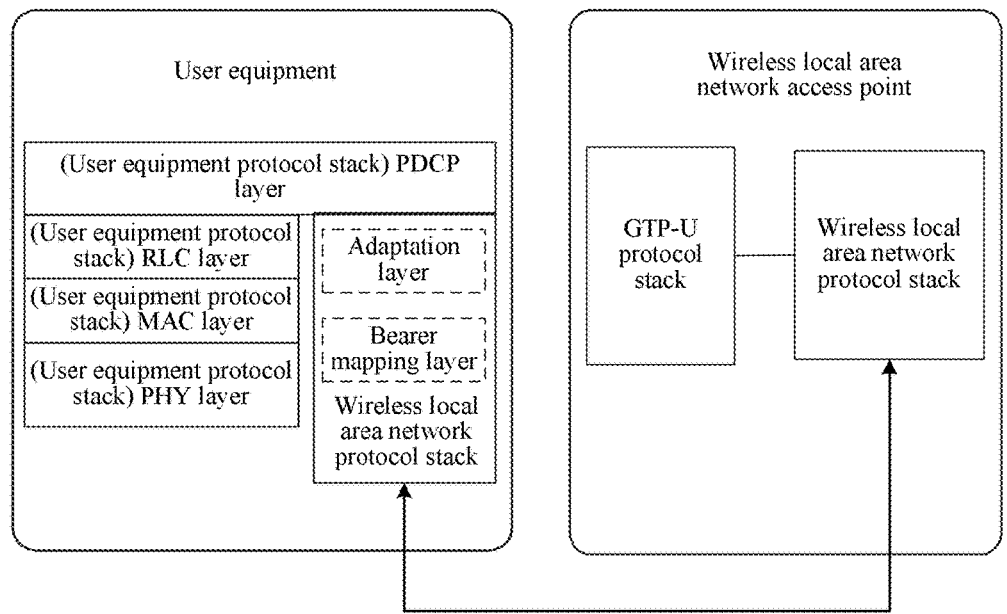
FIG. 3a is a schematic diagram of an example of an aggregation manner of protocol stacks in user equipment according to an embodiment of the present invention.
Figure 3B:
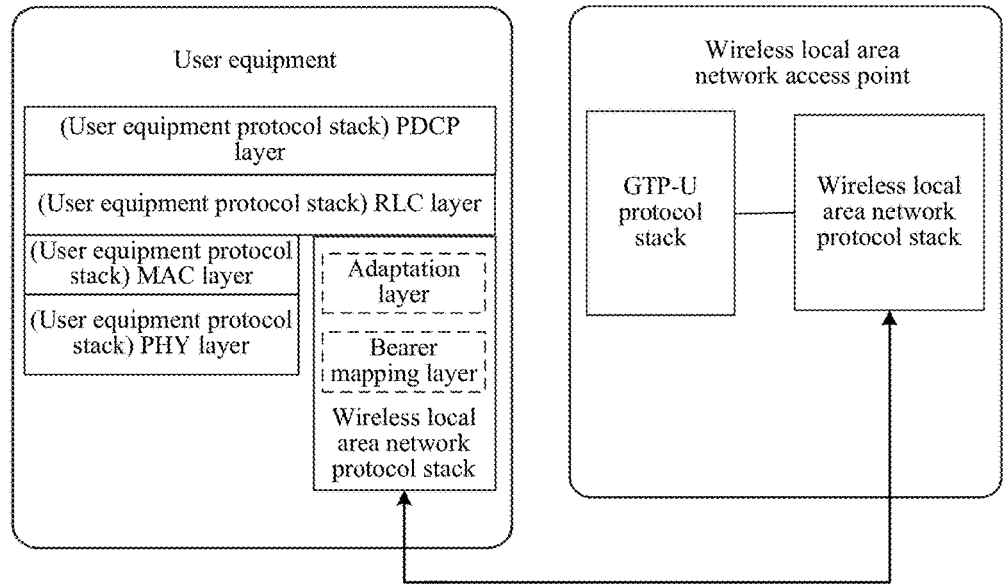
FIG. 3b is a schematic diagram of another example of an aggregation manner of protocol stacks in user equipment according to an embodiment of the present invention.
Figure 3C:
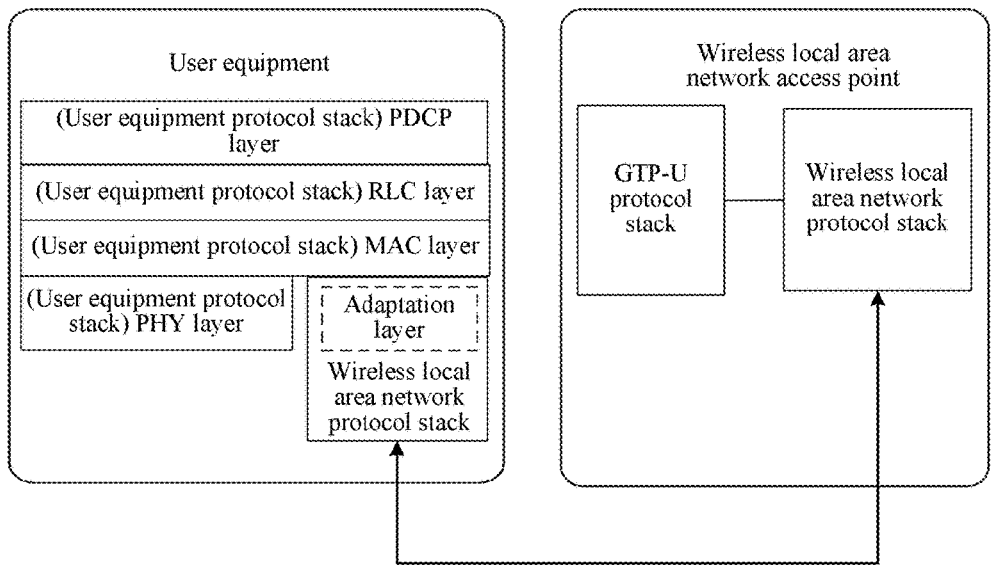
FIG. 3c is a schematic diagram of still another example of an aggregation manner of protocol stacks in user equipment according to an embodiment of the present invention.

In a case in which the user plane protocol stack of the WIFI protocol stack is used as the second user equipment-side protocol stack, and the user plane protocol stack of the user equipment protocol stack is used as the first user equipment-side protocol stack, as an example but not a limitation, for example, as shown in FIG. 3a, the WIFI protocol stack may be aggregated on the PDCP layer of the user equipment protocol stack. For another example, as shown in FIG. 3b, the WIFI protocol stack may be aggregated on the RLC layer of the user equipment protocol stack. For another example, as shown in FIG. 3c, the WIFI protocol stack may be aggregated on the MAC layer of the user equipment protocol stack.

Optionally, the first user equipment-side protocol stack includes a resequencing layer, the resequencing layer is configured to determine a location of the target data in all the data on the bearer, and the at least one protocol layer of the first user equipment-side protocol stack is the resequencing layer; and the performing, by the user equipment, transmission of target data with the base station through the WLAN AP includes:

determining, by the user equipment, a location of the uplink target data of the target data in all uplink data on the bearer by using the resequencing layer, and generating second location indication information by using the resequencing layer, where the second location indication information is used for indicating the location of the uplink target data in all the uplink data on the bearer; and sending, by the user equipment, the second location indication information to the WLAN AP, so that the base station determines the location of the uplink target data in all the uplink data on the bearer according to the second location indication information forwarded by the WLAN AP.

Moreover, the sending, by the user equipment, the second location indication information to the WLAN AP includes:

encapsulating, by the user equipment, the second location indication information and the uplink target data in a same data packet by using the resequencing layer and sending the data packet to the WLAN AP.

Optionally, the first user equipment-side protocol stack includes a resequencing layer, the resequencing layer is configured to determine a location of the target data in all the data on the bearer, and the at least one protocol layer of the first user equipment-side protocol stack is the resequencing layer; and the performing, by the user equipment, transmission of target data with the base station through the WLAN AP includes:

obtaining, by the user equipment by using the resequencing layer, first location indication information forwarded by the WLAN AP, where the first location indication information is used for indicating a location of the downlink target data of the target data in all downlink data on the bearer; and determining, by the user equipment, the location of the downlink target data in all the downlink data on the bearer according to the first location indication information, where the first location indication information is determined by the base station and sent to the WLAN AP.

Moreover, the obtaining, by the user equipment by using the resequencing layer, first location indication information forwarded by the WLAN AP includes:

obtaining, by the user equipment by using the resequencing layer, the first location indication information from a data packet in which the downlink target data is encapsulated.

Specifically, in this embodiment of the present invention, besides all protocol stacks (including the PDCP layer, the RLC layer, MAC layer and the PHY layer) of the user equipment protocol stack, the first user equipment-side protocol stack may be further additionally provided with a protocol layer (resequencing layer), so as to convert data transmitted through the second user equipment-side protocol stack into a data format that the existing user equipment can read.

On a downlink, if data is transmitted by using both the first user equipment-side protocol stack and the second user equipment-side protocol stack, data transmitted through the first user equipment-side protocol stack and data transmitted through the second user equipment-side protocol stack may be aggregated by using the resequencing layer (or bearers of pieces of data are confirmed, so as to perform sequencing according to the bearers). Subsequently, the process is described in detail.

On a downlink, if data is transmitted by using both the first user equipment-side protocol stack and the second user equipment-side protocol stack, bearer distinguishing and data packet sequence number setting may be performed, by using the resequencing layer, on data transmitted through the first user equipment-side protocol stack and data transmitted through the second user equipment-side protocol stack. Subsequently, the process is described in detail.

Figure 3D:
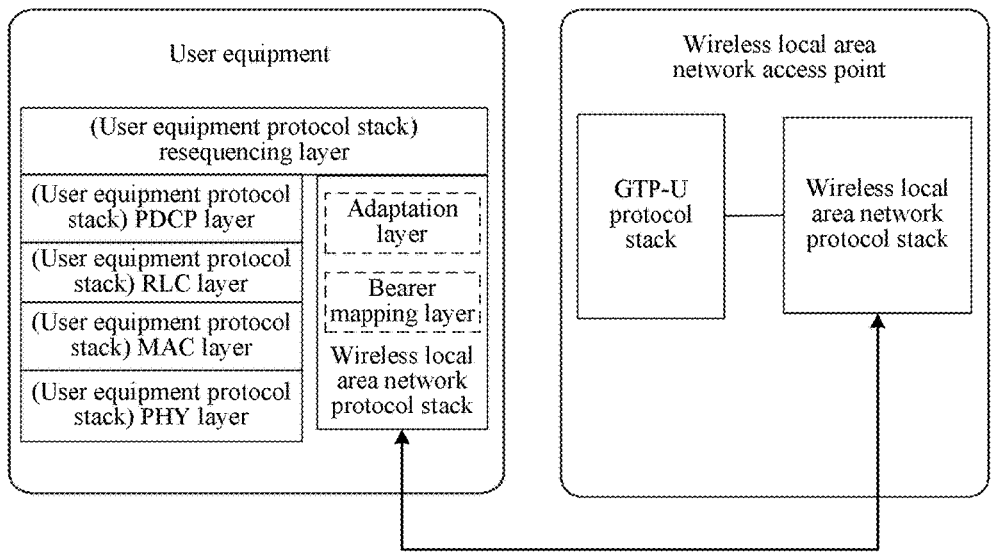
FIG. 3d is a schematic diagram of still another example of an aggregation manner of protocol stacks in user equipment according to an embodiment of the present invention.

In a case in which the user plane protocol stack of the WIFI protocol stack is used as the second user equipment-side protocol stack, and the user plane protocol stack of the user equipment protocol stack is used as the first user equipment-side protocol stack, as an example but not a limitation, for example, as shown in FIG. 3d, the WIFI protocol stack may be aggregated on the resequencing layer of the user equipment protocol stack.

An example in which the UE sends data to the AP is used, the UE may process the data by using at least one protocol layer of the user equipment protocol stack and the WIFI protocol stack, and send processed data to the AP in the WIFI communication manner, and then the AP may send the data to the base station. Subsequently, the process is described in detail.

An example in which the UE receives data sent by the AP is used, and the UE may receive, in the wireless local area network communication manner, a data packet sent by the AP, and may process the data packet by using the WIFI protocol stack and at least one protocol layer of the user equipment protocol stack, so as to obtain data that is sent by the base station to the UE by using the AP. Subsequently, the process is described in detail.

Optionally, the second user equipment-side protocol stack includes an adaptation layer, the adaptation layer is configured to perform conversion processing on data between the at least one protocol layer of the first user equipment-side protocol stack and the second user equipment-side protocol stack, and the second user equipment-side protocol stack is connected to the at least one protocol layer of the first user equipment-side protocol stack by using the adaptation layer; and the performing, by the user equipment, transmission of target data with the base station through the WLAN AP includes:

inputting, by the user equipment, uplink target data to the at least one protocol layer of the first user equipment-side protocol stack, converting, by using the adaptation layer, a data format of data output from the at least one protocol layer of the first user equipment-side protocol stack into a data format that the second user equipment-side protocol stack can identify, transmitting the data to the second user equipment-side protocol stack, and sending the data output from the second user equipment-side protocol stack to the WLAN AP, so as to send the data to the base station by using the WLAN AP; or inputting, by the user equipment, data obtained from the WLAN AP to the second user equipment-side protocol stack, converting, by using the adaptation layer, a data format of data output from the second user equipment-side protocol stack into a data format that the at least one protocol layer of the first user equipment-side protocol stack can identify, and transmitting the data to the at least one protocol layer of the first user equipment-side protocol stack, so as to obtain downlink target data.

Specifically, as shown in FIG. 1, if data transmitted between the UE and the AP needs to be subject to (such as, format) conversion when passing through the second user equipment-side protocol stack and at least one protocol layer of the first user equipment-side protocol stack, an adaptation layer (adaptation layer) used for format conversion may be added between the at least one protocol layer of the first user equipment-side protocol stack and the second user equipment-side protocol stack according to a format of data output by the at least one protocol layer of the first user equipment-side protocol stack and a format of data output by the second user equipment-side protocol stack. For example, as an example but not a limitation, if the WIFI protocol stack is aggregated on the PDCP layer of the user equipment protocol stack, the adaptation layer may be used for performing format conversion processing between the PDCP layer and the WIFI protocol stack on data. It should be understood that, the foregoing listed connection manner is only exemplarily described, and the present invention is not limited thereto. If the WIFI protocol stack is aggregated on the RLC layer of the user equipment protocol stack, the adaptation layer may be used for performing format conversion processing between the RLC layer and the WIFI protocol stack on data.

An example in which the UE sends data to the AP is used, the UE may process the data by using at least one protocol layer of the user equipment protocol stack, the adaptation layer and the WIFI protocol stack, and send processed data to the AP in the WIFI communication manner, and then the AP may send the data to the base station. Subsequently, the process is described in detail.

An example in which the UE receives data sent by the AP is used, and the UE may receive, in the wireless local area network communication manner, a data packet sent by the AP, and may process the data packet by using the WIFI protocol stack, the adaptation layer and at least one protocol layer of the user equipment protocol stack, so as to obtain data that is sent by the base station to the UE by using the AP. Subsequently, the process is described in detail.

In this way, by disposing the adaptation layer, conversion of data between the WIFI protocol stack and the user equipment protocol stack can be ensured, and configuration of the WIFI protocol stack in the UE can be made more flexible.

An action occurring when a base station performs data transmission according to a data transmission method of an embodiment of the present invention is described below.

FIG. 4 is a schematic flowchart of a data transmission method 100 according to an embodiment of the present invention. The method 100 is performed by a base station in a communications system, the communications system further includes a wireless local area network access point WLAN AP and user equipment, a bearer used to transmit data of the user equipment is disposed between the base station and a gateway device, a General Packet Radio Service Tunneling Protocol GTP tunnel is disposed between the base station and the WLAN AP, and the method includes:

S110: The base station sends first offloading indication information to the WLAN AP, where the first offloading indication information is used for instructing the WLAN AP to transmit target data between the base station and the user equipment, and the first offloading indication information includes identity information of the user equipment, where a piece of identity information is used for uniquely indicating a piece of user equipment in the communications system.

S120: The base station performs transmission of the target data with the user equipment through the GTP tunnel by using the WLAN AP, where the target data is all or some data on the bearer.

According to the data transmission method of the present invention, the base station determines to transmit target data of the target user equipment by using the WLAN AP; the base station sends first offloading indication information to the WLAN AP, where the first offloading indication information is used for indicating that the WLAN AP needs to transmit the target data between the base station and the target user equipment, and the first offloading indication information includes identity information of the target user equipment, where a piece of identity information is used for uniquely indicating a piece of user equipment in the communications system; the base station sends second offloading indication information to the target user equipment, where the second offloading indication information is used for indicating that the target user equipment needs to transmit the target data with the WLAN AP; and the base station performs encapsulation processing on downlink target data by using at least one protocol layer of the first base station-side protocol stack and the second base station-side protocol stack, so as to generate a first data packet, and sends the first data packet to the WLAN AP by using a first GTP tunnel, so that the target user equipment receives, according to the second offloading indication information and by using a first carrier used for wireless local area network communication, the second data packet sent by the WLAN AP, where the second data packet is generated and sent after the WLAN AP processes the first data packet according to the first offloading indication information, and the downlink target data is all or some downlink data on the at least one bearer; and/or the base station receives, by using a second GTP tunnel, a third data packet sent by the WLAN AP, and performs decapsulation processing on the third data packet by using at least one protocol layer of the first base station-side protocol stack and the second base station-side protocol stack, so as to obtain uplink target data, where the third data packet is generated and sent after the WLAN AP processes a fourth data packet according to the first offloading indication information, the fourth data packet is generated after the target user equipment performs encapsulation processing on the uplink target data according to the second offloading indication information, and sent to the WLAN AP by using a second carrier used for wireless local area network communication, and the uplink target data is all or some uplink data on the at least one bearer.

Specifically, in this embodiment of the present invention, the target user equipment may access the base station, and access a network side (such as, an EPC) by using the base station, data (including uplink data and downlink data) of the target user equipment is transmitted between the base station and a gateway device (such as, a PDN-GW) on the network side by using a bearer (such as, an evolved packet system (EPS, Evolved Packet System) bearer), a time frequency resource provided by the system may be used between the target user equipment and the base station, and data transmission is performed by using an air interface. The process and the implementation method may be the same as or similar to those in the prior art, and description of the process and the implementation method is omitted to avoid repeated description herein.

The base station may determine whether it is needed to offload data transmission of the target user, that is, transmit all or some of data of the target user by using the AP.

In this embodiment of the present invention, in a case of satisfying an activation condition, the base station may activate the second base station-side protocol stack to perform the foregoing offloading related process.

As an example but not a limitation below, the foregoing activation condition is described.

Condition 1: the base station may monitor a carrier provided by the system and used for transmitting data (of multiple user equipments accessing the base station), and if a ratio of a load to a capacity of a downlink carrier exceeds a threshold (such as, 1), that is, the capacity of the downlink carrier cannot satisfy a requirement, or a ratio of a load to a capacity of an uplink carrier exceeds a threshold (such as, 1), that is, the capacity of the uplink carrier cannot satisfy a requirement, it may be determined that the foregoing activation condition is satisfied.

Condition 2: the target user equipment may request the base station to offload data of the target user equipment, the base station may immediately activate the second base station-side protocol stack according to the request to perform the offloading related process, or the base station may also determine according to the request whether the foregoing condition 1 is satisfied, and in a case of satisfying the foregoing condition 1, activate the second base station-side protocol stack to perform the offloading related process.

It should be understood that, the activation condition, the parameter used for determining the activation condition and the threshold of the parameter that are listed above are only an exemplary description of the present invention, and the present invention is not limited thereto.

After it is determined that the data of the target user equipment needs to be offloaded, the base station needs to instruct the AP and the target user equipment to prepare for offloading.

Then, the base station sends first offloading indication information to the AP, and the first offloading indication information may indicate that the AP needs to send data sent by the base station to the AP to the target user equipment, and may further indicate that the AP needs to send data sent by the target user equipment to the AP to the base station, where the first offloading indication information may be identity information of the target user equipment and be sent to the AP, where a piece of identity information may uniquely indicate a piece of user equipment in the system.

The identity information may include any one piece of the following information:

a MAC address, an Internet Protocol IP address, a basic service set identifier BSSID, an association identifier AID, a mobile subscriber mobile phone number, an international mobile subscriber identity IMSI and an international mobile equipment identity IMEI.

Specifically, in this embodiment of the present invention, identity information of a device refers to information that can uniquely identify the device when the communications system of this embodiment of the present invention is used. It should be noted that, in this embodiment of the present invention, the identity information may be information carried by a device at delivery, or may be allocated by a system for a device, which is not particularly limited in the present invention.

In this embodiment of the present invention, the identity information may include information such as a Media Access Control (MAC, Medium Access Control) address, an Internet Protocol (IP, Internet Protocol) address, a basic service set identifier (BSSID, Basic Service Set IDentifier), an association identifier (AID, Association IDentifier), a mobile subscriber mobile phone number, an international mobile subscriber identity (IMSI, International Mobile Subscriber Identity) and an international mobile equipment identity (IMEI, International Mobile Equipment Identity). It should be understood that, the subscriber identity of this embodiment of the present invention is not limited to the foregoing information, and other information elements that can uniquely embody the subscriber identity all fall within the scope of the embodiments of the present invention.

The AP may determine the target user equipment according to the identity information of the target user equipment, and may determine according to the first offloading indication information that data that the base station sends to the AP needs to be sent to the target user equipment, or determine according to the first offloading indication information that data that the target user equipment sends to the AP needs to be sent to the base station.

Because when the AP and the target user equipment transmit data in the wireless local area network communication manner, a MAC address of the target user equipment needs to be learned, after determining the target user equipment, the AP may further obtain the MAC address of the target user equipment, for example, may obtain the MAC address of the target user equipment from a mobility management entity (MME, Mobility Management Entity) in a system, or may obtain the MAC address of the target user equipment from the target user equipment, or may obtain the MAC address of the target user equipment from the base station, which is not particularly limited in the present invention.

Additionally, in this embodiment of the present invention, the user equipment may carry the MAC address of the user equipment to the MME by using, such as, an attach request (Attach Request) or a tracking area update request (Tracking Area Update Request) message, and therefore the MME may deliver the MAC address of the user equipment to the base station by using, such as, an Initial UE Context Setup Request (Initial UE Context Setup Request) or a UE Context Modify Request (UE Context Modify Request), so that the base station may obtain a MAC address of each user equipment.

Moreover, the base station may send a GTP tunnel endpoint identifier (TEID, Tunnel Endpoint Identifier) that corresponds to the target user equipment and is on the base station side to the AP by using, such as, a UE Association Setup Request (UE Association Setup Request) message, and may receive, by using, such as, a UE Association Setup Response (UE Association Setup Response) message, a GTP TEID that corresponds to the target user equipment, is on an AP side, and is sent by the AP. Therefore, a base station-side GTP TEID may identify an uplink GTP tunnel (a GTP tunnel used when data is transmitted from the AP to the base station), and an AP-side GTP TEID may identify a downlink GTP tunnel (a GTP tunnel used when data is transmitted from the base station to the AP).

Optionally, the performing, by the base station, transmission of target data with the user equipment through the GTP tunnel by using the WLAN AP includes:

determining, by the base station, a first GTP tunnel corresponding to the user equipment; and performing, by the base station, transmission of the target data with the user equipment through the first GTP tunnel by using the WLAN AP.

Specifically, if there is only one piece of UE that needs to perform offloading by using the AP, transmission of target data may be directly performed by using each GTP tunnel, but if there are two or more UEs that need to perform offloading by using the AP, or there are two or more UEs that currently access the AP, a mapping relationship between each GTP and each UE needs to be determined between the base station and the AP. Therefore, for example, when the base station needs to send data (that is, downlink data) to the user equipment (referred to as the target user equipment below for convenience of distinguishing) by using the AP, the base station may send the downlink data (downlink target data) to the AP by using a GTP tunnel (specifically, downlink tunnel) corresponding to the target device, and the AP may determine according to a tunnel through which the received data passes that the data is downlink target data that needs to be sent to the target user equipment. For another example, after receiving the data sent by the target user equipment, the AP may determine according to the foregoing first offloading indication information that the data is data (uplink target data) that needs to be sent to the base station, and therefore the AP may select a GTP tunnel (specifically, an uplink tunnel) corresponding to the target user equipment, and send the uplink target data to the base station by using the GTP tunnel, and the base station may determine according to a tunnel through which the received data passes that the data is uplink target data from the target user equipment.

Optionally, the determining, by the base station, a first GTP tunnel corresponding to the user equipment includes:

determining, by the base station, a first uplink GTP tunnel corresponding to the user equipment; and sending, by the base station, first mapping relationship information to the WLAN AP, where the first mapping relationship information is used for indicating a mapping relationship between a tunnel endpoint identifier TEID of the first uplink GTP tunnel and the user equipment; and the performing, by the base station, transmission of the target data with the user equipment through the first GTP tunnel by using the WLAN AP includes:

when data sent by the WLAN AP is received through the first uplink GTP tunnel, determining, by the base station according to the first mapping relationship, that the received data is uplink target data sent by the user equipment.

Specifically, in this embodiment of the present invention, a GTP tunnel transmitting data may be determined by a receive end of the data, for example, the base station may determine a GTP TEID of an uplink GTP tunnel corresponding to each user equipment, and notify the AP of a mapping relationship (first mapping relationship information) between a GTP TEID of each uplink GTP tunnel and each user equipment (such as, identity information of the user equipment). Therefore, when receiving the uplink data sent by the target user equipment, the AP may find a GTP TEID of an uplink GTP tunnel corresponding to the target user equipment from a first mapping relationship according to the identity information of the target user equipment, then determine the uplink GTP tunnel, and send the uplink data (uplink target data) of the target user equipment to the base station by using the uplink GTP tunnel determined above, and after receiving the data by using the uplink GTP tunnel, the base station may search the foregoing first mapping relationship for the user equipment corresponding to the TEID of the uplink GTP tunnel, so as to determine the target user equipment from which the uplink data is.

Optionally, the determining, by the base station, a first GTP tunnel corresponding to the user equipment includes:

receiving, by the base station, second mapping relationship information sent by the WLAN AP, where the second mapping relationship information is used for indicating a mapping relationship between a TEID of a first downlink GTP tunnel and the user equipment; and determining, by the base station, the first downlink GTP tunnel according to the second mapping relationship information; and the performing, by the base station, transmission of the target data with the user equipment through the first GTP tunnel by using the WLAN AP includes:

sending, by the base station, downlink target data to the WLAN AP through the first downlink GTP tunnel, so that after receiving the data through the first downlink GTP tunnel, the WLAN AP determines the user equipment according to the second mapping relationship information, and forwards the downlink target data to the user equipment.

Specifically, in this embodiment of the present invention, a GTP tunnel transmitting data may be determined by a receive end of the data, for example, the AP may determine a GTP TEID of a downlink GTP tunnel corresponding to each user equipment, and notify the base station of a mapping relationship (second mapping relationship information) between a GTP TEID of each downlink GTP tunnel and each user equipment (such as, identity information of the user equipment). Therefore, when needing to send downlink data to the target user equipment by using the AP, the base station may find a GTP TEID of a downlink GTP tunnel corresponding to the target user equipment from a second mapping relationship according to the identity information of the target user equipment, then determine the downlink GTP tunnel, and send the downlink data (downlink target data) of the target user equipment to the AP by using the downlink GTP tunnel determined above, and after receiving the data by using the downlink GTP tunnel, the AP may search the foregoing second mapping relationship for the user equipment corresponding to the TEID of the downlink GTP tunnel, so as to determine the target user equipment to which the downlink data needs to be sent.

Because the foregoing established GTP tunnel corresponds to the target user equipment, the base station and the AP may determine by using a tunnel transmitting data (or a GTP TEID carried in a data packet) that the data belongs to the target user equipment.

It should be noted that, if multiple bearers configured to transmit the target user equipment are disposed between the base station and the gateway device, a same quantity of GTP tunnels may be established between the base station and the AP, so that the multiple bearers and the multiple GTP tunnels (specifically, is multiple GTP TEID) are in a one-to-one correspondence. Therefore, the bearers to which data belongs may be distinguished by using the GTP tunnels. Subsequently, the process is described in detail.

The method further includes:

sending, by the base station, second offloading indication information to the user equipment, where the second offloading indication information is used for instructing to transmit the target data between the user equipment and the WLAN AP.

Specifically, the base station sends second offloading indication information to the target user equipment, where the second offloading indication information may indicate that the target user equipment needs to receive data that the AP sends to the target user equipment, and may further indicate that the target user equipment needs to send specified data (target data) to the AP, or the second offloading indication information may indicate that the target user equipment needs to activate the second user equipment-side protocol stack, so as to perform the offloading related process, which is subsequently described in detail.

It should be noted that, the specified data may be all or some of data that the target user equipment needs to send to the base station (or EPC), which is not particularly limited in the present invention. Moreover, when the target data is some of the data that the target user equipment needs to send to the base station (or EPC), the second offloading indication information may include a target data indication information element, where the target data indication information element may indicate that the target data is which specific part of the data that the target user equipment needs to send to the base station (or EPC), for example, the target data indication information element may indicate a time domain resource or frequency domain resource corresponding to the target data, or a time domain resource or frequency domain resource used for bearing the target data when the target user equipment directly sends the target device to the base station.

Moreover, the second offloading indication information may include an AP indication information element indicating the AP, so that the target user equipment determines, according to the AP indication information element, the AP used in offloading, where if the target user equipment has not yet accessed the AP, the second offloading indication information may further include an access indication information element, so that the target user equipment accesses the AP according to the AP indication information element and the access indication information element.

In this embodiment of the present invention, after the AP and the target user equipment make the foregoing offloading preparation, acknowledgement information may be sent to the base station.

Therefore, after receiving the acknowledge information, the base station may perform an offloading operation.

An action occurring when a base station performs offloading on target user equipment (such as, of multiple user equipments) by using an AP on a downlink is described below.

The base station may receive (for example, by using an S1 interface) downlink data that is sent by a gateway device (such as, PDN-GW), is from a network side (such as, an EPC) and needs to be sent to the target user equipment, and determine, from the data, downlink target data that needs to be sent to the target user by using the AP, where the downlink target data is referred to as data A below.

In this embodiment of the present invention, a bearer used to transmit data of the target user equipment is disposed between the base station and the gateway device (case 1); or multiple bearers configured to transmit data of the target user equipment are disposed between the base station and the gateway device (case 2).

Case 1

The base station performs encapsulation processing on the data A by using at least one protocol layer of the first base station-side protocol stack and the second base station-side protocol stack, so as to generate a data packet A conforming to the GTP communication manner (an example of a first data packet), where the data packet A carries a GTP TEID that corresponds to the target user equipment and is allocated by the AP (referred to as a GTP TEID on an AP side below) which is described above, determines a downlink GTP tunnel corresponding to the GTP TEID on the AP side according to the aforementioned determined second mapping relationship, and sends the data packet A to the AP.

After receiving the data packet A, the AP may perform decapsulation processing on the data packet A by using the first WLAN AP-side protocol stack (or the first WLAN AP-side protocol stack and the adaptation layer), so as to obtain the AP-side GTP TEID corresponding to the target user equipment and the data A, may determine according to the AP-side GTP TEID and the aforementioned determined second mapping relationship that the data A needs to be sent to the target user equipment, then may perform encapsulation processing on the data A by using the second WLAN AP-side protocol stack (or the second WLAN AP-side protocol stack and the adaptation layer), so as to generate a data packet B conforming to the wireless local area network communication manner (an example of a second data packet), and send the data packet B to the target user equipment by using a carrier used in the wireless local area network communication manner (an example of a first carrier).

The target user equipment may receive the data packet B by using the first carrier, and perform decapsulation processing on the data packet B by using at least one protocol layer of the first user equipment-side protocol stack and the second user equipment-side protocol stack, thereby obtaining the data A.

Case 2

Because at least two bearers are disposed between the base station and the gateway device, the user equipment needs to learn a bearer to which each piece of data carried in a data packet sent by the AP belongs, so as to reliably restore data from a network side, so that the AP also needs to learn a bearer to which each piece of data sent by the base station belongs. When a data packet sent to the target user equipment is encapsulated, an identifier (third bearer indication information) indicating a bearer to which each piece of data belongs is added to the data packet, and the encapsulation process may be the same as or similar to that in the prior art. Description of the encapsulation process is omitted herein to avoid repeated description, and a process and a method in which the base station notifies the AP of a bearer to which each piece of data belongs are mainly described below.

Optionally, the second base station-side protocol stack includes a bearer mapping layer, and the bearer mapping layer is configured to determine the bearer to which the target data belongs; and when the user equipment corresponds to at least two bearers, the performing, by the base station, transmission of target data with the user equipment through the GTP tunnel by using the WLAN AP includes:

determining, by the base station, a bearer to which downlink target data of the target data belongs by using the bearer mapping layer, and generating first bearer indication information by using the bearer mapping layer, where the first bearer indication information is used for indicating the bearer to which the downlink target data belongs; and sending, by the base station, the first bearer indication information to the WLAN AP, so that the user equipment determines, according to the first bearer indication information forwarded by the WLAN AP, the bearer to which the downlink target data belongs.

Moreover, the sending, by the base station, the first bearer indication information to the WLAN AP includes:

encapsulating, by the base station, the first bearer indication information and the downlink target data in a same data packet by using the bearer mapping layer and sending the data packet to the WLAN AP.

Specifically, in this embodiment of the present invention, for example, the data A from the network side includes data A1 to data An, where n is the same as a quantity of bearers used when the data A is transmitted between the base station and the gateway device, when encapsulating a data packet (for example, by using at least one layer of the base station protocol stack and the GTP protocol stack), the base station may add, to the data packet, indication information (first bearer indication information) used for indicating bearers to which the data A1 to the data An belong, and therefore the AP may learn, according to the first bearer indication information, the bearers to which the data A1 to the data An that are sent by the base station belong.

It should be noted that, the MAC layer of the base station protocol stack has a function of identifying a bearer shown by data, and therefore, in this embodiment of the present invention, when the GTP protocol stack is aggregated on the MAC protocol stack of the base station protocol stack, the first bearer indication information may be encapsulated in the data packet by using the MAC layer.

Moreover, in this embodiment of the present invention, there may be one or n data packets generated when the base station performs encapsulation processing on the data A1 to the data An, which is not particularly limited in the present invention. Additionally, in a case of generating n data packets, the n data packets may be transmitted to the AP by using one GTP tunnel, or may be transmitted to the AP by using n tunnels, which is not particularly limited in the present invention.

In this embodiment of the present invention, a protocol layer used for encapsulating the first bearer indication information in a data packet (an example of a bearer mapping layer) may be further added to the base station protocol stack, and the GTP protocol stack is aggregated on the bearer mapping layer. Moreover, in this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

Therefore, the AP may learn, according to the first bearer indication information, bearers to which data D1 to data Dn that are sent by the base station belong. It should be noted that, the MAC layer of the WiFi protocol stack has a function of identifying a bearer shown by data, and therefore, in this embodiment of the present invention, when the WiFi protocol stack of the AP is aggregated on the MAC protocol stack of the GTP protocol stack, the first bearer indication information may be obtained from the data packet by using the MAC layer. Moreover, in this embodiment of the present invention, a protocol layer used for obtaining the first bearer indication information from the data packet (an example of a bearer mapping layer) may be further added to the GTP protocol stack, and the WiFi protocol stack is aggregated on the bearer mapping layer.

It should be noted that, if a bearer to which data belongs is indicated in a manner of adding bearer indication information to a data packet, the base station and the AP may determine, according to the first mapping relationship information and the second mapping relationship information that are determined above, user equipment to which data transmitted between each other belongs.

Optionally, when the user equipment corresponds to at least two bearers, the performing, by the base station, transmission of target data with the user equipment through the GTP tunnel by using the WLAN AP includes:

determining, by the base station, a second GTP tunnel corresponding to a bearer to which the target data belongs; and performing, by the base station, transmission of the target data with the user equipment through the second GTP tunnel by using the WLAN AP.

Moreover, the determining, by the base station, a second GTP tunnel corresponding to a bearer to which the target data belongs includes:

receiving, by the base station, fourth mapping relationship information sent by the WLAN AP, where the fourth mapping relationship information is used for indicating a mapping relationship between a TEID of a second downlink GTP tunnel and a bearer to which the downlink target data belongs; and determining the second downlink GTP tunnel according to the fourth mapping relationship information; and the performing, by the base station, transmission of the target data with the user equipment through the second GTP tunnel by using the WLAN AP includes:

sending, by the base station, the downlink target data to the WLAN AP through the second downlink GTP tunnel, so that after receiving the downlink target data through the second downlink GTP tunnel, the WLAN AP determines, according to the fourth mapping relationship information, the bearer to which the downlink target data belongs, and determines the user equipment according to the bearer to which the downlink target data belongs and information about the bearer, so as to send the downlink target data to the user equipment.

Specifically, in this embodiment of the present invention, n downlink GTP tunnels may be established between the base station and the AP, so that each downlink GTP tunnel is only used for transmitting downlink data on a bearer. Moreover, in this embodiment of the present invention, first offloading information may further include bearer indication information, where the bearer indication information is used for indicating each bearer corresponding to the user equipment. The AP may allocate an AP-side GTP TEID for each downlink GTP tunnel, and notify the base station of a mapping relationship between each AP-side GTP TEID and each downlink GTP tunnel, and the AP may determine a mapping relationship (a fourth mapping relationship) between each bearer corresponding to the target user equipment and each downlink GTP tunnel, and therefore the base station may perform encapsulation processing on the data A1 to the data An according to the mapping relationship between each AP-side GTP TEID and each downlink GTP tunnel and the mapping relationship between each bearer and each downlink GTP tunnel to generate n data packets, and transmit each data packet by using a tunnel corresponding to each piece of data.

For example, the base station may encapsulate the AP-side GTP TEID of the downlink GTP tunnel corresponding to the data A1 in the data packet A1, and send the data packet A1 to the AP. The base station may generate the data packet A2 to the data packet An by using a similar method and send the data packet A2 to the data packet An to the AP.

After performing decapsulation processing on the data packet A1, the AP can learn the AP-side GTP TEID of the downlink GTP tunnel corresponding to the data A1, and therefore can determine the downlink GTP tunnel transmitting the data packet A1. Moreover, the AP may determine, according to the downlink GTP tunnel transmitting the data packet A1 and the mapping relationship (the fourth mapping relationship) between each bearer and each GTP tunnel that is determined above, a bearer to which the data A1 carried in the data packet A1 belongs.

The AP may determine bearers to which the data A2 to the data An belong by using a similar method. Therefore, the AP may determine the bearers to which the data A2 to the data An belong and the foregoing bearer information, and determine that the data is downlink target data that needs to be sent to the target user equipment.

Then, the AP may perform encapsulation processing on the data A1 to the data An by using the second WLAN AP-side protocol stack (or the second WLAN AP-side protocol stack and the adaptation layer), so as to generate one or more data packets conforming to the wireless local area network communication manner (another example of a second data packet), and send the one or more data packets to the target user equipment by using a carrier used in the wireless local area network communication manner (an example of a first carrier), and the data packet herein may carry the indication information used for indicating the bearers to which the data A1 to the data An belong.

The target user equipment may receive one or more data packets by using the first carrier, and perform decapsulation processing on the one or more data packets by using at least one protocol layer of the first user equipment-side protocol stack and the second user equipment-side protocol stack, thereby obtaining the data A from the network side.

Herein, the data A from the network side includes the data A1 to the data An, where n is the same as a quantity of bearers used when the data A is transmitted between the base station and the gateway device, and the user equipment may learn, by using the indication information that is used for indicating the bearers to which the data A1 to the data An belong and is carried in the data packet sent by using the AP, the bearers to which the data A1 to the data An that are sent by the base station belong.

It should be noted that, the MAC layer of the user equipment protocol stack has a function of identifying a bearer shown by data, and therefore, in this embodiment of the present invention, when the WiFi protocol stack is aggregated on the MAC protocol stack of the user equipment protocol stack, the bearer to which the data A1 to the data An belong may be determined by using the MAC layer.

Alternatively, a protocol layer used for determining the bearers to which the data A1 to the data An belong (an example of a bearer mapping layer) may be further added to the user equipment protocol stack, and the WiFi protocol stack is aggregated on the bearer mapping layer.

Moreover, in this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

Optionally, when the target data is some data on the bearer, the method further includes:

performing, by the base station, transmission of non-target data with the user equipment by using the first base station-side protocol stack, where the non-target data is data in all the data on the bearer except the target data.

Specifically, when the downlink target data is some downlink data on the at least one bearer, the method further includes: performing, by the base station, encapsulation processing on downlink non-target data by using the first base station-side protocol stack, so as to generate a fifth data packet, where the downlink non-target data is data of all downlink data on the at least one bearer except the downlink target data; and sending, by the base station, the fifth data packet to the target user equipment by using a third carrier, so that the target user equipment performs decapsulation processing on the fifth data packet by using the first user equipment-side protocol stack, so as to obtain the downlink non-target data, and determines all the downlink data on the at least one bearer according to the downlink non-target data and the downlink target data, where the third carrier is a carrier used for communication between the base station and the user equipment.

For example, when the data A is from the network side and is a part of all data that needs to be sent to the target user equipment, the base station further needs to send a residual part (referred to as data C below) to the target user equipment by using a carrier used for communication between the base station and the user equipment (an example of a third carrier), the process and the method may be the same as or similar to those in the prior art, and description of the process and the method is omitted herein to avoid repeated description.

Therefore, a downlink data transmission process is completed.

FIG. 5 is a schematic interaction diagram of a downlink data transmission method according to an embodiment of the present invention.

As shown in FIG. 5, in S210, UE can send a MAC address of the UE to an MME.

In S220, the MME can send the MAC address of the UE to a base station.

In S230, the base station can send the MAC address of the UE and a base station-side GTP TEID that is allocated for the UE to an AP.

In S240, the AP can send an AP-side GTP TEID allocated by the AP for the UE to the base station.

In S250, the base station can encapsulate the AP-side GTP TEID in a data packet, and send the data packet to the AP.

In S260, the AP determines according to the AP-side GTP TEID that data carried in the data packet needs to be sent to the UE.

In S270, the AP can send the data carried in the data packet to the UE according to the MAC address of the UE.

An action occurring when a base station performs offloading on target user equipment (such as, of multiple user equipments) by using an AP on an uplink is described below.

The user equipment may determine, from uplink data that needs to be sent to the base station (or the network side), uplink target data that needs to be sent to the base station by using the AP, where the uplink target data is referred to as data D below.

In this embodiment of the present invention, a bearer used to transmit data of the target user equipment is disposed between the base station and the gateway device (case 3); or multiple bearers configured to transmit data of the target user equipment are disposed between the base station and the gateway device (case 4).

Case 3

The target user equipment performs encapsulation processing on data D by using at least one protocol layer of the first user equipment-side protocol stack and the second user equipment-side protocol stack, so as to generate a data packet D conforming to the wireless local area network communication manner (an example of a fourth data packet), and sends the data packet D to the AP by using a carrier used in the wireless local area network communication manner (an example of a second carrier).

After receiving the data packet D, the AP may perform decapsulation processing on the data packet D by using the second WLAN AP-side protocol stack (or the second WLAN AP-side protocol stack and the adaptation layer), so as to obtain the data D; then the AP may determine according to the aforementioned received first offloading indication information that the data D needs to be sent to the base station, and therefore may perform encapsulation processing on the data D by using the first WLAN AP-side protocol stack (or the first WLAN AP-side protocol stack and the adaptation layer), so as to generate a data packet E conforming to the GTP communication manner (an example of a second data packet). A GTP TEID (base station-side GTP TEID) that corresponds to the target user equipment and is allocated by the base station is encapsulated in the data packet E, an uplink GTP tunnel corresponding to the base station-side GTP TEID may be determined according to the aforementioned determined first mapping relationship, and the data packet E is sent to the base station.

After receiving the data packet E, the base station may perform decapsulation processing on the data packet E by using at least one protocol layer of the first base station-side protocol stack and the second base station-side protocol stack, so as to obtain the base station-side GTP TEID and the data D, and determine, according to the base station-side GTP TEID and the determined first mapping relationship that is described above, that the data D is uplink data from the target user equipment, and therefore the base station may send (for example, by using an S1 interface), to a gateway device (such as, a PDN-GW), uplink data D that the target user equipment needs to send to a network side (such as, an EPC).

Case 4

Because at least two bearers are disposed between the base station and the gateway device, the base station needs to learn a bearer to which each piece of data carried in a data packet sent by the AP belongs, so as to send each piece of data to the network side accurately, so that the AP also needs to learn a bearer to which each piece of data sent by the target user equipment belongs, and when encapsulating the data packet sent to the AP, the target user equipment may add, to the data packet, an identifier indicating a bearer to which each piece of data belongs.

Optionally, the second base station-side protocol stack includes a bearer mapping layer, and the bearer mapping layer is configured to determine the bearer to which the target data belongs; and when the user equipment corresponds to at least two bearers, the performing, by the base station, transmission of target data with the user equipment through the GTP tunnel by using the WLAN AP includes:

obtaining, by the base station by using the bearer mapping layer, second bearer indication information forwarded by the WLAN AP, where the second bearer indication information is used for indicating a bearer to which uplink target data of the target data belongs; and determining, by the base station according to the second bearer indication information, the bearer to which the uplink target data belongs, where the second bearer indication information is determined by the user equipment and sent to the WLAN AP.

Moreover, the obtaining, by the base station by using the bearer mapping layer, second bearer indication information forwarded by the WLAN AP includes:

obtaining, by the base station by using the bearer mapping layer, the second bearer indication information from a data packet in which the uplink target data is encapsulated.

Specifically, in this embodiment of the present invention, for example, the data D that the target user equipment needs to send to the network side includes data D1 to data Dn, where n is the same as a quantity of bearers used when the data D is transmitted between the base station and the gateway device, when encapsulating a data packet (for example, by using at least one layer of the user equipment protocol stack and the WiFi protocol stack), the target user equipment may add, to the data packet, indication information (second bearer indication information) used for indicating bearers to which the data D1 to the data Dn belong, and therefore the AP may learn, according to the second bearer indication information, the bearers to which the data D1 to the data Dn that are sent by the target user equipment belong.

It should be noted that, the MAC layer of the user equipment protocol stack has a function of identifying a bearer shown by data, and therefore, in this embodiment of the present invention, when the WiFi protocol stack is aggregated on the MAC protocol stack of the user equipment protocol stack, the second bearer indication information may be encapsulated in the data packet by using the MAC layer.

Moreover, in this embodiment of the present invention, there may be one or n data packets generated when encapsulation processing is performed on the data D1 to the data Dn, which is not particularly limited in the present invention.

Additionally, in this embodiment of the present invention, a protocol layer used for encapsulating the second bearer indication information in a data packet (an example of a bearer mapping layer) may be further added to the user equipment protocol stack, and the WiFi protocol stack is aggregated on the bearer mapping layer. In this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

Therefore, the AP may learn, according to the second bearer indication information, bearers to which data D1 to data Dn that are sent by the user equipment belong. It should be noted that, the MAC layer of the WiFi protocol stack of the AP has a function of identifying a bearer shown by data, and therefore, in this embodiment of the present invention, when the GTP protocol stack of the AP is aggregated on the MAC protocol stack of the WiFi protocol stack, the second bearer indication information may be obtained from the data packet by using the MAC layer. Moreover, in this embodiment of the present invention, a protocol layer used for obtaining the second bearer indication information from the data packet (an example of a bearer mapping layer) may be further added to the GTP protocol stack, and the GTP protocol stack is aggregated on the bearer mapping layer.

It should be noted that, if a bearer to which data belongs is indicated in a manner of adding bearer indication information to a data packet, the base station and the AP may determine, according to the first mapping relationship information and the second mapping relationship information that are determined above, user equipment to which data transmitted between each other belongs.

Optionally, when the user equipment corresponds to at least two bearers, the performing, by the base station, transmission of target data with the user equipment through the GTP tunnel by using the WLAN AP includes:

determining, by the base station, a second GTP tunnel corresponding to a bearer to which the target data belongs; and performing, by the base station, transmission of the target data with the user equipment through the second GTP tunnel by using the WLAN AP.

Moreover, the determining, by the base station, a second GTP tunnel corresponding to a bearer to which the target data belongs includes:

determining, by the base station, a second uplink GTP tunnel corresponding to a bearer to which the uplink target data belongs; and sending, by the base station, third mapping relationship information to the WLAN AP, where the third mapping relationship information is used for indicating a mapping relationship between a TEID of the second uplink GTP tunnel and the bearer to which the uplink target data belongs; and the performing, by the base station, transmission of the target data with the user equipment through the second GTP tunnel by using the WLAN AP includes:

when data sent by the WLAN AP is received through the second uplink GTP tunnel, determining, by the base station according to the third mapping relationship information, a bearer to which the received data belongs; and determining, according to the bearer to which the received data belongs, that the data received through the second uplink GTP tunnel is target uplink data sent by the user equipment.

Specifically, in this embodiment of the present invention, when encapsulating a data packet (for example, by using at least one layer of the user equipment protocol stack and the WiFi protocol stack), the target user equipment may add, to the data packet, indication information (second bearer indication information) used for indicating bearers to which the data D1 to the data Dn belong, and therefore the AP may learn, according to the second bearer indication information, the bearers to which the data D1 to the data Dn that are sent by the target user equipment belong.

It should be noted that, the MAC layer of the user equipment protocol stack has a function of identifying a bearer shown by data, and therefore, in this embodiment of the present invention, when the WiFi protocol stack of the UE is aggregated on the MAC protocol stack of the user equipment protocol stack, the second bearer indication information may be encapsulated in the data packet by using the MAC layer.

Moreover, in this embodiment of the present invention, there may be one or n data packets generated when encapsulation processing is performed on the data D1 to the data Dn, which is not particularly limited in the present invention.

Additionally, in this embodiment of the present invention, a protocol layer used for encapsulating the second bearer indication information in a data packet (an example of a bearer mapping layer) may be further added to the user equipment protocol stack, and the WiFi protocol stack is aggregated on the bearer mapping layer. In this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

The AP may learn, according to the second bearer indication information, bearers to which data D1 to data Dn that are sent by the base station belong. The AP may determine according to the identity information of the user equipment that the data D1 to the data Dn need to be sent to the base station.

N uplink GTP tunnels may be established between the base station and the AP, so that each uplink GTP tunnel is only used for transmitting uplink data on a bearer. The base station may allocate a base station-side GTP TEID for each uplink GTP tunnel, and notify the AP. Moreover, the base station may determine a mapping relationship (a third mapping relationship) between each bearer corresponding to each user equipment and each uplink GTP tunnel, and notify the AP, and therefore the AP may perform encapsulation processing on the data D1 to the data Dn according to the mapping relationship between each base station-side GTP TEID and each uplink GTP tunnel and the mapping relationship between each bearer and each uplink GTP tunnel to generate n data packets, and transmit each data packet by using a tunnel corresponding to each piece of data.

For example, the AP may encapsulate the base station-side GTP TEID of the uplink GTP tunnel corresponding to the data D1 in the data packet D1, and send the data packet D1 to the base station. The AP may generate the data packet D2 to the data packet Dn by using a similar method and send the data packet D2 to the data packet Dn to the base station.

After performing decapsulation processing on the data packet D1, the base station may learn a base station-side GTP TEID of an uplink GTP tunnel corresponding to the data D1, therefore may determine the uplink GTP tunnel transmitting the data packet D1, and then may determine, according to the aforementioned determined third mapping relationship, a bearer to which the uplink data belongs, and the user equipment sending the uplink data.

Then, the base station may send (for example, by using the S1 interface), to a gateway device (such as, a PDN-GW), the aforementioned obtained uplink data that the target user equipment needs to send to a network side (such as, an EPC), and send each piece of data to the network side by using a corresponding bearer.

Optionally, when the target data is some data on the bearer, the method further includes:

performing, by the base station, transmission of non-target data with the user equipment by using the first base station-side protocol stack, where the non-target data is data in all the data on the bearer except the target data.

Specifically, when the data D is a part of all data that the target user equipment needs to send to the network side, the target user equipment further needs to send a residual part (referred to as data F below) to the base station by using a carrier used for communication between the base station and the user equipment (an example of a fourth carrier), the process and the method may be the same as or similar to those in the prior art, and description of the process and the method is omitted herein to avoid repeated description.

Therefore, an uplink data transmission process is completed.

FIG. 6 is a schematic interaction diagram of an uplink data transmission method according to an embodiment of the present invention.

As shown in FIG. 6, in S310, UE can send a MAC address of the UE to an MME.

In S320, the MME can send the MAC address of the UE to a base station.

In S330, the base station can send the MAC address of the UE and a base station-side GTP TEID that is allocated for the UE to an AP.

In S340, the AP can send an AP-side GTP TEID allocated by the AP for the UE to the base station.

In S350, the UE can send a data packet to the AP.

In S360, the AP can determine according to the MAC address that data carried in the data packet needs to be sent to the base station, and can encapsulate the base station-side GTP TEID in the data packet and send the data packet to the base station.

In S370, the base station determines according to the base station-side GTP TEID that the data carried in the data packet is from the UE.

It should be noted that, an embodiment in which the AP communicating with the base station (which is briefly referred to as an AP 1 below for convenience of distinguishing) directly transmits data with the user equipment is listed above, but the present invention is not limited thereto. For example, when the user equipment passes through an AP not communicating with the base station (which is briefly referred to as an AP 2 below for convenience of distinguishing), on a downlink, the base station may send downlink data to the AP 1, the AP 1 transmits the downlink data to the AP 2 in the wireless local area network communication manner, and therefore the AP 2 may transmit the downlink data to the user equipment. On an uplink, the user equipment may transmit uplink data to the AP 2, and the AP 2 transmits the downlink data to the AP 1 in the wireless local area network communication manner, and therefore the AP 1 may transmit the uplink data to the base station.

Moreover, in this embodiment of the present invention, the AP 1 and the AP 2 may directly transmit data between each other, or may perform data transmission through another relay device (such as, one or more APs), which is not particularly limited in the present invention.

According to the data transmission method of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

An action occurring when an AP performs data transmission according to a data transmission method of an embodiment of the present invention is described below.

FIG. 7 is a schematic flowchart of a data transmission method 400 according to an embodiment of the present invention. The method 400 is performed by a wireless local area network access point WLAN AP in a communications system, the communications system further includes a base station and user equipment, a bearer used to transmit data of the user equipment is disposed between the base station and a gateway device, a General Packet Radio Service Tunneling Protocol GTP tunnel is disposed between the base station and the WLAN AP, and the method includes:

S410: The WLAN AP receives first offloading indication information sent by the base station, where the first offloading indication information is used for instructing the WLAN AP to transmit target data between the base station and the user equipment, and the first offloading indication information includes identity information of the user equipment, where a piece of identity information is used for uniquely indicating a piece of user equipment in the communications system.

S420: The WLAN AP transmits target data of the user equipment with the base station according to the first offloading indication information and through the GTP tunnel.

According to the data transmission method of the present invention, the WLAN AP receives first offloading indication information sent by the base station, where the first offloading indication information is used for indicating that the WLAN AP needs to transmit the target data of the target user equipment between the base station and the target user equipment, and the first offloading indication information includes identity information of the target user equipment, where a piece of identity information is used for uniquely indicating a piece of user equipment in the communications system; and the WLAN AP receives, according to the first offloading indication information, a first data packet that is sent by the base station by using a first GTP tunnel corresponding to the target user equipment, performs decapsulation processing on the first data packet by using the third protocol stack, so as to obtain downlink target data, obtain a MAC address of the target user equipment, performs encapsulation processing on the downlink target data according to the MAC address of the target user equipment and by using the fourth protocol stack, so as to generate a second data packet, and sends the second data packet to the target user equipment by using a first carrier used for wireless local area network communication, where the downlink target data is all or some downlink data on the at least one bearer; and/or the WLAN AP receives, according to the first offloading indication information, a fourth data packet sent by the target device, performs decapsulation processing on the fourth data packet by using the fourth protocol stack, so as to obtain uplink target data, performs encapsulation processing on the uplink target data by using the third protocol stack, so as to generate a third data packet, and sends the third data packet to the base station by using a second GTP tunnel corresponding to the target user equipment, where the uplink target data is all or some uplink data on the at least one bearer.

Specifically, in this embodiment of the present invention, the target user equipment may access the base station, and access a network side (such as, an EPC) by using the base station, data (including uplink data and downlink data) of the target user equipment is transmitted between the base station and a gateway device (such as, a PDN-GW) on the network side by using a bearer (such as, an evolved packet system (EPS, Evolved Packet System) bearer), a time frequency resource provided by the system may be used between the target user equipment and the base station, and data transmission is performed by using an air interface. The process and the implementation method may be the same as or similar to those in the prior art, and description of the process and the implementation method is omitted to avoid repeated description herein.

The base station may determine whether it is needed to offload data transmission of the target user, that is, transmit all or some of data of the target user by using the AP. In this embodiment of the present invention, in a case of satisfying an activation condition, the base station may activate the second base station-side protocol stack to perform the foregoing offloading related process. After it is determined that the data of the target user equipment needs to be offloaded, the base station needs to instruct the AP and the target user equipment to prepare for offloading.

That is, the base station may send first offloading indication information to the AP, and the first offloading indication information may indicate that the AP needs to send data sent by the base station to the AP to the target user equipment, and may further indicate that the AP needs to send data sent by the target user equipment to the AP to the base station, where the first offloading indication information may be sent to the AP as identity information of the target user equipment, where a piece of identity information may uniquely indicate a piece of user equipment in the system.

Optionally, the identity information includes any one piece of the following information:

a MAC address, an Internet Protocol IP address, a basic service set identifier BSSID, an association identifier AID, a mobile subscriber mobile phone number, an international mobile subscriber identity IMSI and an international mobile equipment identity IMEI.

Specifically, in this embodiment of the present invention, identity information of a device refers to information that can uniquely identify the device when the communications system of this embodiment of the present invention is used. It should be noted that, in this embodiment of the present invention, the identity information may be information carried by a device at delivery, or may be allocated by a system for a device, which is not particularly limited in the present invention.

In this embodiment of the present invention, the identity information may include information such as a Media Access Control (MAC, Medium Access Control) address, an Internet Protocol (IP, Internet Protocol) address, a basic service set identifier (BSSID, Basic Service Set IDentifier), an association identifier (AID, Association IDentifier), a mobile subscriber mobile phone number, an international mobile subscriber identity (IMSI, International Mobile Subscriber Identity) and an international mobile equipment identity (IMEI, International Mobile Equipment Identity). It should be understood that, the subscriber identity of this embodiment of the present invention is not limited to the foregoing information, and other information elements that can uniquely embody the subscriber identity all fall within the scope of the embodiments of the present invention.

The AP may determine the target user equipment according to the identity information of the target user equipment, and may determine according to the first offloading indication information that data that the base station sends to the AP needs to be sent to the target user equipment, or determine according to the first offloading indication information that data that the target user equipment sends to the AP needs to be sent to the base station.

Because when the AP and the target user equipment transmit data in the wireless local area network communication manner, a MAC address of the target user equipment needs to be learned, after determining the target user equipment, the AP may further obtain the MAC address of the target user equipment, for example, may obtain the MAC address of the target user equipment from a mobility management entity (MME, Mobility Management Entity) in a system, or may obtain the MAC address of the target user equipment from the target user equipment, or may obtain the MAC address of the target user equipment from the base station, which is not particularly limited in the present invention.

Additionally, in this embodiment of the present invention, the user equipment may carry the MAC address of the user equipment to the MME by using, such as, an attach request (Attach Request) or a tracking area update request (Tracking Area Update Request) message, and therefore the MME may deliver the MAC address of the user equipment to the base station by using, such as, an Initial UE Context Setup Request (Initial UE Context Setup Request) or a UE Context Modify Request (UE Context Modify Request), so that the base station may obtain a MAC address of each user equipment.

Moreover, the base station may send a GTP tunnel endpoint identifier (TEID, Tunnel Endpoint Identifier) that corresponds to the target user equipment and is on the base station side to the AP by using, such as, a UE Association Setup Request (UE Association Setup Request) message, and may receive, by using, such as, a UE Association Setup Response (UE Association Setup Response) message, a GTP TEID that corresponds to the target user equipment, is on an AP side, and is sent by the AP. Therefore, a base station-side GTP TEID may identify an uplink GTP tunnel (a GTP tunnel used when data is transmitted from the AP to the base station), and an AP-side GTP TEID may identify a downlink GTP tunnel (a GTP tunnel used when data is transmitted from the base station to the AP).

Optionally, the transmitting, by the WLAN AP, target data of the user equipment with the base station according to the first offloading indication information and through the GTP tunnel includes:

determining, by the WLAN AP, a first GTP tunnel corresponding to the user equipment according to user information of the user equipment; and transmitting, by the WLAN AP, the target data of the user equipment with the base station through the first GTP tunnel.

Specifically, if there is only one piece of UE that needs to perform offloading by using the AP, transmission of target data may be directly performed by using each GTP tunnel, but if there are two or more UEs that need to perform offloading by using the AP, or there are two or more UEs that currently access the AP, a mapping relationship between each GTP and each UE needs to be determined between the base station and the AP. Therefore, for example, when the base station needs to send data (that is, downlink data) to the user equipment (referred to as the target user equipment below for convenience of distinguishing) by using the AP, the base station may send the downlink data (downlink target data) to the AP by using a GTP tunnel (specifically, downlink tunnel) corresponding to the target device, and the AP may determine according to a tunnel through which the received data passes that the data is downlink target data that needs to be sent to the target user equipment. For another example, after receiving the data sent by the target user equipment, the AP may determine according to the foregoing first offloading indication information that the data is data (uplink target data) that needs to be sent to the base station, and therefore the AP may select a GTP tunnel (specifically, an uplink tunnel) corresponding to the target user equipment, and send the uplink target data to the base station by using the GTP tunnel, and the base station may determine according to a tunnel through which the received data passes that the data is uplink target data from the target user equipment.

Optionally, the determining, by the WLAN AP, a first GTP tunnel corresponding to the user equipment according to user information of the user equipment includes:

receiving, by the WLAN AP, first mapping relationship information sent by the base station, where the first mapping relationship information is used for indicating a mapping relationship between a tunnel endpoint identifier TEID of a first uplink GTP tunnel corresponding to the user equipment and the user equipment; and determining, by the WLAN AP, the first uplink GTP tunnel according to the identity information of the user equipment and the first mapping relationship information; and the transmitting, by the WLAN AP, the target data of the user equipment with the base station through the first GTP tunnel includes:

receiving, by the WLAN AP, uplink target data sent by the user equipment; and sending, by the WLAN AP, the uplink target data to the base station through the first uplink GTP tunnel, so that after receiving the data through the first uplink GTP tunnel, the base station determines according to the first mapping relationship information that the received data is the uplink target data sent by the user equipment.

Specifically, in this embodiment of the present invention, a GTP tunnel transmitting data may be determined by a receive end of the data, for example, the base station may determine a GTP TEID of an uplink GTP tunnel corresponding to each user equipment, and notify the AP of a mapping relationship (first mapping relationship information) between a GTP TEID of each uplink GTP tunnel and each user equipment (such as, identity information of the user equipment). Therefore, when receiving the uplink data sent by the target user equipment, the AP may find a GTP TEID of an uplink GTP tunnel corresponding to the target user equipment from a first mapping relationship according to the identity information of the target user equipment, then determine the uplink GTP tunnel, and send the uplink data (uplink target data) of the target user equipment to the base station by using the uplink GTP tunnel determined above, and after receiving the data by using the uplink GTP tunnel, the base station may search the foregoing first mapping relationship for the user equipment corresponding to the TEID of the uplink GTP tunnel, so as to determine the target user equipment from which the uplink data is.

Optionally, the determining, by the WLAN AP, a first GTP tunnel corresponding to the user equipment according to user information of the user equipment includes:

determining, by the WLAN AP, a first downlink GTP tunnel corresponding to the user equipment according to user information of the user equipment; and sending, by the WLAN AP, second mapping relationship information to the base station, where the second mapping relationship information is used for indicating a mapping relationship between a TEID of the first downlink GTP tunnel and the user equipment; and the transmitting, by the WLAN AP, the target data of the user equipment with the base station through the first GTP tunnel includes:

determining, by the WLAN AP after receiving, through the first downlink GTP tunnel, data transmitted by the base station, according to the second mapping relationship information that the received data is downlink target data that needs to be sent to the user equipment; and obtaining, by the WLAN AP, a Media Access Control MAC layer address of the user equipment, and sending the downlink target data to the user equipment according to the MAC layer address of the user equipment.

Specifically, in this embodiment of the present invention, a GTP tunnel transmitting data may be determined by a receive end of the data, for example, the AP may determine a GTP TEID of a downlink GTP tunnel corresponding to each user equipment, and notify the base station of a mapping relationship (second mapping relationship information) between a GTP TEID of each downlink GTP tunnel and each user equipment (such as, identity information of the user equipment). Therefore, when needing to send downlink data to the target user equipment by using the AP, the base station may find a GTP TEID of a downlink GTP tunnel corresponding to the target user equipment from a second mapping relationship according to the identity information of the target user equipment, then determine the downlink GTP tunnel, and send the downlink data (downlink target data) of the target user equipment to the AP by using the downlink GTP tunnel determined above, and after receiving the data by using the downlink GTP tunnel, the AP may search the foregoing second mapping relationship for the user equipment corresponding to the TEID of the downlink GTP tunnel, so as to determine the target user equipment to which the downlink data needs to be sent.

Because the foregoing established GTP tunnel corresponds to the target user equipment, the base station and the AP may determine by using a tunnel transmitting data (or a GTP TEID carried in a data packet) that the data belongs to the target user equipment.

It should be noted that, if multiple bearers configured to transmit the target user equipment are disposed between the base station and the gateway device, a same quantity of GTP tunnels may be established between the base station and the AP, so that the multiple bearers and the multiple GTP tunnels (specifically, is multiple GTP TEID) are in a one-to-one correspondence. Therefore, the bearers to which data belongs may be distinguished by using the GTP tunnels. Subsequently, the process is described in detail.

Moreover, in this embodiment of the present invention, the base station may further send second offloading indication information to the target user equipment, where the second offloading indication information may indicate that the target user equipment needs to receive data that the AP sends to the target user equipment, and may further indicate that the target user equipment needs to send specified data (target data) to the AP, or the second offloading indication information may indicate that the target user equipment needs to activate the second user equipment-side protocol stack, so as to perform the offloading related process, which is subsequently described in detail.

It should be noted that, the specified data may be all or some of data that the target user equipment needs to send to the base station (or EPC), which is not particularly limited in the present invention. Moreover, when the target data is some of the data that the target user equipment needs to send to the base station (or EPC), the second offloading indication information may include a target data indication information element, where the target data indication information element may indicate that the target data is which specific part of the data that the target user equipment needs to send to the base station (or EPC), for example, the target data indication information element may indicate a time domain resource or frequency domain resource corresponding to the target data, or a time domain resource or frequency domain resource used for bearing the target data when the target user equipment directly sends the target device to the base station.

Moreover, the second offloading indication information may include an AP indication information element indicating the AP, so that the target user equipment determines, according to the AP indication information element, the AP used in offloading, where if the target user equipment has not yet accessed the AP, the second offloading indication information may further include an access indication information element, so that the target user equipment accesses the AP according to the AP indication information element and the access indication information element.

In this embodiment of the present invention, after the AP and the target user equipment make the foregoing offloading preparation, acknowledgement information may be sent to the base station.

Therefore, after receiving the acknowledgement information, the base station may perform an offloading operation.

An action occurring when a base station performs offloading on target user equipment (such as, of multiple user equipments) by using an AP on a downlink is described below.

The base station may receive (for example, by using an S1 interface) downlink data that is sent by a gateway device (such as, PDN-GW), is from a network side (such as, an EPC) and needs to be sent to the target user equipment, and determine, from the data, downlink target data that needs to be sent to the target user by using the AP, where the downlink target data is referred to as data A below.

In this embodiment of the present invention, a bearer used to transmit data of the target user equipment is disposed between the base station and the gateway device (case 5); or multiple bearers configured to transmit data of the target user equipment are disposed between the base station and the gateway device (case 6).

Case 5

The base station performs encapsulation processing on the data A by using at least one protocol layer of the first base station-side protocol stack and the second base station-side protocol stack, so as to generate a data packet A conforming to the GTP communication manner (an example of a first data packet), where the data packet A carries a GTP TEID that corresponds to the target user equipment and is allocated by the AP (referred to as a GTP TEID on an AP side below) which is described above, determines a downlink GTP tunnel corresponding to the GTP TEID on the AP side according to the aforementioned determined second mapping relationship, and sends the data packet A to the AP.

After receiving the data packet A, the AP may perform decapsulation processing on the data packet A by using the first WLAN AP-side protocol stack (or the first WLAN AP-side protocol stack and the adaptation layer), so as to obtain the AP-side GTP TEID corresponding to the target user equipment and the data A, may determine according to the AP-side GTP TEID and the aforementioned determined second mapping relationship that the data A needs to be sent to the target user equipment, then may perform encapsulation processing on the data A by using the second WLAN AP-side protocol stack (or the second WLAN AP-side protocol stack and the adaptation layer), so as to generate a data packet B conforming to the wireless local area network communication manner (an example of a second data packet), and send the data packet B to the target user equipment by using a carrier used in the wireless local area network communication manner (an example of a first carrier).

The target user equipment may receive the data packet B by using the first carrier, and perform decapsulation processing on the data packet B by using at least one protocol layer of the first user equipment-side protocol stack and the second user equipment-side protocol stack, thereby obtaining the data A.

Case 6

Because at least two bearers are disposed between the base station and the gateway device, the user equipment needs to learn a bearer to which each piece of data carried in a data packet sent by the AP belongs, so as to reliably restore data from a network side, so that the AP also needs to learn a bearer to which each piece of data sent by the base station belongs. When a data packet sent to the target user equipment is encapsulated, an identifier (third bearer indication information) indicating a bearer to which each piece of data belongs is added to the data packet, and the encapsulation process may be the same as or similar to that in the prior art. Description of the encapsulation process is omitted herein to avoid repeated description, and a process and a method in which the base station notifies the AP of a bearer to which each piece of data belongs are mainly described below.

Optionally, when the user equipment corresponds to at least two bearers, the transmitting, by the WLAN AP, target data of the user equipment with the base station according to the first offloading indication information and through the GTP tunnel includes:

receiving, by the WLAN AP, first bearer indication information sent by the base station, and forwarding the first bearer indication information to the user equipment, where the first bearer indication information is used for indicating a bearer to which the downlink target data belongs; or receiving, by the WLAN AP, second bearer indication information sent by the user equipment, and forwarding the second bearer indication information to the base station, where the second bearer indication information is used for indicating a bearer to which the uplink target data belongs.

Specifically, in this embodiment of the present invention, for example, the data A from the network side includes data A1 to data An, where n is the same as a quantity of bearers used when the data A is transmitted between the base station and the gateway device, when encapsulating a data packet (for example, by using at least one layer of the base station protocol stack and the GTP protocol stack), the base station may add, to the data packet, indication information (first bearer indication information) used for indicating bearers to which the data A1 to the data An belong, and therefore the AP may learn, according to the first bearer indication information, the bearers to which the data A1 to the data An that are sent by the base station belong.

It should be noted that, the MAC layer of the base station protocol stack has a function of identifying a bearer shown by data, and therefore, in this embodiment of the present invention, when the GTP protocol stack of the base station is aggregated on the MAC protocol stack of the base station protocol stack, the first bearer indication information may be encapsulated in the data packet by using the MAC layer.

Moreover, in this embodiment of the present invention, there may be one or n data packets generated when the base station performs encapsulation processing on the data A1 to the data An, which is not particularly limited in the present invention. Additionally, in a case of generating n data packets, the n data packets may be transmitted to the AP by using one GTP tunnel, or may be transmitted to the AP by using n tunnels, which is not particularly limited in the present invention.

In this embodiment of the present invention, a protocol layer used for encapsulating the first bearer indication information in a data packet (an example of a bearer mapping layer) may be further added to the base station protocol stack, and the GTP protocol stack is aggregated on the bearer mapping layer. In this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

Therefore, the AP may learn, according to the first bearer indication information, bearers to which data D1 to data Dn that are sent by the base station belong. It should be noted that, the MAC layer of the WiFi protocol stack has a function of identifying a bearer shown by data, and therefore, in this embodiment of the present invention, when the WiFi protocol stack of the AP is aggregated on the MAC protocol stack of the GTP protocol stack, the first bearer indication information may be obtained from the data packet by using the MAC layer. Moreover, in this embodiment of the present invention, a protocol layer used for obtaining the first bearer indication information from the data packet (an example of a bearer mapping layer) may be further added to the GTP protocol stack, and the WiFi protocol stack is aggregated on the bearer mapping layer. Moreover, the AP may encapsulate the first bearer indication information in a data packet that needs to be sent to the target user equipment.

Therefore, the user equipment may learn, according to the first bearer indication information, bearers to which data D1 to data Dn that are sent by the base station belong. Moreover, the MAC layer of the user equipment protocol stack has a function of identifying a bearer shown by data, and therefore, in this embodiment of the present invention, when the WiFi protocol stack is aggregated on the MAC protocol stack of the base station protocol stack, the first bearer indication information may be obtained from the data packet by using the MAC layer. In this embodiment of the present invention, a protocol layer used for obtaining the first bearer indication information from the data packet (an example of a bearer mapping layer) may be further added to the user equipment protocol stack, and the WiFi protocol stack is aggregated on the bearer mapping layer. In this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

It should be noted that, if a bearer to which data belongs is indicated in a manner of adding bearer indication information to a data packet, the base station and the WLAN AP may determine, according to the first mapping relationship information and the second mapping relationship information that are determined above, user equipment to which data transmitted between each other belongs.

Optionally, when the user equipment corresponds to at least two bearers, the transmitting, by the WLAN AP, target data of the user equipment with the base station according to the first offloading indication information and through the GTP tunnel includes:

determining, by the WLAN AP according to the identity information of the user equipment, a second GTP tunnel corresponding to a bearer to which the target data belongs; and transmitting, by the WLAN AP, the target data of the user equipment with the base station through the second GTP tunnel.

Moreover, the determining, by the WLAN AP according to the identity information of the user equipment, a second GTP tunnel corresponding to a bearer to which the target data belongs includes:

determining, by the WLAN AP according to the identity information of the user equipment, a second downlink GTP tunnel corresponding to a bearer to which the downlink target data belongs; and sending, by the WLAN AP, fourth mapping relationship information to the base station, where the fourth mapping relationship information is used for indicating a mapping relationship between a TEID of the second downlink GTP tunnel and the bearer to which the downlink target data belongs; and the transmitting, by the WLAN AP, the target data of the user equipment with the base station through the second GTP tunnel includes:

receiving, by the WLAN AP through the second downlink GTP tunnel, data transmitted by the base station;

determining, by the WLAN AP, according to the fourth mapping relationship information that the received data is the downlink target data, and determining the bearer to which the downlink target data belongs; and obtaining, by the WLAN AP, a MAC layer address of the user equipment, and sending, to the user equipment according to the MAC layer address of the user equipment, the downlink target data and the first bearer indication information that is used for indicating the bearer to which the downlink target data belongs.

Specifically, in this embodiment of the present invention, n downlink GTP tunnels may be established between the base station and the AP, so that each downlink GTP tunnel is only used for transmitting downlink data on a bearer. Moreover, in this embodiment of the present invention, first offloading information may further include bearer indication information, where the bearer indication information is used for indicating each bearer corresponding to the user equipment. The AP may allocate an AP-side GTP TEID for each downlink GTP tunnel, and notify the base station of a mapping relationship between each AP-side GTP TEID and each downlink GTP tunnel, and the AP may determine a mapping relationship (a fourth mapping relationship) between each bearer corresponding to the target user equipment and each downlink GTP tunnel, and therefore the base station may perform encapsulation processing on the data A1 to the data An according to the mapping relationship between each AP-side GTP TEID and each downlink GTP tunnel and the mapping relationship between each bearer and each downlink GTP tunnel to generate n data packets, and transmit each data packet by using a tunnel corresponding to each piece of data.

For example, the base station may encapsulate the AP-side GTP TEID of the downlink GTP tunnel corresponding to the data A1 in the data packet A1, and send the data packet A1 to the AP. The base station may generate the data packet A2 to the data packet An by using a similar method and send the data packet A2 to the data packet An to the AP.

After performing decapsulation processing on the data packet A1, the AP can learn the AP-side GTP TEID of the downlink GTP tunnel corresponding to the data A1, and therefore can determine the downlink GTP tunnel transmitting the data packet A1. Moreover, the AP may determine, according to the downlink GTP tunnel transmitting the data packet A1 and the mapping relationship (the fourth mapping relationship) between each bearer and each GTP tunnel that is determined above, a bearer to which the data A1 carried in the data packet A1 belongs.

The AP may determine bearers to which the data A2 to the data An belong by using a similar method.

Therefore, the AP may determine the bearers to which the data A2 to the data An belong and the foregoing bearer information, and determine that the data is downlink target data that needs to be sent to the target user equipment.

Optionally, the second WLAN AP-side protocol stack includes a bearer mapping layer, and the bearer mapping layer is configured to determine the bearer to which the target data belongs; and the sending, to the user equipment, the downlink target data and the first bearer indication information that is used for indicating the bearer to which the downlink target data belongs includes:

generating, by the WLAN AP, the first bearer indication information by using the bearer mapping layer; and sending, by the WLAN AP, the downlink target data and the first bearer indication information to the user equipment, so that the user equipment determines, according to the first bearer indication information, the bearer to which the downlink target data belongs.

Moreover, the sending, by the WLAN AP, the downlink target data and the first bearer indication information to the user equipment includes:

encapsulating, by the WLAN AP, the first bearer indication information and the downlink target data in a same data packet by using the bearer mapping layer and sending the data packet to the user equipment.

Specifically, the AP may perform encapsulation processing on the data A1 to the data An by using the second WLAN AP-side protocol stack (or the second WLAN AP-side protocol stack and the adaptation layer), so as to generate one or more data packets conforming to the wireless local area network communication manner (another example of a second data packet), and send the one or more data packets to the target user equipment by using a carrier used in the wireless local area network communication manner (an example of a first carrier), and the data packet herein may carry the indication information (an example of the first bearer indication information) used for indicating the bearers to which the data A1 to the data An belong.

The target user equipment may receive one or more data packets by using the first carrier, and perform decapsulation processing on the one or more data packets by using at least one protocol layer of the first user equipment-side protocol stack and the second user equipment-side protocol stack, thereby obtaining the data A from the network side.

Herein, the data A from the network side includes the data A1 to the data An, where n is the same as a quantity of bearers used when the data A is transmitted between the base station and the gateway device, and the user equipment may learn, by using the indication information that is used for indicating the bearers to which the data A1 to the data An belong and is carried in the data packet sent by using the AP, the bearers to which the data A1 to the data An that are sent by the base station belong.

It should be noted that, the MAC layer of the user equipment protocol stack has a function of identifying a bearer shown by data, and therefore, in this embodiment of the present invention, when the WiFi protocol stack is aggregated on the MAC protocol stack of the user equipment protocol stack, the bearer to which the data A1 to the data An belong may be determined by using the MAC layer.

Alternatively, a protocol layer used for determining the bearers to which the data A1 to the data An belong (an example of a bearer mapping layer) may be further added to the user equipment protocol stack, and the WiFi protocol stack is aggregated on the bearer mapping layer. Moreover, in this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

Additionally, when the data A is from the network side and is a part of all data that needs to be sent to the target user equipment, the base station further needs to send a residual part (referred to as data C below) to the target user equipment by using a carrier used for communication between the base station and the user equipment (an example of a third carrier), the process and the method may be the same as or similar to those in the prior art, and description of the process and the method is omitted herein to avoid repeated description.

Therefore, a downlink data transmission process is completed.

FIG. 5 is a schematic interaction diagram of a downlink data transmission method according to an embodiment of the present invention.

As shown in FIG. 5, in S210, UE can send a MAC address of the UE to an MME.

In S220, the MME can send the MAC address of the UE to a base station.

In S230, the base station can send the MAC address of the UE and a base station-side GTP TEID that is allocated for the UE to an AP.

In S240, the AP can send an AP-side GTP TEID allocated by the AP for the UE to the base station.

In S250, the base station can encapsulate the AP-side GTP TEID in a data packet, and send the data packet to the AP.

In S260, the AP determines according to the AP-side GTP TEID that data carried in the data packet needs to be sent to the UE.

In S270, the AP can send the data carried in the data packet to the UE according to the MAC address of the UE.

An action occurring when a base station performs offloading on target user equipment (such as, of multiple user equipments) by using an AP on an uplink is described below.

The user equipment may determine, from uplink data that needs to be sent to the base station (or the network side), uplink target data that needs to be sent to the base station by using the AP, where the uplink target data is referred to as data D below.

In this embodiment of the present invention, a bearer used to transmit data of the target user equipment is disposed between the base station and the gateway device (case 7); or multiple bearers configured to transmit data of the target user equipment are disposed between the base station and the gateway device (case 8).

Case 7

The target user equipment performs encapsulation processing on data D by using at least one protocol layer of the first user equipment-side protocol stack and the second user equipment-side protocol stack, so as to generate a data packet D conforming to the wireless local area network communication manner (an example of a fourth data packet), and sends the data packet D to the AP by using a carrier used in the wireless local area network communication manner (an example of a second carrier).

After receiving the data packet D, the AP may perform decapsulation processing on the data packet D by using the second WLAN AP-side protocol stack (or the second WLAN AP-side protocol stack and the adaptation layer), so as to obtain the data D; then the AP may determine according to the aforementioned received first offloading indication information that the data D needs to be sent to the base station, and therefore may perform encapsulation processing on the data D by using the first WLAN AP-side protocol stack (or the first WLAN AP-side protocol stack and the adaptation layer), so as to generate a data packet E conforming to the GTP communication manner (an example of a second data packet). A GTP TEID (base station-side GTP TEID) that corresponds to the target user equipment and is allocated by the base station is encapsulated in the data packet E, an uplink GTP tunnel corresponding to the base station-side GTP TEID may be determined according to the aforementioned determined first mapping relationship, and the data packet E is sent to the base station.

After receiving the data packet E, the base station may perform decapsulation processing on the data packet E by using at least one protocol layer of the first base station-side protocol stack and the second base station-side protocol stack, so as to obtain the base station-side GTP TEID and the data D, and determine, according to the base station-side GTP TEID and the determined first mapping relationship that is described above, that the data D is uplink data from the target user equipment, and therefore the base station may send (for example, by using an S1 interface), to a gateway device (such as, a PDN-GW), uplink data D that the target user equipment needs to send to a network side (such as, an EPC).

Case 8

Because at least two bearers are disposed between the base station and the gateway device, the base station needs to learn a bearer to which each piece of data carried in a data packet sent by the AP belongs, so as to send each piece of data to the network side accurately, so that the AP also needs to learn a bearer to which each piece of data sent by the target user equipment belongs, and when encapsulating the data packet sent to the AP, the target user equipment may add, to the data packet, an identifier indicating a bearer to which each piece of data belongs.

Optionally, when the user equipment corresponds to at least two bearers, the transmitting, by the WLAN AP, target data of the user equipment with the base station according to the first offloading indication information and through the GTP tunnel includes:

receiving, by the WLAN AP, first bearer indication information sent by the base station, and forwarding the first bearer indication information to the user equipment, where the first bearer indication information is used for indicating a bearer to which the downlink target data belongs; or receiving, by the WLAN AP, second bearer indication information sent by the user equipment, and forwarding the second bearer indication information to the base station, where the second bearer indication information is used for indicating a bearer to which the uplink target data belongs.

Specifically, in this embodiment of the present invention, for example, the data D that the target user equipment needs to send to the network side includes data D1 to data Dn, where n is the same as a quantity of bearers used when the data D is transmitted between the base station and the gateway device, when encapsulating a data packet (for example, by using at least one layer of the user equipment protocol stack and the WiFi protocol stack), the target user equipment may add, to the data packet, indication information (second bearer indication information) used for indicating bearers to which the data D1 to the data Dn belong, and therefore the AP may learn, according to the second bearer indication information, the bearers to which the data D1 to the data Dn that are sent by the target user equipment belong.

It should be noted that, the MAC layer of the user equipment protocol stack has a function of identifying a bearer shown by data, and therefore, in this embodiment of the present invention, when the WiFi protocol stack of the UE is aggregated on the MAC protocol stack of the user equipment protocol stack, the second bearer indication information may be encapsulated in the data packet by using the MAC layer.

Moreover, in this embodiment of the present invention, there may be one or n data packets generated when encapsulation processing is performed on the data D1 to the data Dn, which is not particularly limited in the present invention.

Additionally, in this embodiment of the present invention, a protocol layer used for encapsulating the second bearer indication information in a data packet (an example of a bearer mapping layer) may be further added to the user equipment protocol stack, and the WiFi protocol stack is aggregated on the bearer mapping layer. In this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

The AP may learn, according to the second bearer indication information, bearers to which data D1 to data Dn that are sent by the user equipment belong. It should be noted that, the MAC layer of the WiFi protocol stack of the AP has a function of identifying a bearer shown by data, and therefore, in this embodiment of the present invention, when the GTP protocol stack of the AP is aggregated on the MAC protocol stack of the WiFi protocol stack, the second bearer indication information may be obtained from the data packet by using the MAC layer. Moreover, in this embodiment of the present invention, a protocol layer used for obtaining the second bearer indication information from the data packet (an example of a bearer mapping layer) may be further added to the GTP protocol stack, and the GTP protocol stack is aggregated on the bearer mapping layer.

The AP may forward the second bearer information to the base station.

The base station may learn, according to the second bearer indication information, bearers to which data D1 to data Dn that are sent by the user equipment belong. It should be noted that, the MAC layer of the base station protocol stack has a function of identifying a bearer shown by data, and therefore, in this embodiment of the present invention, when the GTP protocol stack is aggregated on the MAC protocol stack of the base station protocol stack, the second bearer indication information may be obtained from the data packet by using the MAC layer. In this embodiment of the present invention, a protocol layer used for obtaining the second bearer indication information from the data packet (an example of a bearer mapping layer) may be further added to the base station protocol stack, and the GTP protocol stack is aggregated on the bearer mapping layer. Moreover, in this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

It should be noted that, if a bearer to which data belongs is indicated in a manner of adding bearer indication information to a data packet, the base station and the WLAN AP may determine, according to the first mapping relationship information and the second mapping relationship information that are determined above, user equipment to which data transmitted between each other belongs.

Optionally, when the user equipment corresponds to at least two bearers, the transmitting, by the WLAN AP, target data of the user equipment with the base station according to the first offloading indication information and through the GTP tunnel includes:

determining, by the WLAN AP according to the identity information of the user equipment, a second GTP tunnel corresponding to a bearer to which the target data belongs; and transmitting, by the WLAN AP, the target data of the user equipment with the base station through the second GTP tunnel.

Moreover, the determining, by the WLAN AP according to the identity information of the user equipment, a second GTP tunnel corresponding to a bearer to which the target data belongs includes:

receiving, by the WLAN AP, third mapping relationship information sent by the base station, where the third mapping relationship information is used for indicating a mapping relationship between a TEID of a second uplink GTP tunnel and a bearer to which the uplink target data belongs; and determining, by the WLAN AP, the second uplink GTP tunnel according to the identity information of the user equipment and the third mapping relationship information; and the transmitting, by the WLAN AP, the target data of the user equipment with the base station through the second GTP tunnel includes:

receiving, by the WLAN AP, data sent by the user equipment and the second bearer indication information used for indicating a bearer to which the data belongs;

determining, by the WLAN AP, according to the second bearer indication information that the received data is the uplink target data; and sending, by the WLAN AP, the uplink target data to the base station through the second uplink GTP tunnel.

Specifically, in this embodiment of the present invention, when encapsulating a data packet (for example, by using at least one layer of the user equipment protocol stack and the WiFi protocol stack), the target user equipment may add, to the data packet, indication information (second bearer indication information) used for indicating bearers to which the data D1 to the data Dn belong, and therefore the AP may learn, according to the second bearer indication information, the bearers to which the data D1 to the data Dn that are sent by the target user equipment belong.

It should be noted that, the MAC layer of the user equipment protocol stack has a function of identifying a bearer shown by data, and therefore, in this embodiment of the present invention, when the WiFi protocol stack is aggregated on the MAC protocol stack of the user equipment protocol stack, the second bearer indication information may be encapsulated in the data packet by using the MAC layer.

Moreover, in this embodiment of the present invention, there may be one or n data packets generated when encapsulation processing is performed on the data D1 to the data Dn, which is not particularly limited in the present invention.

Additionally, in this embodiment of the present invention, a protocol layer used for encapsulating the second bearer indication information in a data packet (an example of a bearer mapping layer) may be further added to the user equipment protocol stack, and the WiFi protocol stack is aggregated on the bearer mapping layer. Moreover, in this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

The AP may learn, according to the second bearer indication information, bearers to which data D1 to data Dn that are sent by the base station belong.

Optionally, the second WLAN AP-side protocol stack includes a bearer mapping layer, and the bearer mapping layer is configured to determine the bearer to which the target data belongs; and the receiving, by the WLAN AP, data sent by the user equipment and the second bearer indication information used for indicating a bearer to which the data belongs includes:

obtaining, by the WLAN AP by using the bearer mapping layer, the second bearer indication information sent by the user equipment.

Moreover, the obtaining, by the WLAN AP by using the bearer mapping layer, the second bearer indication information sent by the user equipment includes:

obtaining, by the WLAN AP by using the bearer mapping layer, the second bearer indication information from a data packet in which the uplink target data is encapsulated.

Specifically, for the AP, a protocol layer used for obtaining the second bearer indication information from the data packet (an example of a bearer mapping layer) may be further added to the WiFi protocol stack, and the GTP protocol stack is aggregated on the bearer mapping layer.

The AP may determine according to the identity information of the user equipment that the data D1 to the data Dn need to be sent to the base station.

N uplink GTP tunnels may be established between the base station and the AP, so that each uplink GTP tunnel is only used for transmitting uplink data on a bearer. The base station may allocate a base station-side GTP TEID for each uplink GTP tunnel, and notify the AP. Moreover, the base station may determine a mapping relationship (a third mapping relationship) between each bearer corresponding to each user equipment and each uplink GTP tunnel, and notify the AP, and therefore the AP may perform encapsulation processing on the data D1 to the data Dn according to the mapping relationship between each base station-side GTP TEID and each uplink GTP tunnel and the mapping relationship between each bearer and each uplink GTP tunnel to generate n data packets, and transmit each data packet by using a tunnel corresponding to each piece of data.

For example, the AP may encapsulate the base station-side GTP TEID of the uplink GTP tunnel corresponding to the data D1 in the data packet D1, and send the data packet D1 to the base station. The AP may generate the data packet D2 to the data packet Dn by using a similar method and send the data packet D2 to the data packet Dn to the base station.

After performing decapsulation processing on the data packet D1, the base station may learn a base station-side GTP TEID of an uplink GTP tunnel corresponding to the data D1, therefore may determine the uplink GTP tunnel transmitting the data packet D1, and then may determine, according to the aforementioned determined third mapping relationship, a bearer to which the uplink data belongs, and the user equipment sending the uplink data.

Then, the base station may send (for example, by using the S1 interface), to a gateway device (such as, a PDN-GW), the aforementioned obtained uplink data that the target user equipment needs to send to a network side (such as, an EPC), and send each piece of data to the network side by using a corresponding bearer.

Additionally, when the data D is a part of all data that the target user equipment needs to send to the network side, the target user equipment further needs to send a residual part (referred to as data F below) to the base station by using a carrier used for communication between the base station and the user equipment (an example of a fourth carrier), the process and the method may be the same as or similar to those in the prior art, and description of the process and the method is omitted herein to avoid repeated description.

Therefore, an uplink data transmission process is completed.

FIG. 6 is a schematic interaction diagram of an uplink data transmission method according to an embodiment of the present invention.

As shown in FIG. 6, in S310, UE can send a MAC address of the UE to an MME.

In S320, the MME can send the MAC address of the UE to a base station.

In S330, the base station can send the MAC address of the UE and a base station-side GTP TEID that is allocated for the UE to an AP.

In S340, the AP can send an AP-side GTP TEID allocated by the AP for the UE to the base station.

In S350, the UE can send a data packet to the AP.

In S360, the AP can determine according to the MAC address that data carried in the data packet needs to be sent to the base station, and can encapsulate the base station-side GTP TEID in the data packet and send the data packet to the base station.

In S370, the base station determines according to the base station-side GTP TEID that the data carried in the data packet is from the UE.

It should be noted that, an embodiment in which the AP communicating with the base station (which is briefly referred to as an AP 1 below for convenience of distinguishing) directly transmits data with the user equipment is listed above, but the present invention is not limited thereto. For example, when the user equipment passes through an AP not communicating with the base station (which is briefly referred to as an AP 2 below for convenience of distinguishing), on a downlink, the base station may send downlink data to the AP 1, the AP 1 transmits the downlink data to the AP 2 in the wireless local area network communication manner, and therefore the AP 2 may transmit the downlink data to the user equipment. On an uplink, the user equipment may transmit uplink data to the AP 2, and the AP 2 transmits the downlink data to the AP 1 in the wireless local area network communication manner, and therefore the AP 1 may transmit the uplink data to the base station.

Moreover, in this embodiment of the present invention, the AP 1 and the AP 2 may directly transmit data between each other, or may perform data transmission through another relay device (such as, one or more APs), which is not particularly limited in the present invention.

According to the data transmission method of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

An action occurring when user equipment performs data transmission according to a data transmission method of an embodiment of the present invention is described below.

Figures 8, 9:
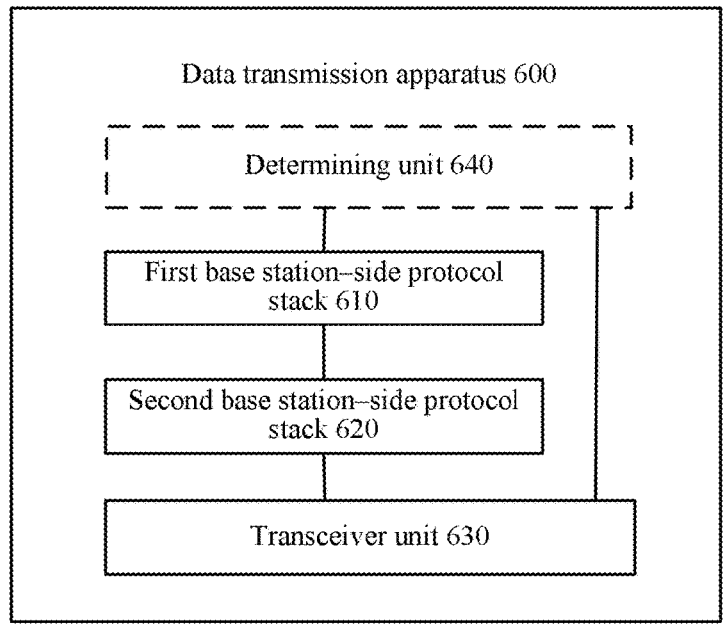
FIG. 8 is a schematic flowchart of a data transmission method according to still another embodiment of the present invention.
FIG. 9 is a schematic block diagram of a signal transmission apparatus according to an embodiment of the present invention.

FIG. 8 is a schematic flowchart of a data transmission method 500 according to an embodiment of the present invention. The method 500 is performed by user equipment in a communications system, the communications system further includes a base station and a wireless local area network access point WLAN AP, a bearer used to transmit data of the user equipment is disposed between the base station and a gateway device, a General Packet Radio Service Tunneling Protocol GTP tunnel is disposed between the base station and the WLAN AP, and the method includes:

S510: The user equipment determines that the user equipment needs to perform transmission of target data with the base station through the WLAN AP.

S520: The user equipment performs transmission of the target data with the base station through the WLAN AP, where the target data is transmitted between the WLAN AP and the base station through the GTP tunnel.

According to the data transmission method of the present invention, the target user equipment receives, by using a first carrier used for wireless local area network communication, a second data packet sent by the WLAN AP, and performs decapsulation processing on the second data packet by using at least one protocol layer of the fifth protocol stack and the sixth protocol stack, so as to obtain downlink target data, where the downlink target data is all or some downlink data on the at least one bearer; and/or the target user equipment performs encapsulation processing on uplink target data by using at least one protocol layer of the fifth protocol stack and the sixth protocol stack, so as to generate a fourth data packet, and sends the fourth data packet to the WLAN AP by using a second carrier used for wireless local area network communication, where the uplink target data is all or some uplink data on the at least one bearer.

Specifically, in this embodiment of the present invention, the target user equipment may access the base station, and access a network side (such as, an EPC) by using the base station, data (including uplink data and downlink data) of the target user equipment is transmitted between the base station and a gateway device (such as, a PDN-GW) on the network side by using a bearer (such as, an evolved packet system (EPS, Evolved Packet System) bearer), a time frequency resource provided by the system may be used between the target user equipment and the base station, and data transmission is performed by using an air interface. The process and the implementation method may be the same as or similar to those in the prior art, and description of the process and the implementation method is omitted to avoid repeated description herein.

The base station may determine whether it is needed to offload data transmission of the target user, that is, transmit all or some of data of the target user by using the AP.

In this embodiment of the present invention, in a case of satisfying an activation condition, the base station may activate the second base station-side protocol stack to perform the foregoing offloading related process.

After it is determined that the data of the target user equipment needs to be offloaded, the base station needs to instruct the AP and the target user equipment to prepare for offloading.

That is, the base station sends first offloading indication information to the AP, and the first offloading indication information may indicate that the AP needs to send data sent by the base station to the AP to the target user equipment, and may further indicate that the AP needs to send data sent by the target user equipment to the AP to the base station, where the first offloading indication information may be sent to the AP as identity information of the target user equipment, where a piece of identity information may uniquely indicate a piece of user equipment in the system.

In this embodiment of the present invention, identity information of a device refers to information that can uniquely identify the device when the communications system of this embodiment of the present invention is used. It should be noted that, in this embodiment of the present invention, the identity information may be information carried by a device at delivery, or may be allocated by a system for a device, which is not particularly limited in the present invention.

In this embodiment of the present invention, the identity information may include information such as a Media Access Control (MAC, Medium Access Control) address, an Internet Protocol (IP, Internet Protocol) address, a basic service set identifier (BSSID, Basic Service Set IDentifier), an association identifier (AID, Association IDentifier), a mobile subscriber mobile phone number, an international mobile subscriber identity (IMSI, International Mobile Subscriber Identity) and an international mobile equipment identity (IMEI, International Mobile Equipment Identity). It should be understood that, the subscriber identity of this embodiment of the present invention is not limited to the foregoing information, and other information elements that can uniquely embody the subscriber identity all fall within the scope of the embodiments of the present invention.

The AP may determine the target user equipment according to the identity information of the target user equipment, and may determine according to the first offloading indication information that data that the base station sends to the AP needs to be sent to the target user equipment, or determine according to the first offloading indication information that data that the target user equipment sends to the AP needs to be sent to the base station.

Because when the AP and the target user equipment transmit data in the wireless local area network communication manner, a MAC address of the target user equipment needs to be learned, after determining the target user equipment, the AP may further obtain the MAC address of the target user equipment, for example, may obtain the MAC address of the target user equipment from a mobility management entity (MME, Mobility Management Entity) in a system, or may obtain the MAC address of the target user equipment from the target user equipment, or may obtain the MAC address of the target user equipment from the base station, which is not particularly limited in the present invention.

Additionally, in this embodiment of the present invention, the user equipment may carry the MAC address of the user equipment to the MME by using, such as, an attach request (Attach Request) or a tracking area update request (Tracking Area Update Request) message, and therefore the MME may deliver the MAC address of the user equipment to the base station by using, such as, an Initial UE Context Setup Request (Initial UE Context Setup Request) or a UE Context Modify Request (UE Context Modify Request), so that the base station may obtain a MAC address of each user equipment.

Moreover, the base station may send a GTP tunnel endpoint identifier (TEID, Tunnel Endpoint Identifier) that corresponds to the target user equipment and is on the base station side to the AP by using, such as, a UE Association Setup Request (UE Association Setup Request) message, and may receive, by using, such as, a UE Association Setup Response (UE Association Setup Response) message, a GTP TEID that corresponds to the target user equipment, is on an AP side, and is sent by the AP. Therefore, a base station-side GTP TEID may identify an uplink GTP tunnel (a GTP tunnel used when data is transmitted from the AP to the base station), and an AP-side GTP TEID may identify a downlink GTP tunnel (a GTP tunnel used when data is transmitted from the base station to the AP).

Additionally, if there is only one piece of UE that needs to perform offloading by using the WLAN AP, transmission of target data may be directly performed by using each GTP tunnel, but if there are two or more UEs that need to perform offloading by using the WLAN AP, or there are two or more UEs that currently access the WLAN AP, a mapping relationship between each GTP and each UE needs to be determined between the base station and the WLAN AP. Therefore, for example, when the base station needs to send data (that is, downlink data) to the user equipment (referred to as the target user equipment below for convenience of distinguishing) by using the WLAN AP, the base station may send the downlink data (downlink target data) to the WLAN AP by using a GTP tunnel (specifically, downlink tunnel) corresponding to the target device, and the WLAN AP may determine according to a tunnel through which the received data passes that the data is downlink target data that needs to be sent to the target user equipment. For another example, after receiving the data sent by the target user equipment, the WLAN AP may determine according to the foregoing first offloading indication information that the data is data (uplink target data) that needs to be sent to the base station, and therefore the WLAN AP may select a GTP tunnel (specifically, an uplink tunnel) corresponding to the target user equipment, and send the uplink target data to the base station by using the GTP tunnel, and the base station may determine according to a tunnel through which the received data passes that the data is uplink target data from the target user equipment.

In this embodiment of the present invention, a GTP tunnel transmitting data may be determined by a receive end of the data, for example, the base station may determine a GTP TEID of an uplink GTP tunnel corresponding to each user equipment, and notify the WLAN AP of a mapping relationship (first mapping relationship information) between a GTP TEID of each uplink GTP tunnel and each user equipment (such as, identity information of the user equipment). Therefore, when receiving the uplink data sent by the target user equipment, the WLAN AP may find a GTP TEID of an uplink GTP tunnel corresponding to the target user equipment from a first mapping relationship according to the identity information of the target user equipment, then determine the uplink GTP tunnel, and send the uplink data (uplink target data) of the target user equipment to the base station by using the uplink GTP tunnel determined above, and after receiving the data by using the uplink GTP tunnel, the base station may search the foregoing first mapping relationship for the user equipment corresponding to the TEID of the uplink GTP tunnel, so as to determine the target user equipment from which the uplink data is.

In this embodiment of the present invention, a GTP tunnel transmitting data may be determined by a receive end of the data, for example, the WLAN AP may determine a GTP TEID of a downlink GTP tunnel corresponding to each user equipment, and notify the base station of a mapping relationship (second mapping relationship information) between a GTP TEID of each downlink GTP tunnel and each user equipment (such as, identity information of the user equipment). Therefore, when needing to send downlink data to the target user equipment by using the WLAN AP, the base station may find a GTP TEID of a downlink GTP tunnel corresponding to the target user equipment from a second mapping relationship according to the identity information of the target user equipment, then determine the downlink GTP tunnel, and send the downlink data (downlink target data) of the target user equipment to the WLAN AP by using the downlink GTP tunnel determined above, and after receiving the data by using the downlink GTP tunnel, the WLAN AP may search the foregoing second mapping relationship for the user equipment corresponding to the TEID of the downlink GTP tunnel, so as to determine the target user equipment to which the downlink data needs to be sent.

Because the foregoing established GTP tunnel corresponds to the target user equipment, the base station and the AP may determine by using a tunnel transmitting data (or a GTP TEID carried in a data packet) that the data belongs to the target user equipment.

It should be noted that, if multiple bearers configured to transmit the target user equipment are disposed between the base station and the gateway device, a same quantity of GTP tunnels may be established between the base station and the AP, so that the multiple bearers and the multiple GTP tunnels (specifically, is multiple GTP TEID) are in a one-to-one correspondence. Therefore, the bearers to which data belongs may be distinguished by using the GTP tunnels. Subsequently, the process is described in detail.

Optionally, the determining, by the user equipment, that the user equipment needs to perform transmission of target data with the base station through the WLAN AP includes:

receiving, by the user equipment, second offloading indication information sent by the base station, where the second offloading indication information is used for instructing to transmit the target data between the user equipment and the WLAN AP; and determining, by the user equipment, according to the second offloading indication information that the user equipment needs to perform transmission of the target data with the base station through the WLAN AP.

Specifically, the base station sends second offloading indication information to the target user equipment, where the second offloading indication information may indicate that the target user equipment needs to receive data that the AP sends to the target user equipment, and may further indicate that the target user equipment needs to send specified data (target data) to the AP, or the second offloading indication information may indicate that the target user equipment needs to activate the second user equipment-side protocol stack, so as to perform the offloading related process, which is subsequently described in detail.

It should be noted that, the specified data may be all or some of data that the target user equipment needs to send to the base station (or EPC), which is not particularly limited in the present invention. Moreover, when the target data is some of the data that the target user equipment needs to send to the base station (or EPC), the second offloading indication information may include a target data indication information element, where the target data indication information element may indicate that the target data is which specific part of the data that the target user equipment needs to send to the base station (or EPC), for example, the target data indication information element may indicate a time domain resource or frequency domain resource corresponding to the target data, or a time domain resource or frequency domain resource used for bearing the target data when the target user equipment directly sends the target device to the base station.

Moreover, the second offloading indication information may include an AP indication information element indicating the AP, so that the target user equipment determines, according to the AP indication information element, the AP used in offloading, where if the target user equipment has not yet accessed the AP, the second offloading indication information may further include an access indication information element, so that the target user equipment accesses the AP according to the AP indication information element and the access indication information element.

In this embodiment of the present invention, after the AP and the target user equipment make the foregoing offloading preparation, acknowledgement information may be sent to the base station.

Therefore, after receiving the acknowledgement information, the base station may perform an offloading operation.

An action occurring when a base station performs offloading on target user equipment (such as, of multiple user equipments) by using an AP on a downlink is described below.

The base station may receive (for example, by using an S1 interface) downlink data that is sent by a gateway device (such as, PDN-GW), is from a network side (such as, an EPC) and needs to be sent to the target user equipment, and determine, from the data, downlink target data that needs to be sent to the target user by using the AP, where the downlink target data is referred to as data A below.

In this embodiment of the present invention, a bearer used to transmit data of the target user equipment is disposed between the base station and the gateway device (case 9); or multiple bearers configured to transmit data of the target user equipment are disposed between the base station and the gateway device (case 10).

Case 9

The base station performs encapsulation processing on the data A by using at least one protocol layer of the first base station-side protocol stack and the second base station-side protocol stack, so as to generate a data packet A conforming to the GTP communication manner (an example of a first data packet), where the data packet A carries a GTP TEID that corresponds to the target user equipment and is allocated by the AP (referred to as a GTP TEID on an AP side below) which is described above, determines a downlink GTP tunnel corresponding to the GTP TEID on the AP side according to the aforementioned determined second mapping relationship, and sends the data packet A to the AP.

After receiving the data packet A, the AP may perform decapsulation processing on the data packet A by using the first WLAN AP-side protocol stack (or the first WLAN AP-side protocol stack and the adaptation layer), so as to obtain the AP-side GTP TEID corresponding to the target user equipment and the data A, may determine according to the AP-side GTP TEID and the aforementioned determined second mapping relationship that the data A needs to be sent to the target user equipment, then may perform encapsulation processing on the data A by using the second WLAN AP-side protocol stack (or the second WLAN AP-side protocol stack and the adaptation layer), so as to generate a data packet B conforming to the wireless local area network communication manner (an example of a second data packet), and send the data packet B to the target user equipment by using a carrier used in the wireless local area network communication manner (an example of a first carrier).

The target user equipment may receive the data packet B by using the first carrier, and perform decapsulation processing on the data packet B by using at least one protocol layer of the first user equipment-side protocol stack and the second user equipment-side protocol stack, thereby obtaining the data A.

Case 10

Because at least two bearers are disposed between the base station and the gateway device, the user equipment needs to learn a bearer to which each piece of data carried in a data packet sent by the AP belongs, so as to reliably restore data from a network side, so that the AP also needs to learn a bearer to which each piece of data sent by the base station belongs. When a data packet sent to the target user equipment is encapsulated, an identifier (third bearer indication information) indicating a bearer to which each piece of data belongs is added to the data packet, and the encapsulation process may be the same as or similar to that in the prior art. Description of the encapsulation process is omitted herein to avoid repeated description.

In this embodiment of the present invention, for example, the data A from the network side includes data A1 to data An, where n is the same as a quantity of bearers used when the data A is transmitted between the base station and the gateway device, when encapsulating a data packet (for example, by using at least one layer of the base station protocol stack and the GTP protocol stack), the base station may add, to the data packet, indication information (first bearer indication information) used for indicating bearers to which the data A1 to the data An belong, and therefore the AP may learn, according to the first bearer indication information, the bearers to which the data A1 to the data An that are sent by the base station belong.

It should be noted that, the MAC layer of the base station protocol stack has a function of identifying a bearer shown by data, and therefore, in this embodiment of the present invention, when the GTP protocol stack is aggregated on the MAC protocol stack of the base station protocol stack, the first bearer indication information may be encapsulated in the data packet by using the MAC layer.

Moreover, in this embodiment of the present invention, there may be one or n data packets generated when the base station performs encapsulation processing on the data A1 to the data An, which is not particularly limited in the present invention. Additionally, in a case of generating n data packets, the n data packets may be transmitted to the AP by using one GTP tunnel, or may be transmitted to the AP by using n tunnels, which is not particularly limited in the present invention.

In this embodiment of the present invention, a protocol layer used for encapsulating the first bearer indication information in a data packet (an example of a bearer mapping layer) may be further added to the base station protocol stack, and the GTP protocol stack is aggregated on the bearer mapping layer. Moreover, in this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

It should be noted that, if a bearer to which data belongs is indicated in a manner of adding bearer indication information to a data packet, the base station and the AP may determine, according to the first mapping relationship information and the second mapping relationship information that are determined above, user equipment to which data transmitted between each other belongs.

In this embodiment of the present invention, n downlink GTP tunnels may be established between the base station and the AP, so that each downlink GTP tunnel is only used for transmitting downlink data on a bearer. Moreover, in this embodiment of the present invention, first offloading information may further include bearer indication information, where the bearer indication information is used for indicating each bearer corresponding to the user equipment. The AP may allocate an AP-side GTP TEID for each downlink GTP tunnel, and notify the base station of a mapping relationship between each AP-side GTP TEID and each downlink GTP tunnel, and the AP may determine a mapping relationship (a fourth mapping relationship) between each bearer corresponding to the target user equipment and each downlink GTP tunnel, and therefore the base station may perform encapsulation processing on the data A1 to the data An according to the mapping relationship between each AP-side GTP TEID and each downlink GTP tunnel and the mapping relationship between each bearer and each downlink GTP tunnel to generate n data packets, and transmit each data packet by using a tunnel corresponding to each piece of data.

For example, the base station may encapsulate the AP-side GTP TEID of the downlink GTP tunnel corresponding to the data A1 in the data packet A1, and send the data packet A1 to the AP. The base station may generate the data packet A2 to the data packet An by using a similar method and send the data packet A2 to the data packet An to the AP.

After performing decapsulation processing on the data packet A1, the AP can learn the AP-side GTP TEID of the downlink GTP tunnel corresponding to the data A1, and therefore can determine the downlink GTP tunnel transmitting the data packet A1. Moreover, the AP may determine, according to the downlink GTP tunnel transmitting the data packet A1 and the mapping relationship between each bearer and each GTP tunnel that is determined above, a bearer to which the data A1 carried in the data packet A1 belongs. The AP may determine bearers to which the data A2 to the data An belong by using a similar method. Therefore, the AP may determine the bearers to which the data A2 to the data An belong and the foregoing bearer information, and determine that the data is downlink target data that needs to be sent to the target user equipment.

Then, the AP may perform encapsulation processing on the data A1 to the data An by using the second WLAN AP-side protocol stack (or the second WLAN AP-side protocol stack and the adaptation layer), so as to generate one or more data packets conforming to the wireless local area network communication manner (another example of a second data packet), and send the one or more data packets to the target user equipment by using a carrier used in the wireless local area network communication manner (an example of a first carrier), and the data packet herein may carry the indication information (the first bearer indication information) used for indicating the bearers to which the data A1 to the data An belong.

The target user equipment may receive one or more data packets by using the first carrier, and perform decapsulation processing on the one or more data packets by using at least one protocol layer of the first user equipment-side protocol stack and the second user equipment-side protocol stack, thereby obtaining the data A from the network side.

Herein, the data A from the network side includes the data A1 to the data An, where n is the same as a quantity of bearers used when the data A is transmitted between the base station and the gateway device, and the user equipment may learn, by using the indication information (the first bearer indication information) that is used for indicating the bearers to which the data A1 to the data An belong and is carried in the data packet sent by using the AP, the bearers to which the data A1 to the data An that are sent by the base station belong. It should be noted that, the MAC layer of the user equipment protocol stack has a function of identifying a bearer shown by data, and therefore, in this embodiment of the present invention, when the WiFi protocol stack is aggregated on the MAC protocol stack of the user equipment protocol stack, the bearer to which the data A1 to the data An belong may be determined by using the MAC layer.

Alternatively, a protocol layer used for determining the bearers to which the data A1 to the data An belong (an example of a bearer mapping layer) may be further added to the user equipment protocol stack, and the WiFi protocol stack is aggregated on the bearer mapping layer. Moreover, in this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

Optionally, when the target data is some data on the bearer, the method further includes:

performing, by the user equipment, transmission of non-target data with the base station by using the first user equipment-side protocol stack, where the non-target data is data in all the data on the bearer except the target data.

Specifically, when the downlink target data is some downlink data on the at least one bearer, the method further includes: performing, by the base station, encapsulation processing on downlink non-target data by using the first base station-side protocol stack, so as to generate a fifth data packet, where the downlink non-target data is data of all downlink data on the at least one bearer except the downlink target data; and sending, by the base station, the fifth data packet to the target user equipment by using a third carrier, so that the target user equipment performs decapsulation processing on the fifth data packet by using the first user equipment-side protocol stack, so as to obtain the downlink non-target data, and determines all the downlink data on the at least one bearer according to the downlink non-target data and the downlink target data, where the third carrier is a carrier used for communication between the base station and the user equipment.

For example, when the data A is from the network side and is a part of all data that needs to be sent to the target user equipment, the base station further needs to send a residual part (referred to as data C below) to the target user equipment by using a carrier used for communication between the base station and the user equipment (an example of a third carrier), the process and the method may be the same as or similar to those in the prior art, and description of the process and the method is omitted herein to avoid repeated description.

Therefore, a downlink data transmission process is completed.

FIG. 5 is a schematic interaction diagram of a downlink data transmission method according to an embodiment of the present invention.

As shown in FIG. 5, in S210, UE can send a MAC address of the UE to an MME.

In S220, the MME can send the MAC address of the UE to a base station.

In S230, the base station can send the MAC address of the UE and a base station-side GTP TEID that is allocated for the UE to an AP.

In S240, the AP can send an AP-side GTP TEID allocated by the AP for the UE to the base station.

In S250, the base station can encapsulate the AP-side GTP TEID in a data packet, and send the data packet to the AP.

In S260, the AP determines according to the AP-side GTP TEID that data carried in the data packet needs to be sent to the UE.

In S270, the AP can send the data carried in the data packet to the UE according to the MAC address of the UE.

An action occurring when a base station performs offloading on target user equipment (such as, of multiple user equipments) by using an AP on an uplink is described below.

The user equipment may determine, from uplink data that needs to be sent to the base station (or the network side), uplink target data that needs to be sent to the base station by using the AP, where the uplink target data is referred to as data D below.

In this embodiment of the present invention, a bearer used to transmit data of the target user equipment is disposed between the base station and the gateway device (case 11); or multiple bearers configured to transmit data of the target user equipment are disposed between the base station and the gateway device (case 12).

Case 11

The target user equipment performs encapsulation processing on data D by using at least one protocol layer of the first user equipment-side protocol stack and the second user equipment-side protocol stack, so as to generate a data packet D conforming to the wireless local area network communication manner (an example of a fourth data packet), and sends the data packet D to the AP by using a carrier used in the wireless local area network communication manner (an example of a second carrier).

After receiving the data packet D, the AP may perform decapsulation processing on the data packet D by using the second WLAN AP-side protocol stack (or the second WLAN AP-side protocol stack and the adaptation layer), so as to obtain the data D; then the AP may determine according to the aforementioned received first offloading indication information that the data D needs to be sent to the base station, and therefore may perform encapsulation processing on the data D by using the first WLAN AP-side protocol stack (or the first WLAN AP-side protocol stack and the adaptation layer), so as to generate a data packet E conforming to the GTP communication manner (an example of a second data packet). A GTP TEID (base station-side GTP TEID) that corresponds to the target user equipment and is allocated by the base station is encapsulated in the data packet E, an uplink GTP tunnel corresponding to the base station-side GTP TEID may be determined according to the aforementioned determined first mapping relationship, and the data packet E is sent to the base station.

After receiving the data packet E, the base station may perform decapsulation processing on the data packet E by using at least one protocol layer of the first base station-side protocol stack and the second base station-side protocol stack, so as to obtain the base station-side GTP TEID and the data D, and determine, according to the base station-side GTP TEID and the determined first mapping relationship that is described above, that the data D is uplink data from the target user equipment, and therefore the base station may send (for example, by using an S1 interface), to a gateway device (such as, a PDN-GW), uplink data D that the target user equipment needs to send to a network side (such as, an EPC).

Case 12

Because at least two bearers are disposed between the base station and the gateway device, the base station needs to learn a bearer to which each piece of data carried in a data packet sent by the AP belongs, so as to send each piece of data to the network side accurately, so that the AP also needs to learn a bearer to which each piece of data sent by the target user equipment belongs, and when encapsulating the data packet sent to the AP, the target user equipment may add, to the data packet, an identifier indicating a bearer to which each piece of data belongs.

For example, the data D that the target user equipment needs to send to the network side includes data D1 to data Dn, where n is the same as a quantity of bearers used when the data D is transmitted between the base station and the gateway device, when encapsulating a data packet (for example, by using at least one layer of the user equipment protocol stack and the WiFi protocol stack), the target user equipment may add, to the data packet, indication information (second bearer indication information) used for indicating bearers to which the data D1 to the data Dn belong, and therefore the AP may learn, according to the second bearer indication information, the bearers to which the data D1 to the data Dn that are sent by the target user equipment belong.

It should be noted that, the MAC layer of the user equipment protocol stack has a function of identifying a bearer shown by data, and therefore, in this embodiment of the present invention, when the WiFi protocol stack is aggregated on the MAC protocol stack of the user equipment protocol stack, the second bearer indication information may be encapsulated in the data packet by using the MAC layer. Moreover, in this embodiment of the present invention, there may be one or n data packets generated when encapsulation processing is performed on the data D1 to the data Dn, which is not particularly limited in the present invention. Additionally, in this embodiment of the present invention, a protocol layer used for encapsulating the second bearer indication information in a data packet (an example of a bearer mapping layer) may be further added to the user equipment protocol stack, and the WiFi protocol stack is aggregated on the bearer mapping layer. Moreover, in this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention.

The AP may learn, according to the second bearer indication information, bearers to which data D1 to data Dn that are sent by the user equipment belong. It should be noted that, the MAC layer of the WiFi protocol stack of the AP has a function of identifying a bearer shown by data, and therefore, in this embodiment of the present invention, when the GTP protocol stack of the AP is aggregated on the MAC protocol stack of the WiFi protocol stack, the second bearer indication information may be obtained from the data packet by using the MAC layer. Moreover, in this embodiment of the present invention, a protocol layer used for obtaining the second bearer indication information from the data packet (an example of a bearer mapping layer) may be further added to the GTP protocol stack, and the GTP protocol stack is aggregated on the bearer mapping layer.

For example, the AP may forward the second bearer information to the base station. The base station may learn, according to the second bearer indication information, bearers to which data D1 to data Dn that are sent by the base station belong. It should be noted that, the MAC layer of the base station protocol stack has a function of identifying a bearer shown by data, and therefore, in this embodiment of the present invention, when the GTP protocol stack is aggregated on the MAC protocol stack of the base station protocol stack, the second bearer indication information may be obtained from the data packet by using the MAC layer. Moreover, in this embodiment of the present invention, a protocol layer used for obtaining the second bearer indication information from the data packet (an example of a bearer mapping layer) may be further added to the base station protocol stack, and the GTP protocol stack is aggregated on the bearer mapping layer. Moreover, in this embodiment of the present invention, the bearer mapping layer may be disposed on the PDCP layer, or may be disposed between the PDCP layer and the RLC layer, or may be disposed between the RLC layer and the MAC layer, which is not particularly limited in the present invention. It should be noted that, if a bearer to which data belongs is indicated in a manner of adding bearer indication information to a data packet, the base station and the WLAN AP may determine, according to the first mapping relationship information and the second mapping relationship information that are determined above, user equipment to which data transmitted between each other belongs.

For another example, N uplink GTP tunnels may be established between the base station and the AP, so that each uplink GTP tunnel is only used for transmitting uplink data on a bearer. The base station may allocate a base station-side GTP TEID for each uplink GTP tunnel, and notify the AP. Moreover, the base station may determine a mapping relationship (a third mapping relationship) between each bearer corresponding to each user equipment and each uplink GTP tunnel, and notify the AP, and therefore the AP may perform encapsulation processing on the data D1 to the data Dn according to the mapping relationship between each base station-side GTP TEID and each uplink GTP tunnel and the mapping relationship between each bearer and each uplink GTP tunnel to generate n data packets, and transmit each data packet by using a tunnel corresponding to each piece of data. For example, the AP may encapsulate the base station-side GTP TEID of the uplink GTP tunnel corresponding to the data D1 in the data packet D1, and send the data packet D1 to the base station. The AP may generate the data packet D2 to the data packet Dn by using a similar method and send the data packet D2 to the data packet Dn to the base station. After performing decapsulation processing on the data packet D1, the base station may learn a base station-side GTP TEID of an uplink GTP tunnel corresponding to the data D1, therefore may determine the uplink GTP tunnel transmitting the data packet D1, and then may determine, according to the aforementioned determined third mapping relationship, a bearer to which the uplink data belongs, and the user equipment sending the uplink data.

Then, the base station may send (for example, by using the S1 interface), to a gateway device (such as, a PDN-GW), the aforementioned obtained uplink data that the target user equipment needs to send to a network side (such as, an EPC), and send each piece of data to the network side by using a corresponding bearer.

Optionally, when the target data is some data on the bearer, the method further includes:

performing, by the user equipment, transmission of non-target data with the base station by using the first user equipment-side protocol stack, where the non-target data is data in all the data on the bearer except the target data.

Specifically, when the data D is a part of all data that the target user equipment needs to send to the network side, the target user equipment further needs to send a residual part (referred to as data F below) to the base station by using a carrier used for communication between the base station and the user equipment (an example of a fourth carrier), the process and the method may be the same as or similar to those in the prior art, and description of the process and the method is omitted herein to avoid repeated description.

Therefore, an uplink data transmission process is completed.

FIG. 6 is a schematic interaction diagram of an uplink data transmission method according to an embodiment of the present invention.

As shown in FIG. 6, in S310, UE can send a MAC address of the UE to an MME.

In S320, the MME can send the MAC address of the UE to a base station.

In S330, the base station can send the MAC address of the UE and a base station-side GTP TEID that is allocated for the UE to an AP.

In S340, the AP can send an AP-side GTP TEID allocated by the AP for the UE to the base station.

In S350, the UE can send a data packet to the AP.

In S360, the AP can determine according to the MAC address that data carried in the data packet needs to be sent to the base station, and can encapsulate the base station-side GTP TEID in the data packet and send the data packet to the base station.

In S370, the base station determines according to the base station-side GTP TEID that the data carried in the data packet is from the UE.

It should be noted that, an embodiment in which the AP communicating with the base station (which is briefly referred to as an AP 1 below for convenience of distinguishing) directly transmits data with the user equipment is listed above, but the present invention is not limited thereto. For example, when the user equipment passes through an AP not communicating with the base station (which is briefly referred to as an AP 2 below for convenience of distinguishing), on a downlink, the base station may send downlink data to the AP 1, the AP 1 transmits the downlink data to the AP 2 in the wireless local area network communication manner, and therefore the AP 2 may transmit the downlink data to the user equipment. On an uplink, the user equipment may transmit uplink data to the AP 2, and the AP 2 transmits the downlink data to the AP 1 in the wireless local area network communication manner, and therefore the AP 1 may transmit the uplink data to the base station.

Moreover, in this embodiment of the present invention, the AP 1 and the AP 2 may directly transmit data between each other, or may perform data transmission through another relay device (such as, one or more APs), which is not particularly limited in the present invention.

According to the data transmission method of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

Data transmission methods according to embodiments of the present invention are described in detail with reference to FIG. 1 to FIG. 9 above, and network switching apparatuses according to embodiments of the present invention are described in detail with reference to FIG. 9 to FIG. 11 below.

FIG. 9 is a schematic block diagram of a data transmission apparatus 600 according to an embodiment of the present invention. A bearer used to transmit data of user equipment is disposed between the apparatus 600 and a gateway device, a General Packet Radio Service Tunneling Protocol GTP tunnel is disposed between the apparatus and the WLAN AP, and as shown in FIG. 9, the apparatus 600 includes:

a first base station-side protocol stack 610, configured to implement data processing on communication with the user equipment;

a second base station-side protocol stack 620, configured to implement data processing on communication with the WLAN AP, where the second base station-side protocol stack 620 is connected to at least one protocol layer of the first base station-side protocol stack 610; and a transceiver unit 630, connected to the second base station-side protocol stack 620, and configured to perform transmission of target data with the user equipment through the GTP tunnel by using the WLAN AP.

Optionally, the transceiver unit 630 is further configured to send first offloading indication information to the WLAN AP, where the first offloading indication information is used for instructing the WLAN AP to transmit the target data between the base station and the user equipment, and the first offloading indication information includes identity information of the user equipment, where a piece of identity information is used for uniquely indicating a piece of user equipment in the communications system.

Optionally, the apparatus further includes:

a determining unit 640, configured to determine a first GTP tunnel corresponding to the user equipment; and the transceiver unit 630 is specifically configured to perform transmission of the target data with the user equipment through the first GTP tunnel by using the WLAN AP.

Optionally, the determining unit 640 is specifically configured to determine a first uplink GTP tunnel corresponding to the user equipment;

the transceiver unit 630 is further configured to send first mapping relationship information to the WLAN AP, where the first mapping relationship information is used for indicating a mapping relationship between a tunnel endpoint identifier TEID of the first uplink GTP tunnel and the user equipment; and the determining unit 640 is further configured to: when the transceiver unit 630 receives, through the first uplink GTP tunnel, data sent by the WLAN AP, determine, according to the first mapping relationship, that the received data is uplink target data sent by the user equipment.

Optionally, the transceiver unit 630 is further configured to receive, by the base station, second mapping relationship information sent by the WLAN AP, where the second mapping relationship information is used for indicating a mapping relationship between a TEID of a first downlink GTP tunnel and the user equipment;

the determining unit 640 is further configured to determine the first downlink GTP tunnel according to the second mapping relationship information received by the transceiver unit 630; and the transceiver unit 630 is specifically configured to send downlink target data to the WLAN AP through the first downlink GTP tunnel determined by the determining unit 640, so that after receiving the data through the first downlink GTP tunnel, the WLAN AP determines the user equipment according to the second mapping relationship information, and forwards the downlink target data to the user equipment.

Optionally, when the user equipment corresponds to at least two bearers, the apparatus further includes:

a determining unit 640, configured to determine a second GTP tunnel corresponding to a bearer to which the target data belongs; and the transceiver unit 630 is further configured to perform transmission of the target data with the user equipment by using the WLAN AP and through the second GTP tunnel determined by the determining unit 640.

Optionally, the determining unit 640 is specifically configured to determine a second uplink GTP tunnel corresponding to a bearer to which the uplink target data belongs;

the transceiver unit 630 is further configured to send third mapping relationship information to the WLAN AP, where the third mapping relationship information is used for indicating a mapping relationship between a TEID of the second uplink GTP tunnel determined by the determining unit 640 and the bearer to which the uplink target data belongs; and the determining unit 640 is further configured to when the transceiver unit 630 receives, through the second uplink GTP tunnel, data sent by the WLAN AP, determine, according to the fourth mapping relationship information, a bearer to which the received data belongs; and configured to determine, according to the bearer to which the received data belongs, that the data received through the second uplink GTP tunnel is target uplink data sent by the user equipment.

Optionally, the transceiver unit 630 is further configured to receive fourth mapping relationship information sent by the WLAN AP, where the fourth mapping relationship information is used for indicating a mapping relationship between a TEID of a second downlink GTP tunnel and a bearer to which the downlink target data belongs;

the determining unit 640 is specifically configured to determine the second downlink GTP tunnel according to the fourth mapping relationship information; and the transceiver unit 630 is specifically configured to send the downlink target data to the WLAN AP through the second downlink GTP tunnel determined by the determining unit 640, so that after receiving the downlink target data through the second downlink GTP tunnel, the WLAN AP determines, according to the third mapping relationship information, the bearer to which the downlink target data belongs, and determines the user equipment according to the bearer to which the downlink target data belongs, so as to send the downlink target data to the user equipment.

Optionally, the transceiver unit 630 is further connected to the first base station-side protocol stack 610, and when the target data is some data on the bearer, the transceiver unit 630 is further configured to perform transmission of non-target data with the user equipment by using the first base station-side protocol stack 610, where the non-target data is data in all the data on the bearer except the target data.

Optionally, the second base station-side protocol stack 620 includes an adaptation layer, the adaptation layer is configured to perform conversion processing on data between the at least one protocol layer of the first base station-side protocol stack 610 and the second base station-side protocol stack 620, and the second base station-side protocol stack 620 is connected to the at least one protocol layer of the first base station-side protocol stack 610 by using the adaptation layer.

Optionally, the second base station-side protocol stack 620 includes a bearer mapping layer, and the bearer mapping layer is configured to determine the bearer to which the target data belongs; and when the user equipment corresponds to at least two bearers, the determining unit 640 is specifically configured to determine a bearer to which downlink target data of the target data belongs by using the bearer mapping layer, and generate first bearer indication information, where the first bearer indication information is used for indicating the bearer to which the downlink target data belongs; and the transceiver unit 630 is further configured to send the first bearer indication information to the WLAN AP, so that the user equipment determines, according to the first bearer indication information forwarded by the WLAN AP, the bearer to which the downlink target data belongs.

Optionally, the transceiver unit 630 is specifically configured to encapsulate the first bearer indication information and the downlink target data in a same data packet by using the bearer mapping layer and send the data packet to the WLAN AP.

Optionally, the second base station-side protocol stack 620 includes a bearer mapping layer, and the bearer mapping layer is configured to determine the bearer to which the target data belongs; and the transceiver unit 630 is further configured to receive second bearer indication information forwarded by the WLAN AP, where the second bearer indication information is used for indicating a bearer to which uplink target data of the target data belongs; and the determining unit 640 is specifically configured to obtain, by using the bearer mapping layer, the second bearer indication information received by the transceiver unit 630, and determine, according to the second bearer indication information, the bearer to which the uplink target data belongs, where the second bearer indication information is determined by the user equipment and sent to the WLAN AP.

Optionally, the determining unit 640 is specifically configured to obtain, by using the bearer mapping layer, the second bearer indication information from a data packet in which the uplink target data is encapsulated.

Optionally, the first base station-side protocol stack 610 includes a resequencing layer, the resequencing layer is configured to determine a location of the target data in all the data on the bearer, and the at least one protocol layer of the first base station-side protocol stack 610 is the resequencing layer; and the determining unit 640 is further configured to determine a location of the downlink target data of the target data in all downlink data on the bearer by using the resequencing layer, and generate first location indication information, where the first location indication information is used for indicating the location of the downlink target data in all the downlink data on the bearer; and the transceiver unit 630 is further configured to send the first location indication information determined by the determining unit 640 to the WLAN AP, so that the user equipment determines the location of the downlink target data in all the downlink data on the bearer according to the first location indication information forwarded by the WLAN AP.

Optionally, the transceiver unit 630 is specifically configured to encapsulate the first location indication information and the downlink target data in a same data packet by using the resequencing layer and send the data packet to the WLAN AP.

Optionally, the first base station-side protocol stack 610 includes a resequencing layer, the resequencing layer is configured to determine a location of the target data in all the data on the bearer, and the at least one protocol layer of the first base station-side protocol stack 610 is the resequencing layer; and the transceiver unit 630 is further configured to receive second location indication information forwarded by the WLAN AP, where the second location indication information is used for indicating a location of the uplink target data of the target data in all uplink data on the bearer; and the determining unit 640 is further configured to obtain, by using the resequencing layer, the second location indication information received by the transceiver unit 630, and determine the location of the uplink target data in all the uplink data on the bearer according to the second location indication information, where the second location indication information is determined by the user equipment and sent to the WLAN AP.

Optionally, the determining unit 640 is specifically configured to obtain, by using the resequencing layer, the second location indication information from a data packet in which the uplink target data is encapsulated.

Optionally, the at least one protocol layer of the first base station-side protocol stack 610 includes at least one of the following protocol layers:

a Packet Data Convergence Protocol PDCP layer, a Radio Link Control RLC layer and a Media Access Control MAC layer.

Optionally, the identity information includes any one piece of the following information:

a MAC address, an Internet Protocol IP address, a basic service set identifier BSSID, an association identifier AID, a mobile subscriber mobile phone number, an international mobile subscriber identity IMSI and an international mobile equipment identity IMEI.

Optionally, the transceiver unit 630 is further configured to send second offloading indication information to the user equipment, where the second offloading indication information is used for instructing to transmit the target data between the user equipment and the WLAN AP.

The data transmission apparatus 600 according to this embodiment of the present invention may correspond to a base station in a method of an embodiment of the present invention, and units, that is, modules in the data transmission apparatus 600 and the foregoing other operations and/or functions are separately to implement a corresponding process of a method 100 in FIG. 4. For purpose of conciseness, details are not described herein again.

According to the data transmission apparatus of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

Figure 10:
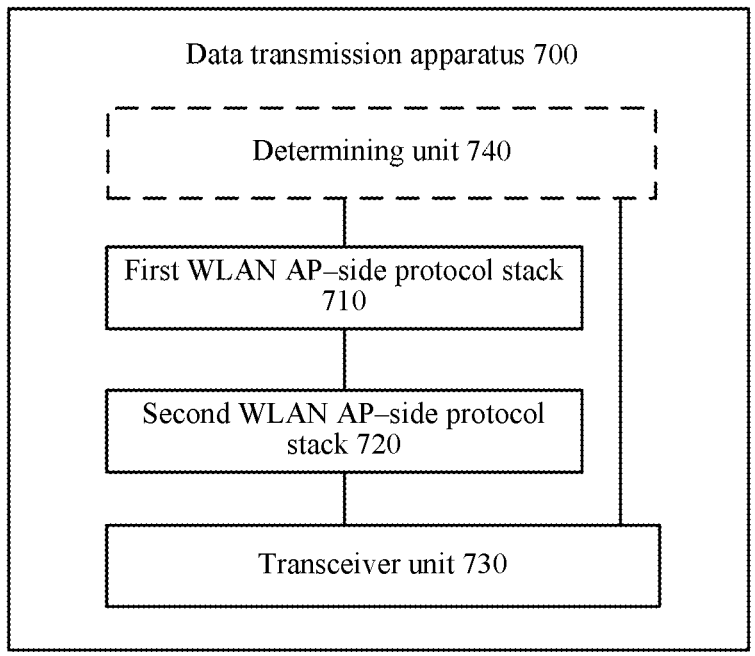
FIG. 10 is a schematic block diagram of a signal transmission apparatus according to another embodiment of the present invention.

FIG. 10 is a schematic block diagram of a data transmission apparatus 700 according to an embodiment of the present invention. A General Packet Radio Service Tunneling Protocol GTP tunnel is disposed between the apparatus 700 and a base station, a bearer used to transmit data of user equipment is disposed between the base station and a gateway device, and as shown in FIG. 10, the apparatus 700 includes:

a first WLAN AP-side protocol stack 710, configured to implement data processing on communication with the base station;

a second WLAN AP-side protocol stack 720, connected to the first WLAN AP-side protocol stack 710, and configured to implement data processing on communication with the user equipment; and a transceiver unit 730, connected to the first WLAN AP-side protocol stack 710 and the second WLAN AP-side protocol stack 720, and configured to transmit target data of the user equipment with the base station through the GTP tunnel.

Optionally, the transceiver unit 730 is specifically configured to receive first offloading indication information sent by the base station, where the first offloading indication information is used for instructing the WLAN AP to transmit the target data between the base station and the user equipment, and the first offloading indication information includes identity information of the user equipment, where a piece of identity information is used for uniquely indicating a piece of user equipment in the communications system; and configured to transmit target data of the user equipment with the base station according to the first offloading indication information and through the GTP tunnel.

Optionally, the apparatus further includes:

a determining unit 740, configured to determine a first GTP tunnel corresponding to the user equipment according to the identity information of the user equipment; and the transceiver unit 730 is specifically configured to transmit the target data of the user equipment with the base station through the first GTP tunnel determined by the determining unit 740.

Optionally, the transceiver unit 730 is further configured to receive first mapping relationship information sent by the base station, where the first mapping relationship information is used for indicating a mapping relationship between a tunnel endpoint identifier TEID of a first uplink GTP tunnel corresponding to the user equipment and the user equipment;

the determining unit 740 is specifically configured to determine the first uplink GTP tunnel according to the identity information of the user equipment and the first mapping relationship information; and the transceiver unit 730 is specifically configured to receive uplink target data sent by the user equipment, and send the uplink target data to the base station through the first uplink GTP tunnel determined by the determining unit 740, so that after receiving the data through the first uplink GTP tunnel, the base station determines according to the first mapping relationship information that the received data is the uplink target data sent by the user equipment.

Optionally, the determining unit 740 is specifically configured to determine a first downlink GTP tunnel corresponding to the user equipment according to the identity information of the user equipment;

the transceiver unit 730 is further configured to send first mapping relationship information to the base station, where the second mapping relationship information is used for indicating a mapping relationship between a TEID of the first downlink GTP tunnel determined by the determining unit 740 and the user equipment;

the determining unit 740 is further configured to: after the transceiver unit 730 receives, through the first downlink GTP tunnel, data transmitted by the base station, determine according to the first mapping relationship information that the received data is downlink target data that needs to be sent to the user equipment; and the transceiver unit 730 is specifically configured to obtain a Media Access Control MAC layer address of the user equipment, and send the downlink target data to the user equipment according to the MAC layer address of the user equipment.

Optionally, when the user equipment corresponds to at least two bearers, the transceiver unit 730 is further configured to receive first bearer indication information sent by the base station, and forward the first bearer indication information to the user equipment, where the first bearer indication information is used for indicating a bearer to which the downlink target data belongs; or the transceiver unit 730 is further configured to receive second bearer indication information sent by the user equipment, and forward the second bearer indication information to the base station, where the second bearer indication information is used for indicating a bearer to which the uplink target data belongs.

Optionally, an adaptation layer is disposed between the first WLAN AP-side protocol stack 710 and the second WLAN AP-side protocol stack 720, and the adaptation layer is configured to perform conversion processing on data between the first WLAN AP-side protocol stack 710 and the second WLAN AP-side protocol stack 720.

Optionally, when the user equipment corresponds to at least two bearers, the apparatus further includes:

a determining unit 740, configured to determine, according to the identity information of the user equipment, a second GTP tunnel corresponding to a bearer to which the target data belongs; and the transceiver unit 730 is further configured to transmit the target data of the user equipment with the base station through the second GTP tunnel determined by the determining unit 740.

Optionally, the transceiver unit 730 is further configured to receive third mapping relationship information sent by the base station, where the third mapping relationship information is used for indicating a mapping relationship between a TEID of a second uplink GTP tunnel and the bearer to which the uplink target data belongs;

the determining unit 740 is specifically configured to determine the second uplink GTP tunnel according to the third mapping relationship information received by the transceiver unit 730 and the identity information of the user equipment; and the transceiver unit 730 is specifically configured to receive data sent by the user equipment and the second bearer indication information used for indicating a bearer to which the data belongs;

the determining unit 740 is specifically configured to determine according to the second bearer indication information that the received data is the uplink target data of the user equipment; and the transceiver unit 730 is specifically configured to send the uplink target data to the base station through the second uplink GTP tunnel.

Optionally, the second WLAN AP-side protocol stack 720 includes a bearer mapping layer, and the bearer mapping layer is configured to determine the bearer to which the target data belongs; and the determining unit 740 is specifically configured to obtain, by using the bearer mapping layer, the second bearer indication information received by the transceiver unit 730.

Optionally, the determining unit 740 is specifically configured to obtain, by using the bearer mapping layer, the second bearer indication information from a data packet in which the uplink target data is encapsulated and that is received by the transceiver unit 730.

Optionally, the determining unit 740 is specifically configured to determine, according to the identity information of the user equipment, a second downlink GTP tunnel corresponding to a bearer to which the downlink target data belongs;

the transceiver unit 730 is further configured to send fourth mapping relationship information to the base station, where the fourth mapping relationship information is used for indicating a mapping relationship between a TEID of the second downlink GTP tunnel and the bearer to which the downlink target data belongs;

the determining unit 740 is further configured to: after the transceiver unit 730 receives, through the second downlink GTP tunnel, data transmitted by the base station, determine according to the fourth mapping relationship information, the bearer to which the received data belongs, and determine according to information about the bearer that the received data is the downlink target data of the user equipment; and the transceiver unit 730 is further configured to obtain a MAC layer address of the user equipment according to the identity information of the user equipment, and send, to the user equipment according to the MAC layer address of the user equipment, the downlink target data and the first bearer indication information that is used for indicating the bearer to which the downlink target data belongs.

Optionally, the second WLAN AP-side protocol stack 720 includes a bearer mapping layer, and the bearer mapping layer is configured to determine the bearer to which the target data belongs; and the determining unit 740 is further configured to generate the first bearer indication information by using the bearer mapping layer; and the transceiver unit 730 is further configured to send the downlink target data and the first bearer indication information to the user equipment, so that the user equipment determines, according to the first bearer indication information, the bearer to which the downlink target data belongs.

Optionally, the transceiver unit 730 is specifically configured to encapsulate the first bearer indication information and the downlink target data in a same data packet by using the bearer mapping layer and send the data packet to the user equipment.

Optionally, the identity information includes any one piece of the following information:

a MAC address, an Internet Protocol IP address, a basic service set identifier BSSID, an association identifier AID, a mobile subscriber mobile phone number, an international mobile subscriber identity IMSI and an international mobile equipment identity IMEI.

The data transmission apparatus 700 according to this embodiment of the present invention may correspond to an AP in a method of an embodiment of the present invention, and units, that is, modules in the data transmission apparatus 700 and the foregoing other operations and/or functions are separately to implement a corresponding process of a method 400 in FIG. 7. For purpose of conciseness, details are not described herein again.

According to the data transmission apparatus of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

Figure 11:
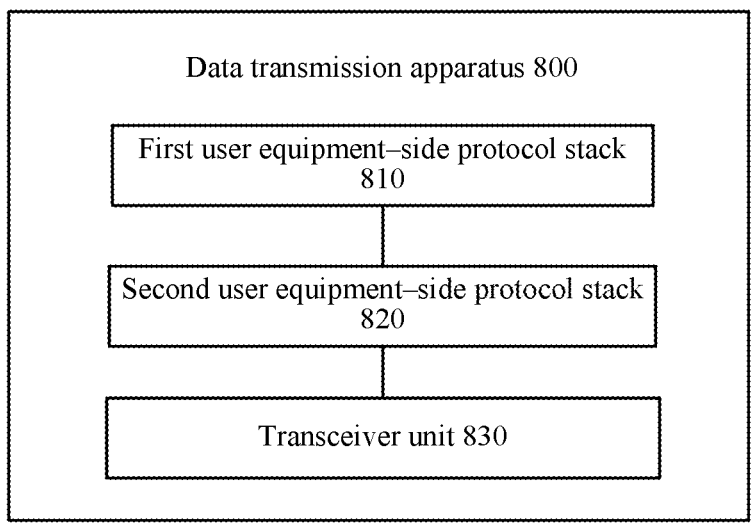
FIG. 11 is a schematic block diagram of a signal transmission apparatus according to still another embodiment of the present invention.

FIG. 11 is a schematic block diagram of a data transmission apparatus 800 according to an embodiment of the present invention. As shown in FIG. 11, the apparatus 800 includes:

a first user equipment-side protocol stack 810, configured to implement data processing on communication with a base station, where a bearer used to transmit data of the user equipment is disposed between the base station and a gateway device, a General Packet Radio Service Tunneling Protocol GTP tunnel is disposed between the base station and a WLAN AP;

a second user equipment-side protocol stack 820, configured to implement data processing on communication with the WLAN AP, where the second user equipment-side protocol stack 820 is connected to at least one protocol layer of the first user equipment-side protocol stack 810; and a transceiver unit 830, connected to the second user equipment-side protocol stack 820, and configured to perform transmission of target data with the base station through the WLAN AP, where the target data is transmitted between the WLAN AP and the base station through the GTP tunnel.

Optionally, the transceiver unit 830 is further configured to receive second offloading indication information sent by the base station, where the second offloading indication information is used for instructing to transmit the target data between the user equipment and the WLAN AP; and configured to determine according to the second offloading indication information that the user equipment needs to perform transmission of the target data with the base station through the WLAN AP.

Optionally, the transceiver unit 830 is further connected to the first user equipment-side protocol stack 810, and when the target data is some data on the bearer, the transceiver unit 830 is further configured to perform transmission of non-target data with the base station by using the first user equipment-side protocol stack 810, where the non-target data is data in all the data on the bearer except the target data.

Optionally, the second user equipment-side protocol stack 820 includes an adaptation layer, the adaptation layer is configured to perform conversion processing on data between the at least one protocol layer of the first user equipment-side protocol stack 810 and the second user equipment-side protocol stack 820, and the second user equipment-side protocol stack 820 is connected to the at least one protocol layer of the first user equipment-side protocol stack 810 by using the adaptation layer.

Optionally, the second user equipment-side protocol stack 820 includes a bearer mapping layer, and the bearer mapping layer is configured to determine the bearer to which the target data belongs; and when the user equipment corresponds to at least two bearers, the transceiver unit 830 is further configured to determine a bearer to which uplink target data of the target data belongs, and generate second bearer indication information by using the bearer mapping layer, where the second bearer indication information is used for indicating the bearer to which the uplink target data belongs; and configured to send the second bearer indication information to the WLAN AP, so that the base station determines, according to the second bearer indication information forwarded by the WLAN AP or a second uplink GTP tunnel corresponding to the bearer to which the uplink target data belongs, the bearer to which the uplink target data belongs.

Optionally, the transceiver unit 830 is further configured to encapsulate the second bearer indication information and the uplink target data in a same data packet by using the bearer mapping layer and send the data packet to the WLAN AP.

Optionally, the second user equipment-side protocol stack 820 includes a bearer mapping layer, and the bearer mapping layer is configured to determine the bearer to which the target data belongs; and when the user equipment corresponds to at least two bearers, the transceiver unit 830 is further configured to obtain, by using the bearer mapping layer, first bearer indication information sent by the WLAN AP, where the first bearer indication information is used for indicating a bearer to which the downlink target data of the target data belongs; and configured to determine, according to the first bearer indication information, the bearer to which the downlink target data belongs, where the first bearer indication information is obtained by the WLAN AP from the base station, or determined by the WLAN AP according to a second downlink GTP tunnel corresponding to the bearer to which the downlink target data belongs.

Optionally, the transceiver unit 830 is specifically configured to obtain, by using the bearer mapping layer, the second bearer indication information from a data packet in which the downlink target data is encapsulated.

Optionally, the first base station-side protocol stack includes a resequencing layer, the resequencing layer is configured to determine a location of the target data in all the data on the bearer, and the at least one protocol layer of the first user equipment-side protocol stack 810 is the resequencing layer; and the transceiver unit 830 is specifically configured to determine a location of the uplink target data of the target data in all uplink data on the bearer and generate second location indication information by using the resequencing layer, where the second location indication information is used for indicating the location of the uplink target data in all the uplink data on the bearer; and configured to send the second location indication information to the WLAN AP, so that the base station determines the location of the uplink target data in all the uplink data on the bearer according to the second location indication information forwarded by the WLAN AP.

Optionally, the transceiver unit 830 is specifically configured to encapsulate the second location indication information and the uplink target data in a same data packet by using the resequencing layer and send the data packet to the WLAN AP.

Optionally, the first base station-side protocol stack includes a resequencing layer, the resequencing layer is configured to determine a location of the target data in all the data on the bearer, and the at least one protocol layer of the first user equipment-side protocol stack 810 is the resequencing layer; and the transceiver unit 830 is further configured to obtain, by using the resequencing layer, first location indication information forwarded by the WLAN AP, where the first location indication information is used for indicating a location of the downlink target data of the target data in all downlink data on the bearer; and configured to determine the location of the downlink target data in all the downlink data on the bearer according to the first location indication information, where the first location indication information is determined by the base station and sent to the WLAN AP.

Optionally, the transceiver unit 830 is specifically configured to obtain, by using the resequencing layer, the first location indication information from a data packet in which the downlink target data is encapsulated.

Optionally, the at least one protocol layer of the first user equipment-side protocol stack 810 includes at least one of the following protocol layers:

a Packet Data Convergence Protocol PDCP layer, a Radio Link Control RLC layer and a Media Access Control MAC layer.

The data transmission apparatus 800 according to this embodiment of the present invention may correspond to user equipment (target user equipment) in a method of an embodiment of the present invention, and units, that is, modules in the data transmission apparatus 800 and the foregoing other operations and/or functions are separately to implement a corresponding process of a method 500 in FIG. 8. For purpose of conciseness, details are not described herein again.

According to the data transmission apparatus of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

Data transmission methods according to embodiments of the present invention are described in detail with reference to FIG. 1 to FIG. 9 above, and network switching devices according to embodiments of the present invention are described in detail with reference to FIG. 12 to FIG. 14 below.

Figure 12:
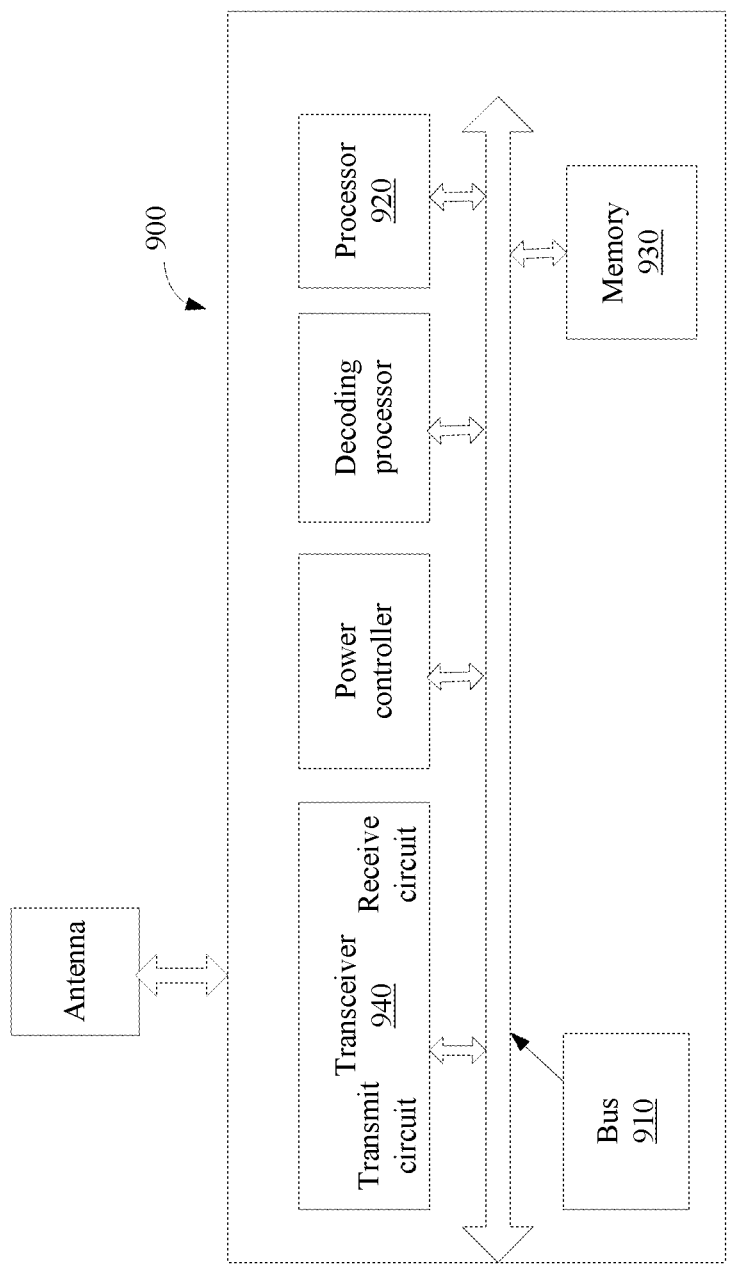
FIG. 12 is a schematic diagram of a structure of a signal transmission device according to an embodiment of the present invention.

FIG. 12 is a schematic block diagram of a data transmission device 900 according to an embodiment of the present invention. A bearer used to transmit data of user equipment is disposed between the device 900 and a gateway device, a General Packet Radio Service Tunneling Protocol GTP tunnel is disposed between the device and the WLAN AP, and as shown in FIG. 12, the device 900 includes:

a bus 910;

a processor 920 connected to the bus 910;

a memory 930 connected to the bus 910; and a transceiver 940 connected to the bus 910, where the processor 920 invokes, by using the bus 910, a program stored in the memory 930, so as to be configured to control the transceiver 940 to send first offloading indication information to the WLAN AP, where the first offloading indication information is used for instructing the WLAN AP to transmit the target data between the base station and the user equipment, and the first offloading indication information includes identity information of the user equipment, where a piece of identity information is used for uniquely indicating a piece of user equipment in the communications system; and control the transceiver 940 to perform transmission of target data with the user equipment through the GTP tunnel by using the WLAN AP, where the target data is all or some data on the bearer.

Optionally, the processor 920 is further configured to determine a first GTP tunnel corresponding to the user equipment; and configured to control the transceiver 940 to perform transmission of the target data with the user equipment through the first GTP tunnel by using the WLAN AP.

Optionally, the processor 920 is specifically configured to determine a first uplink GTP tunnel corresponding to the user equipment; and configured to control the transceiver 940 to send first mapping relationship information to the WLAN AP, where the first mapping relationship information is used for indicating a mapping relationship between a tunnel endpoint identifier TEID of the first uplink GTP tunnel and the user equipment; and configured to: when the transceiver 940 receives, through the first uplink GTP tunnel, data sent by the WLAN AP, determine, according to the first mapping relationship, that the received data is uplink target data sent by the user equipment.

Optionally, the processor 920 is specifically configured to control the transceiver 940 to receive second mapping relationship information sent by the WLAN AP, where the second mapping relationship information is used for indicating a mapping relationship between a TEID of a first downlink GTP tunnel and the user equipment;

configured to determine the first downlink GTP tunnel according to the second mapping relationship information; and configured to control the transceiver 940 to send downlink target data to the WLAN AP through the first downlink GTP tunnel, so that after receiving the data through the first downlink GTP tunnel, the WLAN AP determines the user equipment according to the second mapping relationship information, and forwards the downlink target data to the user equipment.

Optionally, when the user equipment corresponds to at least two bearers, the processor 920 is specifically configured to determine a second GTP tunnel corresponding to a bearer to which the target data belongs; and configured to control the transceiver 940 to perform transmission of the target data with the user equipment through the second GTP tunnel by using the WLAN AP.

Optionally, the processor 920 is specifically configured to determine a second uplink GTP tunnel corresponding to a bearer to which the uplink target data belongs;

configured to control the transceiver 940 to send third mapping relationship information to the WLAN AP, where the third mapping relationship information is used for indicating a mapping relationship between a TEID of the second uplink GTP tunnel and the bearer to which the uplink target data belongs; and configured to: when the transceiver 940 receives, through the second uplink GTP tunnel, data sent by the WLAN AP, determine, according to the third mapping relationship information, a bearer to which the received data belongs; and configured to determine, according to the bearer to which the received data belongs, that the data received through the second uplink GTP tunnel is target uplink data sent by the user equipment.

Optionally, the processor 920 is specifically configured to control the transceiver 940 to receive fourth mapping relationship information sent by the WLAN AP, where the fourth mapping relationship information is used for indicating a mapping relationship between a TEID of a second downlink GTP tunnel and a bearer to which the downlink target data belongs;

configured to determine the second downlink GTP tunnel according to the fourth mapping relationship information; and configured to control the transceiver 940 to send the downlink target data to the WLAN AP through the second downlink GTP tunnel, so that after receiving the downlink target data through the second downlink GTP tunnel, the WLAN AP determines, according to the fourth mapping relationship information, the bearer to which the downlink target data belongs, and determines the user equipment according to the bearer to which the downlink target data belongs and information about the bearer, so as to send the downlink target data to the user equipment.

Optionally, the device has a first base station-side protocol stack and a second base station-side protocol stack, the first base station-side protocol stack is configured to implement data processing on communication with the user equipment, and the second base station-side protocol stack is configured to implement data processing on communication with the WLAN AP, where the second base station-side protocol stack is connected to at least one protocol layer of the first base station-side protocol stack; and the processor 920 is specifically configured to control the transceiver 940 to perform transmission of the target data with the user equipment by using at least one layer of the first base station-side protocol stack and the second base station-side protocol stack, through the GTP tunnel, and by using the WLAN AP.

Optionally, the processor 920 is further configured to control the transceiver 940 to perform transmission of non-target data with the user equipment by using the first base station-side protocol stack, where the non-target data is data in all the data on the bearer except the target data.

Optionally, the second base station-side protocol stack includes an adaptation layer, the adaptation layer is configured to perform conversion processing on data between the at least one protocol layer of the first base station-side protocol stack and the second base station-side protocol stack, and the second base station-side protocol stack is connected to the at least one protocol layer of the first base station-side protocol stack by using the adaptation layer; and the processor 920 is specifically configured to input the downlink target data to the at least one protocol layer of the first base station-side protocol stack, convert, by using the adaptation layer, a data format of data output from the at least one protocol layer of the first base station-side protocol stack into a data format that the second base station-side protocol stack can identify, transmit the data to the second base station-side protocol stack, and control the transceiver 940 to send the data output from the second base station-side protocol stack to the WLAN AP through the GTP tunnel, so as to send the data to the user equipment by using the WLAN AP; or the processor 920 is specifically configured to input data obtained by the transceiver 940 from the WLAN AP to the second base station-side protocol stack through the GTP tunnel, convert, by using the adaptation layer, a data format of data output from the second base station-side protocol stack into a data format that the at least one protocol layer of the first base station-side protocol stack can identify, and transmit the data to the at least one protocol layer of the first base station-side protocol stack, so as to obtain the uplink target data of the user equipment.

Optionally, the second base station-side protocol stack includes a bearer mapping layer, and the bearer mapping layer is configured to determine the bearer to which the target data belongs; and when the user equipment corresponds to at least two bearers, the performing, by the base station, transmission of target data with the user equipment through the GTP tunnel by using the WLAN AP includes:

determining, by the base station, a bearer to which downlink target data of the target data belongs by using the bearer mapping layer, and generating first bearer indication information by using the bearer mapping layer, where the first bearer indication information is used for indicating the bearer to which the downlink target data belongs; and sending, by the base station, the first bearer indication information to the WLAN AP, so that the user equipment determines, according to the first bearer indication information forwarded by the WLAN AP, the bearer to which the downlink target data belongs.

Optionally, the processor 920 is specifically configured to control the transceiver 940 to encapsulate the first bearer indication information and the downlink target data in a same data packet by using the bearer mapping layer and send the data packet to the WLAN AP.

Optionally, the second base station-side protocol stack includes a bearer mapping layer, and the bearer mapping layer is configured to determine the bearer to which the target data belongs; and the processor 920 is specifically configured to obtain, by using the bearer mapping layer, second bearer indication information forwarded by the WLAN AP and received by the transceiver 940, where the second bearer indication information is used for indicating a bearer to which uplink target data of the target data belongs; and configured to determine, according to the second bearer indication information, the bearer to which the uplink target data belongs, where the second bearer indication information is determined by the user equipment and sent to the WLAN AP.

Optionally, the processor 920 is specifically configured to control the transceiver 940 to obtain, by using the bearer mapping layer, the second bearer indication information from a data packet in which the uplink target data is encapsulated.

Optionally, the first base station-side protocol stack includes a resequencing layer, the resequencing layer is configured to determine a location of the target data in all the data on the bearer, and the at least one protocol layer of the first base station-side protocol stack is the resequencing layer; and the processor 920 is specifically configured to determine a location of the downlink target data of the target data in all downlink data on the bearer by using the resequencing layer, and generate first location indication information by using the resequencing layer, where the first location indication information is used for indicating the location of the downlink target data in all the downlink data on the bearer; and configured to control the transceiver 940 to send the first location indication information to the WLAN AP, so that the user equipment determines the location of the downlink target data in all the downlink data on the bearer according to the first location indication information forwarded by the WLAN AP.

Optionally, the processor 920 is specifically configured to control the transceiver 940 to encapsulate the first location indication information and the downlink target data in a same data packet by using the resequencing layer and send the data packet to the WLAN AP.

Optionally, the first base station-side protocol stack includes a resequencing layer, the resequencing layer is configured to determine a location of the target data in all the data on the bearer, and the at least one protocol layer of the first base station-side protocol stack is the resequencing layer; and the processor 920 is specifically configured to obtain, by using the resequencing layer, second location indication information forwarded by the WLAN AP and received by the transceiver 940, where the second location indication information is used for indicating a location of the uplink target data of the target data in all uplink data on the bearer; and configured to determine the location of the uplink target data in all the uplink data on the bearer according to the second location indication information, where the second location indication information is determined by the user equipment and sent to the WLAN AP.

Optionally, the processor 920 is specifically configured to obtain, by using the resequencing layer, the second location indication information from a data packet in which the uplink target data is encapsulated.

Optionally, the at least one protocol layer of the first base station-side protocol stack includes at least one of the following protocol layers:

a Packet Data Convergence Protocol PDCP layer, a Radio Link Control RLC layer and a Media Access Control MAC layer.

Optionally, the identity information includes any one piece of the following information:

a MAC address, an Internet Protocol IP address, a basic service set identifier BSSID, an association identifier AID, a mobile subscriber mobile phone number, an international mobile subscriber identity IMSI and an international mobile equipment identity IMEI.

Optionally, the processor 920 is further configured to control the transceiver 940 to send second offloading indication information to the user equipment, where the second offloading indication information is used for instructing to transmit the target data between the user equipment and the WLAN AP.

The data transmission device 900 according to this embodiment of the present invention may correspond to a base station in a method of an embodiment of the present invention, and units, that is, modules in the data transmission device 900 and the foregoing other operations and/or functions are separately to implement a corresponding process of a method 100 in FIG. 4. For purpose of conciseness, details are not described herein again.

According to the data transmission device of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

Figure 13:
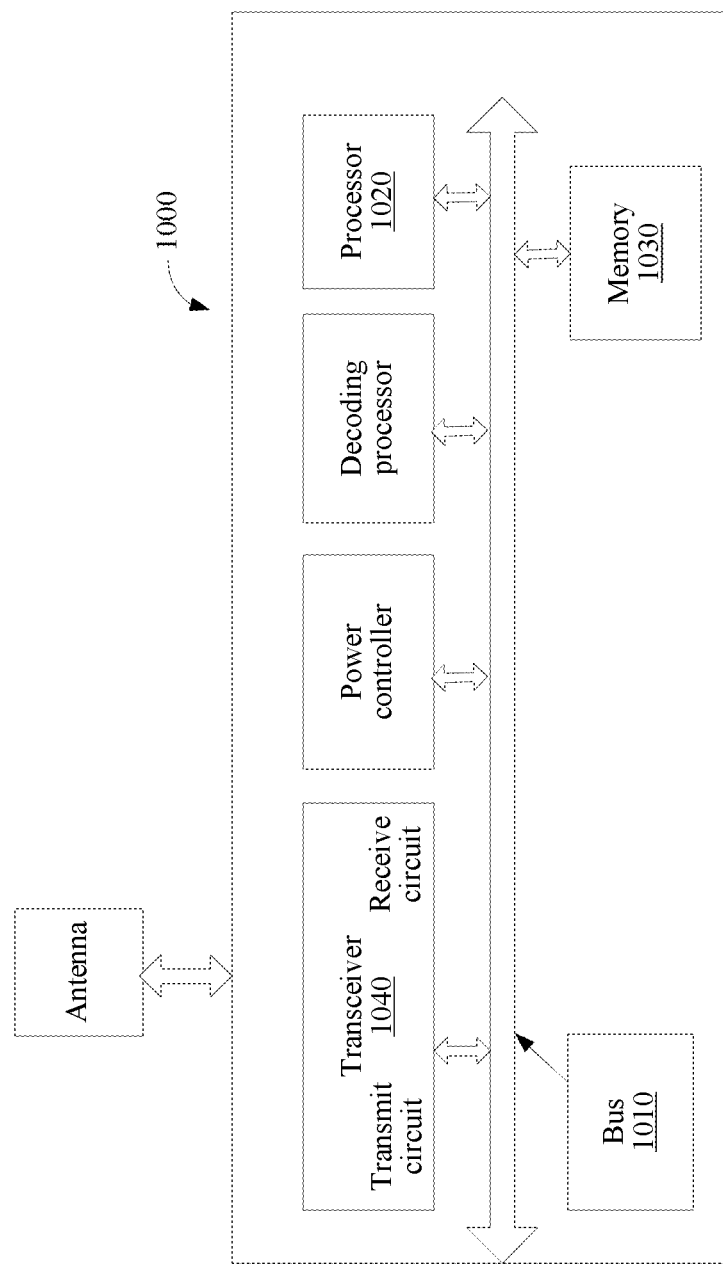
FIG. 13 is a schematic diagram of a structure of a signal transmission device according to another embodiment of the present invention.

FIG. 13 is a schematic block diagram of a data transmission device 1000 according to an embodiment of the present invention. A General Packet Radio Service Tunneling Protocol GTP tunnel is disposed between the device 1000 and a base station, a bearer used to transmit data of user equipment is disposed between the base station and a gateway device, and as shown in FIG. 13, the device 1000 includes:

a bus 1010;
a processor 1020 connected to the bus 1010;
a memory 1030 connected to the bus 1010; and
a transceiver 1040 connected to the bus 1010, where the processor 1020 invokes, by using the bus 1010, a program stored in the memory 1030, so as to be configured to control the transceiver 1040 to receive first offloading indication information sent by the base station, where the first offloading indication information is used for instructing the WLAN AP to transmit the target data between the base station and the user equipment, and the first offloading indication information includes identity information of the user equipment, where a piece of identity information is used for uniquely indicating a piece of user equipment in the communications system; and configured to control the transceiver 1040 to transmit target data of the user equipment with the base station according to the first offloading indication information and through the GTP tunnel.

Optionally, the processor 1020 is specifically configured to determine a first GTP tunnel corresponding to the user equipment according to user information of the user equipment; and configured to control the transceiver 1040 to transmit the target data of the user equipment with the base station through the first GTP tunnel.

Optionally, the processor 1020 is specifically configured to control the transceiver 1040 to receive first mapping relationship information sent by the base station, where the first mapping relationship information is used for indicating a mapping relationship between a tunnel endpoint identifier TEID of a first uplink GTP tunnel corresponding to the user equipment and the user equipment;

configured to determine the first uplink GTP tunnel according to the identity information of the user equipment and the first mapping relationship information;

configured to control the transceiver 1040 to receive uplink target data sent by the user equipment; and configured to control the transceiver 1040 to send the uplink target data to the base station through the first uplink GTP tunnel, so that after receiving the data through the first uplink GTP tunnel, the base station determines according to the first mapping relationship information that the received data is the uplink target data sent by the user equipment.

The processor 1020 is specifically configured to determine a first downlink GTP tunnel corresponding to the user equipment according to user information of the user equipment; and configured to control the transceiver 1040 to send second mapping relationship information to the base station, where the second mapping relationship information is used for indicating a mapping relationship between a TEID of the first downlink GTP tunnel and the user equipment; and configured to: after the transceiver 1040 receives, through the first downlink GTP tunnel, data transmitted by the base station, determine according to the second mapping relationship information that the received data is downlink target data that needs to be sent to the user equipment; and configured to obtain a Media Access Control MAC layer address of the user equipment, and control the transceiver 1040 to send the downlink target data to the user equipment according to the MAC layer address of the user equipment.

Optionally, when the user equipment corresponds to at least two bearers, the processor 1020 is specifically configured to control the transceiver 1040 to receive first bearer indication information sent by the base station, and forward the first bearer indication information to the user equipment, where the first bearer indication information is used for indicating a bearer to which the downlink target data belongs; or configured to control the transceiver 1040 to receive second bearer indication information sent by the user equipment, and forward the second bearer indication information to the base station, where the second bearer indication information is used for indicating a bearer to which the uplink target data belongs.

Optionally, the device further has a first WLAN AP-side protocol stack and a second WLAN AP-side protocol stack, the first WLAN AP-side protocol stack is configured to implement, on a WLAN AP side, data processing on communication with the base station, and the second WLAN AP-side protocol stack is configured to implement, on the WLAN AP side, data processing on communication with the user equipment; and the processor 1020 is specifically configured to control the transceiver 1040 to transmit target data of the user equipment with the base station according to the first offloading indication information and by using the first WLAN AP-side protocol stack; and configured to control the transceiver 1040 to transmit the target data with the user equipment according to the first offloading indication information and by using the second WLAN AP-side protocol stack.

Optionally, an adaptation layer is disposed between the first WLAN AP-side protocol stack and the second WLAN AP-side protocol stack, and the adaptation layer is configured to perform conversion processing on data between the first WLAN AP-side protocol stack and the second WLAN AP-side protocol stack; and the processor 1020 is specifically configured to input, according to the first offloading indication information, data received by the transceiver 1040 from the base station to the first WLAN AP-side protocol stack, convert, by using the adaptation layer, a data format of data output from the first WLAN AP-side protocol stack into a data format that the second WLAN AP-side protocol stack can identify, transmit the data to the second WLAN AP-side protocol stack, and send, by using the transceiver 1040, data output from the second WLAN AP-side protocol stack to the user equipment; or the processor 1020 is specifically configured to input, according to the first offloading indication information, data received by the transceiver 1040 from the user equipment to the second WLAN AP-side protocol stack, convert, by using the adaptation layer, a data format of data output from the second WLAN AP-side protocol stack into a data format that the first WLAN AP-side protocol stack can identify, transmit the data to the first WLAN AP-side protocol stack, and control the transceiver 1040 to send data output from the first WLAN AP-side protocol stack to the base station.

Optionally, when the user equipment corresponds to at least two bearers, the processor 1020 is specifically configured to determine, according to the identity information of the user equipment, a second GTP tunnel corresponding to a bearer to which the target data belongs; and control the transceiver 1040 to transmit the target data of the user equipment with the base station through the second GTP tunnel.

Optionally, the processor 1020 is specifically configured to control the transceiver 1040 to receive third mapping relationship information sent by the base station, where the third mapping relationship information is used for indicating a mapping relationship between a TEID of a second uplink GTP tunnel and the bearer to which the uplink target data belongs;

configured to determine the second uplink GTP tunnel according to the identity information of the user equipment and the third mapping relationship information; and configured to control the transceiver 1040 to receive data sent by the user equipment and the second bearer indication information used for indicating a bearer to which the data belongs;

configured to determine according to the second bearer indication information that the received data is the uplink target data; and configured to control the transceiver 1040 to send the uplink target data to the base station through the second uplink GTP tunnel.

Optionally, the second WLAN AP-side protocol stack includes a bearer mapping layer, and the bearer mapping layer is configured to determine the bearer to which the target data belongs; and the processor 1020 is specifically configured to obtain, by using the bearer mapping layer, the second bearer indication information sent by the user equipment.

Optionally, the processor 1020 is specifically configured to obtain, by using the bearer mapping layer, the second bearer indication information from a data packet in which the uplink target data is encapsulated and that is received by the transceiver 1040.

Optionally, the processor 1020 is specifically configured to determine, according to the identity information of the user equipment, a second downlink GTP tunnel corresponding to a bearer to which the downlink target data belongs;

configured to control the transceiver 1040 to send fourth mapping relationship information to the base station, where the fourth mapping relationship information is used for indicating a mapping relationship between a TEID of the second downlink GTP tunnel and the bearer to which the downlink target data belongs; and the processor 1020 is specifically configured to control the transceiver 1040 to receive, through the second downlink GTP tunnel, data transmitted by the base station;

configured to determine according to the fourth mapping relationship information that the received data is the downlink target data, and determine the bearer to which the downlink target data belongs; and configured to obtain a MAC layer address of the user equipment, and control the transceiver 1040 to send, to the user equipment according to the MAC layer address of the user equipment, the downlink target data and the first bearer indication information that is used for indicating the bearer to which the downlink target data belongs.

Optionally, the second WLAN AP-side protocol stack includes a bearer mapping layer, and the bearer mapping layer is configured to determine the bearer to which the target data belongs; and the processor 1020 is specifically configured to generate the first bearer indication information by using the bearer mapping layer; and configured to control the transceiver 1040 to send the downlink target data and the first bearer indication information to the user equipment, so that the user equipment determines, according to the first bearer indication information, the bearer to which the downlink target data belongs.

Optionally, the processor 1020 is specifically configured to encapsulate the first bearer indication information and the downlink target data in a same data packet by using the bearer mapping layer and send the data packet to the user equipment by using the transceiver 1040.

Optionally, the identity information includes any one piece of the following information:

a MAC address, an Internet Protocol IP address, a basic service set identifier BSSID, an association identifier AID, a mobile subscriber mobile phone number, an international mobile subscriber identity IMSI and an international mobile equipment identity IMEI.

The data transmission device 1000 according to this embodiment of the present invention may correspond to an AP in a method of an embodiment of the present invention, and units, that is, modules in the data transmission device 1000 and the foregoing other operations and/or functions are separately to implement a corresponding process of a method 400 in FIG. 7. For purpose of conciseness, details are not described herein again.

According to the data transmission device of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

Figure 14:
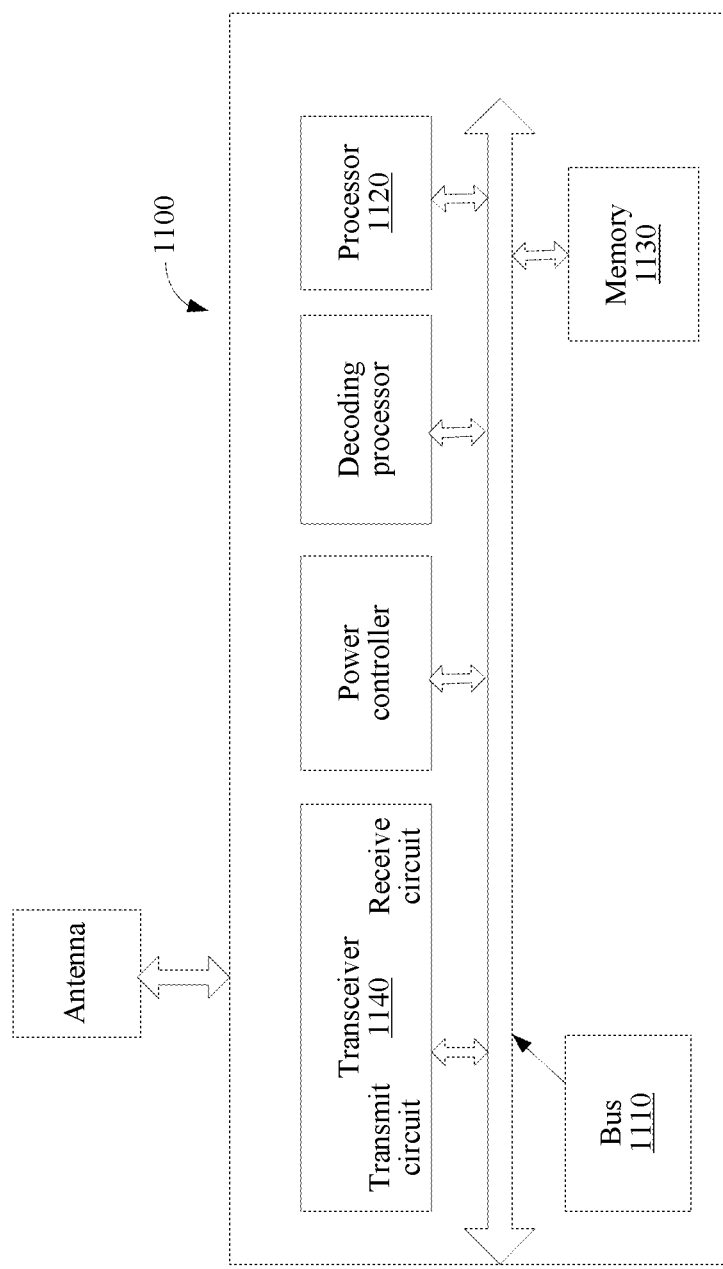
FIG. 14 is a schematic diagram of a structure of a signal transmission device according to still another embodiment of the present invention.

FIG. 14 is a schematic block diagram of a data transmission device 1100 according to an embodiment of the present invention. As shown in FIG. 11, the device 1100 includes:

a bus 1110;

a processor 1120 connected to the bus 1110;

a memory 1130 connected to the bus 1110; and a transceiver 1140 connected to the bus 1110, where the processor 1120 invokes, by using the bus 1110, a program stored in the memory 1130, so as to be configured to determine that transmission of target data needs to be performed with a base station through a WLAN AP, where a bearer used to transmit data of the user equipment is disposed between the base station and a gateway device, and a General Packet Radio Service Tunneling Protocol GTP tunnel is disposed between the base station and the WLAN AP;

configured to control the transceiver 1140 to perform transmission of the target data with the base station through the WLAN AP, where the target data is transmitted between the WLAN AP and the base station through the GTP tunnel.

Optionally, the processor 1120 is further configured to control the transceiver 1140 to receive second offloading indication information sent by the base station, where the second offloading indication information is used for instructing to transmit the target data between the user equipment and the WLAN AP; and configured to determine according to the second offloading indication information that the user equipment needs to perform transmission of the target data with the base station through the WLAN AP.

Optionally, the device further has a first user equipment-side protocol stack and a second user equipment-side protocol stack, the first user equipment-side protocol stack is configured to implement, on a user equipment side, data processing on communication with the base station, and the second user equipment-side protocol stack is configured to implement, on the user equipment side, data processing on communication with the WLAN AP, where the second user equipment-side protocol stack is connected to at least one protocol layer of the first user equipment-side protocol stack; and the processor 1120 is specifically configured to control the transceiver 1140 to perform transmission of the target data with the base station by using the at least one layer of the first user equipment-side protocol stack and the second user equipment-side protocol stack and through the WLAN AP.

Optionally, when the target data is some data on the bearer, the processor 1120 is further configured to control the transceiver 1140 to perform transmission of non-target data with the base station by using the first user equipment-side protocol stack, where the non-target data is data in all the data on the bearer except the target data.

Optionally, the second user equipment-side protocol stack includes an adaptation layer, the adaptation layer is configured to perform conversion processing on data between the at least one protocol layer of the first user equipment-side protocol stack and the second user equipment-side protocol stack, and the second user equipment-side protocol stack is connected to the at least one protocol layer of the first user equipment-side protocol stack by using the adaptation layer; and the processor 1120 is specifically configured to input uplink target data to the at least one protocol layer of the first user equipment-side protocol stack, convert, by using the adaptation layer, a data format of data output from the at least one protocol layer of the first user equipment-side protocol stack into a data format that the second user equipment-side protocol stack can identify, transmit the data to the second user equipment-side protocol stack, and control the transceiver 1140 to send the data output from the second user equipment-side protocol stack to the WLAN AP, so as to send the data to the base station by using the WLAN AP; or configured to input data received by the transceiver 1140 from the WLAN AP to the second user equipment-side protocol stack, convert, by using the adaptation layer, a data format of data output from the second user equipment-side protocol stack into a data format that the at least one protocol layer of the first user equipment-side protocol stack can identify, and transmit the data to the at least one protocol layer of the first user equipment-side protocol stack, so as to obtain downlink target data.

Optionally, the second user equipment-side protocol stack includes a bearer mapping layer, and the bearer mapping layer is configured to determine the bearer to which the target data belongs; and when the user equipment corresponds to at least two bearers, the processor 1120 is further configured to determine a bearer to which uplink target data of the target data belongs by using the bearer mapping layer, and generate second bearer indication information by using the bearer mapping layer, where the second bearer indication information is used for indicating the bearer to which the uplink target data belongs; and configured to control the transceiver 1140 to send the second bearer indication information to the WLAN AP, so that the base station determines, according to the second bearer indication information forwarded by the WLAN AP or a second uplink GTP tunnel corresponding to the bearer to which the uplink target data belongs, the bearer to which the uplink target data belongs.

Optionally, the processor 1120 is specifically configured to encapsulate the second bearer indication information and the uplink target data in a same data packet by using the bearer mapping layer and send the data packet to the WLAN AP by using the transceiver 1140.

Optionally, the second user equipment-side protocol stack includes a bearer mapping layer, and the bearer mapping layer is configured to determine the bearer to which the target data belongs; and the processor 1120 is specifically configured to obtain, by using the bearer mapping layer, first bearer indication information sent by the WLAN AP, where the first bearer indication information is used for indicating a bearer to which the downlink target data of the target data belongs; and configured to determine, according to the first bearer indication information, the bearer to which the downlink target data belongs, where the first bearer indication information is obtained from the base station by using the transceiver 1140, or determined according to a second downlink GTP tunnel corresponding to the bearer to which the downlink target data belongs.

Optionally, the processor 1120 is specifically configured to obtain, by using the bearer mapping layer, the second bearer indication information from a data packet in which the downlink target data is encapsulated.

Optionally, the first base station-side protocol stack includes a resequencing layer, the resequencing layer is configured to determine a location of the target data in all the data on the bearer, and the at least one protocol layer of the first user equipment-side protocol stack is the resequencing layer; and the processor 1120 is specifically configured to determine a location of the uplink target data of the target data in all uplink data on the bearer by using the resequencing layer, and generate second location indication information by using the resequencing layer, where the second location indication information is used for indicating the location of the uplink target data in all the uplink data on the bearer; and send the second location indication information to the WLAN AP by using the transceiver 1140, so that the base station determines the location of the uplink target data in all the uplink data on the bearer according to the second location indication information forwarded by the WLAN AP.

Optionally, the processor 1120 is specifically configured to encapsulate the second location indication information and the uplink target data in a same data packet by using the resequencing layer and send the data packet to the WLAN AP by using the transceiver 1140.

Optionally, the first base station-side protocol stack includes a resequencing layer, the resequencing layer is configured to determine a location of the target data in all the data on the bearer, and the at least one protocol layer of the first user equipment-side protocol stack is the resequencing layer; and the processor 1120 is specifically configured to obtain, by using the resequencing layer, first location indication information forwarded by the WLAN AP, where the first location indication information is used for indicating a location of the downlink target data of the target data in all downlink data on the bearer; and configured to determine the location of the downlink target data in all the downlink data on the bearer according to the first location indication information, where the first location indication information is determined by the base station and sent to the WLAN AP.

Optionally, the processor 1120 is specifically configured to obtain, by using the resequencing layer, the first location indication information from a data packet in which the downlink target data is encapsulated.

Optionally, the at least one protocol layer of the first user equipment-side protocol stack includes at least one of the following protocol layers:

a Packet Data Convergence Protocol PDCP layer, a Radio Link Control RLC layer and a Media Access Control MAC layer.

The data transmission device 1100 according to this embodiment of the present invention may correspond to user equipment (target user equipment) in a method of an embodiment of the present invention, and units, that is, modules in the data transmission device 1100 and the foregoing other operations and/or functions are separately to implement a corresponding process of a method 500 in FIG. 8. For purpose of conciseness, details are not described herein again.

According to the data transmission device of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

Figure 15:
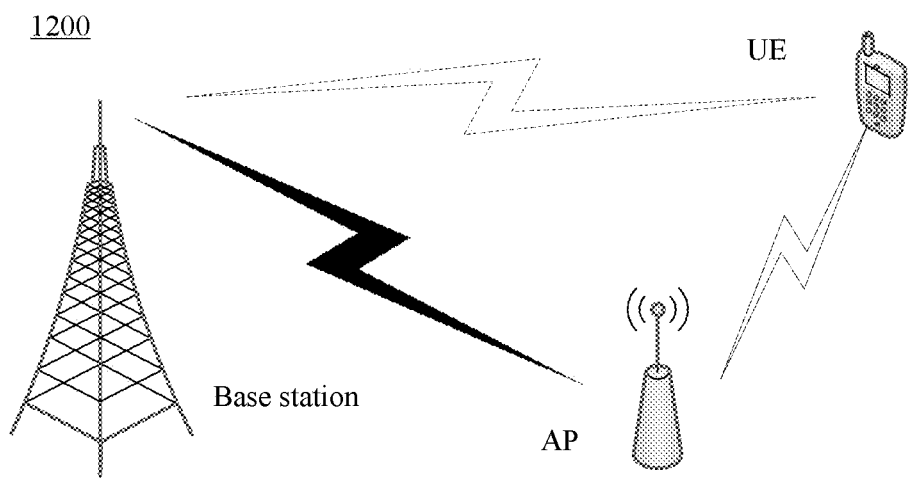
FIG. 15 is a schematic architectural diagram of a signal transmission system according to an embodiment of the present invention.

FIG. 15 is a schematic architectural diagram of a signal transmission system 1200 according to an embodiment of the present invention. As shown in FIG. 15, the system 1200 includes:

a base station 1210, where a bearer used to transmit data of user equipment 1230 is disposed between the base station and a gateway device, and a General Packet Radio Service Tunneling Protocol GTP tunnel is disposed between the base station and a wireless local area network access point WLAN AP 1220, the base station is configured to send first offloading indication information to the WLAN AP 1220, where the first offloading indication information is used for instructing the WLAN AP 1220 to transmit the target data between the base station 1210 and the user equipment 1230, and the first offloading indication information includes identity information of the user equipment 1230, where a piece of identity information is used for uniquely indicating a piece of user equipment in the communications system; and perform transmission of target data with the user equipment 1230 through the GTP tunnel by using the WLAN AP 1220, where the target data is all or some data on the bearer;

the WLAN AP 1220, configured to receive first offloading indication information sent by the base station 1210, where the first offloading indication information is used for instructing the WLAN AP 1220 to transmit the target data between the base station 1210 and the user equipment 1230, and the first offloading indication information includes identity information of the user equipment 1230, where a piece of identity information is used for uniquely indicating a piece of user equipment in the communications system; and configured to transmit target data of the user equipment 1230 with the base station 1210 according to the first offloading indication information and through the GTP tunnel; and the user equipment 1230, configured to determine that the user equipment needs to perform transmission of target data with the base station 1210 through the WLAN AP 1220; and configured to perform transmission of the target data with the base station 1210 through the WLAN AP 1220, where the target data is transmitted between the WLAN AP 1220 and the base station 1210 through the GTP tunnel.

The base station 1210 in the data transmission system 1200 according to this embodiment of the present invention may correspond to a base station in a method of an embodiment of the present invention, and units, that is, modules in the base station 1210 and the foregoing other operations and/or functions are separately to implement a corresponding process of a method 100 in FIG. 4. For purpose of conciseness, details are not described herein again. The WLAN AP 1220 may correspond to an AP in a method of an embodiment of the present invention, and units, that is, modules in the WLAN AP 1220 and the foregoing other operations and/or functions are separately to implement a corresponding process of a method 400 in FIG. 7. For purpose of conciseness, details are not described herein again. The user equipment 1230 may correspond to user equipment (target user equipment) in a method of an embodiment of the present invention, and units, that is, modules in the base station and the foregoing other operations and/or functions are separately to implement a corresponding process of a method 500 in FIG. 8. For purpose of conciseness, details are not described herein again.

According to the data transmission system of this embodiment of the present invention, after determining that a base station needs to offload data of UE by using a WLAN AP, the base station transmits the data (including uplink data or downlink data) of the UE between a GTP tunnel and the WLAN AP, which can make an offloading anchor be located at the base station, and therefore the base station can autonomously determine an offloading policy in real time according to current data traffic, thereby improving an offloading effect; moreover, because the data offloaded by the WLAN AP reaches a gateway device through the base station, which can ensure that a gateway device used when a communication connection is established by using a WLAN is the same as a gateway device used when a communication connection is established by using the base station, service continuity can be ensured, and user experience can be improved.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, wherein the method is executed by a base station in a communications system, the communications system further comprises a wireless local area network access point WLAN AP and user equipment, a bearer used to transmit data of the user equipment is disposed between the base station and a gateway device, a General Packet Radio Service Tunneling Protocol GTP tunnel is disposed between the base station and the WLAN AP, and the method comprises:
   sending, by the base station, first offloading indication information to the WLAN AP, wherein the first offloading indication information is used for instructing the WLAN AP to transmit data between the base station and the user equipment, and the first offloading indication information comprises identity information of the user equipment, wherein a piece of identity information is used for uniquely indicating a piece of user equipment in the communications system; and
   performing, by the base station, transmission of target data with the user equipment through the GTP tunnel by using the WLAN AP, wherein the target data is all or some data on the bearer,
   wherein the base station has a first base station-side protocol stack and a second base station-side protocol stack, the first base station-side protocol stack is configured to implement, on a base station side, data processing on communication with the user equipment, and the second base station-side protocol stack is configured to implement, on the base station side, data processing on communication with the WLAN AP, wherein the second base station-side protocol stack is connected to at least one protocol layer of the first base station-side protocol stack; and
   the performing, by the base station, transmission of target data with the user equipment through the GTP tunnel by using the WLAN AP comprises:
   performing, by the base station, transmission of the target data with the user equipment by using at least one layer of the first base station-side protocol stack and the second base station-side protocol stack, through the GTP tunnel, and by using the WLAN AP.

2. The method according to claim 1, wherein the second base station-side protocol stack comprises an adaptation layer, the adaptation layer is configured to perform conversion processing on data between the at least one protocol layer of the first base station-side protocol stack and the second base station-side protocol stack, and the second base station-side protocol stack is connected to the at least one protocol layer of the first base station-side protocol stack by using the adaptation layer; and
   the performing, by the base station, transmission of the target data with the user equipment by using at least one layer of the first base station-side protocol stack and the second base station-side protocol stack, through the GTP tunnel, and by using the WLAN AP comprises:
   inputting, by the base station, the downlink target data to the at least one protocol layer of the first base station-side protocol stack, converting, by using the adaptation layer, a data format of data output from the at least one protocol layer of the first base station-side protocol stack into a data format that the second base station-side protocol stack can identify, transmitting the data to the second base station-side protocol stack, and sending the data output from the second base station-side protocol stack to the WLAN AP through the GTP tunnel, so as to send the data to the user equipment by using the WLAN AP; or
   inputting, by the base station, data obtained from the WLAN AP through the GTP tunnel to the second base station-side protocol stack, converting, by using the adaptation layer, a data format of data output from the second base station-side protocol stack into a data format that the at least one protocol layer of the first base station-side protocol stack can identify, and transmitting the data to the at least one protocol layer of the first base station-side protocol stack, so as to obtain the uplink target data of the user equipment.

3. The method according to claim 1, wherein the second base station-side protocol stack comprises a bearer mapping layer, and the bearer mapping layer is configured to determine the bearer to which the target data belongs; and
   when the user equipment corresponds to at least two bearers, the performing, by the base station, transmission of target data with the user equipment through the GTP tunnel by using the WLAN AP comprises:
   determining, by the base station, a bearer to which downlink target data of the target data belongs by using the bearer mapping layer, and generating first bearer indication information by using the bearer mapping layer, wherein the first bearer indication information is used for indicating the bearer to which the downlink target data belongs; and
   sending, by the base station, the first bearer indication information to the WLAN AP, so that the user equipment determines, according to the first bearer indication information forwarded by the WLAN AP, the bearer to which the downlink target data belongs.

4. The method according to claim 3, wherein the sending, by the base station, the first bearer indication information to the WLAN AP comprises:

encapsulating, by the base station, the first bearer indication information and the downlink target data in a same data packet by using the bearer mapping layer and sending the data packet to the WLAN AP.

5. The method according to claim 1, wherein the second base station-side protocol stack comprises a bearer mapping layer, and the bearer mapping layer is configured to determine the bearer to which the target data belongs; and when the user equipment corresponds to at least two bearers, the performing, by the base station, transmission of target data with the user equipment through the GTP tunnel by using the WLAN AP comprises:

obtaining, by the base station by using the bearer mapping layer, second bearer indication information forwarded by the WLAN AP, wherein the second bearer indication information is used for indicating a bearer to which uplink target data of the target data belongs; and determining, by the base station according to the second bearer indication information, the bearer to which the uplink target data belongs, wherein the second bearer indication information is determined by the user equipment and sent to the WLAN AP.

6. The method according to claim 1, wherein the first base station-side protocol stack comprises a resequencing layer, the resequencing layer is configured to determine a location of the target data in all the data on the bearer, and the at least one protocol layer of the first base station-side protocol stack is the resequencing layer; and the performing, by the base station, transmission of target data with the user equipment through the GTP tunnel by using the WLAN AP comprises:

obtaining, by the base station by using the resequencing layer, second location indication information forwarded by the WLAN AP, wherein the second location indication information is used for indicating a location of the uplink target data of the target data in all uplink data on the bearer; and determining, by the base station, the location of the uplink target data in all the uplink data on the bearer according to the second location indication information, wherein the second location indication information is determined by the user equipment and sent to the WLAN AP.

7. A data transmission method, wherein the method is executed by user equipment in a communications system, the communications system further comprises a base station and a wireless local area network access point WLAN AP, a bearer used to transmit data of the user equipment is disposed between the base station and a gateway device, a General Packet Radio Service Tunneling Protocol GTP tunnel is disposed between the base station and the WLAN AP, and the method comprises:

determining, by the user equipment, that the user equipment needs to perform data transmission with the base station through the WLAN AP; and performing, by the user equipment, transmission of target data with the base station through the WLAN AP, wherein the target data is transmitted between the WLAN AP and the base station through the GTP tunnel, and the target data is all or some data on the bearer, wherein the user equipment has a first user equipment-side protocol stack and a second user equipment-side protocol stack, the first user equipment-side protocol stack is configured to implement, on a user equipment side, data processing on communication with the base station, and the second user equipment-side protocol stack is configured to implement, on the user equipment side, data processing on communication with the WLAN AP, wherein the second user equipment-side protocol stack is connected to at least one protocol layer of the first user equipment-side protocol stack; and the performing, by the user equipment, transmission of target data with the base station through the WLAN AP comprises:

performing, by the user equipment, transmission of the target data with the base station by using the at least one layer of the first user equipment-side protocol stack and the second user equipment-side protocol stack and through the WLAN AP.

8. The method according to claim 7, wherein the determining, by the user equipment, that the user equipment needs to perform data transmission with the base station through the WLAN AP comprises:

receiving, by the user equipment, second offloading indication information sent by the base station, wherein the second offloading indication information is used for instructing to transmit data between the user equipment and the WLAN AP; and determining, by the user equipment, according to the second offloading indication information that the user equipment needs to perform data transmission with the base station through the WLAN AP.

9. The method according to claim 7, wherein the second user equipment-side protocol stack comprises a bearer mapping layer, and the bearer mapping layer is configured to determine the bearer to which the target data belongs; and when the user equipment corresponds to at least two bearers, the performing, by the user equipment, transmission of target data with the base station through the WLAN AP comprises:

obtaining, by the user equipment by using the bearer mapping layer, first bearer indication information sent by the WLAN AP, wherein the first bearer indication information is used for indicating a bearer to which the downlink target data of the target data belongs; and determining, by the user equipment according to the first bearer indication information, the bearer to which the downlink target data belongs, wherein the first bearer indication information is obtained by the WLAN AP from the base station, or determined by the WLAN AP according to a second downlink GTP tunnel corresponding to the bearer to which the downlink target data belongs.

10. The method according to claim 7, wherein the first user equipment-side protocol stack comprises a resequencing layer, the resequencing layer is configured to determine a location of the target data in all the data on the bearer, and the at least one protocol layer of the first user equipment-side protocol stack is the resequencing layer; and the performing, by the user equipment, transmission of target data with the base station through the WLAN AP comprises:

determining, by the user equipment, a location of the uplink target data of the target data in all uplink data on the bearer by using the resequencing layer, and generating second location indication information by using the resequencing layer, wherein the second location indication information is used for indicating the location of the uplink target data in all the uplink data on the bearer; and sending, by the user equipment, the second location indication information to the WLAN AP, so that the base station determines the location of the uplink target data in all the uplink data on the bearer according to the second location indication information forwarded by the WLAN AP.

11. A data transmission apparatus, wherein a bearer used to transmit data of user equipment is disposed between the apparatus and a gateway device, a General Packet Radio Service Tunneling Protocol GTP tunnel is disposed between the apparatus and the WLAN AP, and the apparatus comprises:
    a first base station-side protocol stack, configured to implement data processing on communication with the user equipment;
    a second base station-side protocol stack, configured to implement data processing on communication with the WLAN AP, wherein the second base station-side protocol stack is connected to at least one protocol layer of the first base station-side protocol stack; and
    a transceiver unit, connected to the second base station-side protocol stack, and configured to perform transmission of target data with the user equipment through the GTP tunnel by using the WLAN AP,
    wherein the second base station-side protocol stack comprises an adaptation layer, the adaptation layer is configured to perform conversion processing on data between the at least one protocol layer of the first base station-side protocol stack and the second base station-side protocol stack, and the second base station-side protocol stack is connected to the at least one protocol layer of the first base station-side protocol stack by using the adaptation layer.

12. The apparatus according to claim 11, wherein the second base station-side protocol stack comprises a bearer mapping layer, and the bearer mapping layer is configured to determine the bearer to which the target data belongs; and
    when the user equipment corresponds to at least two bearers, the determining unit is specifically configured to determine a bearer to which downlink target data of the target data belongs by using the bearer mapping layer, and generate first bearer indication information by using the bearer mapping layer, wherein the first bearer indication information is used for indicating the bearer to which the downlink target data belongs; and
    the transceiver unit is further configured to send the first bearer indication information to the WLAN AP, so that the user equipment determines, according to the first bearer indication information forwarded by the WLAN AP, the bearer to which the downlink target data belongs.

13. The apparatus according to claim 11, wherein the first base station-side protocol stack comprises a resequencing layer, the resequencing layer is configured to determine a location of the target data in all the data on the bearer, and the at least one protocol layer of the first base station-side protocol stack is the resequencing layer; and
    the determining unit is further configured to determine a location of the downlink target data of the target data in all downlink data on the bearer by using the resequencing layer, and generate first location indication information by using the resequencing layer, wherein the first location indication information is used for indicating the location of the downlink target data in all the downlink data on the bearer; and
    the transceiver unit is further configured to send the first location indication information determined by the determining unit to the WLAN AP, so that the user equipment determines the location of the downlink target data in all the downlink data on the bearer according to the first location indication information forwarded by the WLAN AP.

14. A data transmission apparatus, wherein the apparatus comprises:
    a first user equipment-side protocol stack, configured to implement data processing on communication with a base station, wherein a bearer used to transmit data of the user equipment is disposed between the base station and a gateway device, a General Packet Radio Service Tunneling Protocol GTP tunnel is disposed between the base station and a WLAN AP;
    a second user equipment-side protocol stack, configured to implement data processing on communication with the WLAN AP, wherein the second user equipment-side protocol stack is connected to at least one protocol layer of the first user equipment-side protocol stack; and
    a transceiver unit, connected to the second user equipment-side protocol stack, and configured to perform transmission of target data with the base station through the WLAN AP, wherein the target data is transmitted between the WLAN AP and the base station through the GTP tunnel, and the target data is all or some data on the bearer,
    wherein the second user equipment-side protocol stack comprises a bearer mapping layer, and the bearer mapping layer is configured to determine the bearer to which the target data belongs; and
    when the user equipment corresponds to at least two bearers, the transceiver unit is further configured to determine a bearer to which uplink target data of the target data belongs by using the bearer mapping layer, and generate second bearer indication information by using the bearer mapping layer, wherein the second bearer indication information is used for indicating the bearer to which the uplink target data belongs; and
    configured to send the second bearer indication information to the WLAN AP, so that the base station determines, according to the second bearer indication information forwarded by the WLAN AP or a second uplink GTP tunnel corresponding to the bearer to which the uplink target data belongs, the bearer to which the uplink target data belongs.

15. The apparatus according to claim 14, wherein the transceiver unit is further configured to receive second offloading indication information sent by the base station, wherein the second offloading indication information is used for instructing to transmit data between the user equipment and the WLAN AP; and
    configured to determine according to the second offloading indication information that the user equipment needs to perform data transmission with the base station through the WLAN AP.

16. The apparatus according to claim 14, wherein the first user equipment-side protocol stack comprises a resequencing layer, the resequencing layer is configured to determine a location of the target data in all the data on the bearer, and the at least one protocol layer of the first user equipment-side protocol stack is the resequencing layer; and
    the transceiver unit is specifically configured to determine a location of the uplink target data of the target data in all uplink data on the bearer by using the resequencing layer, and generate second location indication information by using the resequencing layer, wherein the second location indication information is used for indicating the location of the uplink target data in all the uplink data on the bearer; and configured to send the second location indication information to the WLAN AP, so that the base station determines the location of the uplink target data in all the uplink data on the bearer according to the second location indication information forwarded by the WLAN AP.

\* \* \* \* \*

UNITED STATES PATENT AND TRADEMARK OFFICE
CERTIFICATE OF CORRECTION

PATENT NO. : 10,412,650 B2  
APPLICATION NO. : 15/059865  
DATED : September 10, 2019  
INVENTOR(S) : Mingzeng Dai et al.

Page 1 of 1

It is certified that error appears in the above-identified patent and that said Letters Patent is hereby corrected as shown below:

On the Title Page

On Page 2, item (56), Line 17:
In Other Publications, after ""TTA," delete "TIC" and insert -- TTC --, therefor.

Signed and Sealed this
Thirty-first Day of December, 2019

Andrei Iancu
*Director of the United States Patent and Trademark Office*